(12) United States Patent
Zheleznyak et al.

(10) Patent No.: US 12,443,053 B2
(45) Date of Patent: Oct. 14, 2025

(54) MYOPIA CONTROL TREATMENTS

(71) Applicant: Clerio Vision, Inc., Rochester, NY (US)

(72) Inventors: Leonard Zheleznyak, Pittsford, NY (US); Gustavo A. Gandara-Montano, Rochester, NY (US)

(73) Assignee: Clerio Vision, Inc., Rochester, NY (US)

( * ) Notice: Subject to any disclaimer, the term of this patent is extended or adjusted under 35 U.S.C. 154(b) by 302 days.

(21) Appl. No.: 18/122,634

(22) Filed: Mar. 16, 2023

(65) Prior Publication Data

US 2023/0296919 A1 Sep. 21, 2023

Related U.S. Application Data

(60) Provisional application No. 63/397,128, filed on Aug. 11, 2022, provisional application No. 63/321,447, filed on Mar. 18, 2022.

(51) Int. Cl.
*G02C 7/04* (2006.01)
(52) U.S. Cl.
CPC ......... *G02C 7/044* (2013.01); *G02C 2202/24* (2013.01)
(58) Field of Classification Search
CPC ...... G02C 7/044; G02C 2202/24; G02C 7/04; G02C 2202/20; G02C 2202/22; G02C 7/022; G02C 7/027
See application file for complete search history.

(56) References Cited

U.S. PATENT DOCUMENTS

| | | |
|---|---|---|
| 5,849,006 A | 12/1998 | Frey et al. |
| 6,261,220 B1 | 7/2001 | Frey et al. |
| 6,271,914 B1 | 8/2001 | Frey et al. |

(Continued)

FOREIGN PATENT DOCUMENTS

| | | |
|---|---|---|
| CN | 107861262 A | 3/2018 |
| FR | 2989179 A3 | 10/2013 |

(Continued)

OTHER PUBLICATIONS

Aguila-Carrasco et al., "Aberrations and Accommodation", Clinical and Experimental Optometry, vol. 103, Jul. 8, 2019, pp. 95-103.

(Continued)

*Primary Examiner* — Tuyen Tra
(74) *Attorney, Agent, or Firm* — Kilpatrick Townsend & Stockton LLP

(57) ABSTRACT

Ophthalmic lenses include one or more annular sectors configured to provide one or more off-axis corrections to light incident on the peripheral retina to inhibit myopia progression. An ophthalmic lens includes a central zone and an annular zone that includes an annular sector configured to provide a myopia inhibiting wavefront correction to light from a peripheral vision region of a peripheral visual field of the use. The first annular sector is configured so that light from the peripheral vision region passes through the first annular sector to form an image of the peripheral vision region on an annular region of the peripheral retina. The myopia inhibiting wavefront correction reduces a circumferential-to-radial aspect ratio of the image of the first peripheral vision region.

30 Claims, 45 Drawing Sheets

(56) References Cited

U.S. PATENT DOCUMENTS

| | | | |
|---|---|---|---|
| 6,720,221 | B1 | 4/2004 | Ahn et al. |
| 6,830,332 | B2 | 12/2004 | Piers et al. |
| 7,001,374 | B2 | 2/2006 | Peyman |
| 7,052,133 | B2* | 5/2006 | Lindacher ............. G02C 7/044 351/159.1 |
| 7,677,725 | B2 | 3/2010 | Piers et al. |
| 7,789,910 | B2 | 9/2010 | Knox et al. |
| 8,337,553 | B2 | 12/2012 | Knox et al. |
| 8,512,320 | B1 | 8/2013 | Knox et al. |
| 8,617,147 | B2 | 12/2013 | Knox et al. |
| 8,901,190 | B2 | 12/2014 | Smith et al. |
| 8,932,352 | B2 | 1/2015 | Knox et al. |
| 9,060,847 | B2 | 6/2015 | Smith et al. |
| 9,144,491 | B2 | 9/2015 | Knox et al. |
| 9,492,323 | B2 | 11/2016 | Knox et al. |
| 9,545,340 | B1 | 1/2017 | Knox et al. |
| 9,622,912 | B2 | 4/2017 | Knox et al. |
| 9,939,558 | B2 | 4/2018 | Knox et al. |
| 10,226,381 | B2 | 3/2019 | Knox et al. |
| 10,932,901 | B2 | 3/2021 | Zheleznyak et al. |
| 11,693,257 | B2 | 7/2023 | Zheleznyak |
| 12,298,600 | B2* | 5/2025 | Zheleznyak ........... G02C 7/045 |
| 2005/0187622 | A1 | 8/2005 | Sandstedt et al. |
| 2008/0001320 | A1 | 1/2008 | Knox et al. |
| 2011/0037944 | A1 | 2/2011 | Varnas |
| 2012/0081661 | A1 | 4/2012 | Yamakaji |
| 2012/0150166 | A1 | 6/2012 | Neev |
| 2012/0310223 | A1 | 12/2012 | Knox et al. |
| 2013/0010255 | A1 | 1/2013 | Holden et al. |
| 2013/0178934 | A1 | 7/2013 | Knox et al. |
| 2013/0226162 | A1 | 8/2013 | Knox et al. |
| 2014/0104563 | A1 | 4/2014 | Bakaraju et al. |
| 2014/0268029 | A1 | 9/2014 | Pugh et al. |
| 2015/0277145 | A1 | 10/2015 | Bakaraju et al. |
| 2015/0277150 | A1 | 10/2015 | Granger et al. |
| 2016/0144580 | A1 | 5/2016 | Knox et al. |
| 2017/0035613 | A1 | 2/2017 | Knox et al. |
| 2017/0119581 | A1 | 5/2017 | Gray et al. |
| 2017/0146820 | A1 | 5/2017 | Brennan et al. |
| 2017/0176772 | A1 | 6/2017 | Bakaraju et al. |
| 2017/0181846 | A1 | 6/2017 | Knox et al. |
| 2018/0021172 | A1 | 1/2018 | Zheleznyak et al. |
| 2018/0132996 | A1 | 5/2018 | Tiwari et al. |
| 2018/0173009 | A1 | 6/2018 | Knox et al. |
| 2018/0206979 | A1 | 7/2018 | Knox et al. |
| 2018/0231696 | A1 | 8/2018 | Knox et al. |
| 2018/0243082 | A1 | 8/2018 | Zheleznyak et al. |
| 2018/0373060 | A1 | 12/2018 | Knox et al. |
| 2019/0046357 | A1 | 2/2019 | Knox et al. |
| 2019/0072786 | A1 | 3/2019 | Krause et al. |
| 2019/0343683 | A1 | 11/2019 | Zheleznyak et al. |
| 2020/0054485 | A1 | 2/2020 | Knox |
| 2021/0018762 | A1 | 1/2021 | Zheleznyak |
| 2021/0282966 | A1 | 9/2021 | Back et al. |
| 2021/0356767 | A1 | 11/2021 | Kubota et al. |
| 2022/0113557 | A1 | 4/2022 | Hong |
| 2024/0264467 | A1* | 8/2024 | Back ..................... G02C 7/041 |

FOREIGN PATENT DOCUMENTS

| | | |
|---|---|---|
| WO | 2008002796 A2 | 1/2008 |
| WO | 2009143054 A2 | 11/2009 |
| WO | 2012166696 A1 | 12/2012 |
| WO | 2015006274 A1 | 1/2015 |
| WO | 2016070243 A1 | 5/2016 |
| WO | 2017106321 A1 | 6/2017 |
| WO | 2018152595 A1 | 8/2018 |
| WO | 2018182946 A1 | 10/2018 |
| WO | 2019010345 A1 | 1/2019 |
| WO | 2019147952 A1 | 8/2019 |
| WO | 2020102514 A1 | 5/2020 |
| WO | 2021108585 A1 | 6/2021 |
| WO | 2024020078 A1 | 1/2024 |

OTHER PUBLICATIONS

Atchison et al., "Chromatic Dispersions of the Ocular Media of Human Eyes", Journal of the Optical Society of America A, vol. 22, No. 1, Jan. 2005, pp. 29-37.

Banks et al., "ChromaBlur: Rendering Natural Chromatic Aberration Drives Accommodation Effectively", Journal of Vision, vol. 18, No. 10, Abstract only, Sep. 2018, 2 pp.

Banks et al., "Peripheral Spatial Vision: Limits Imposed by Optics, Photoreceptors, and Receptor Pooling", Journal of the Optical Society of America, vol. 8, No. 11, Nov. 1991, pp. 1775-1787.

Bao et al., "One-year myopia control efficacy of spectacle lenses with aspherical lenslets", Br J Ophthalmol, 106, 2022, pp. 1171-1176.

Benedi-Garcia et al., "Vision is Protected Against Blue Defocus", Scientific Reports, vol. 11, Jan. 11, 2021, pp. 1-9.

Bloomfield, "Orientation-Sensitive Amacrine and Ganglion Cells in the Rabbit Retina", Journal of Neurophysiology, vol. 71, No. 5, May 1994, pp. 1672-1691.

Bloomfield, "Two Types of Orientation-Sensitive Responses of Amacrine Cells in the Mammalian Retina", Nature, vol. 350, Mar. 28, 1991, pp. 347-350.

Chen et al., "Accommodation with Higher-order Monochromatic Aberrations Corrected with Adaptive Optics", Journal of the Optical Society of America A, vol. 23, No. 1, Jan. 2006, pp. 1-8.

Cholewiak et al., "ChromaBlur: Rendering Chromatic Eye Aberration Improves Accommodation and Realism", ACM Transactions on Graphics, vol. 36, No. 6, Nov. 2017, pp. 1-12.

Cholewiak et al., "ChromaBlur: Rendering Chromatic Eye Aberration Improves Accommodation and Realism in HMDs", ACM Transactions on Graphics, vol. 36, No. 6, Article 210, Nov. 2017, pp. 210:1 thru 210:12.

Cholewiak et al., "Creating Correct Blur and Its Effect on Accommodation", Journal of Vision, vol. 18, No. 9, Sep. 4, 2018, pp. 1-29.

Fernandez et al., "Adaptation to the Eye's Chromatic Aberration Measured with an Adaptive Optics Visual Simulator", Optics Express, vol. 28, No. 25, Nov. 30, 2020, pp. 37450-37458.

Flitcroft et al., "IMI—Defining and Classifying Myopia: A Proposed Set of Standards for Clinical and Epidemiologic Studies", Investigative Ophthalmology & Visual Science, vol. 60, No. 3, Feb. 2019, pp. M20-M30.

Gantes-Nunez et al., "Optical characterisation of two novel myopia control spectacle lenses", Ophthalmic Physiol Opt., 43, 2023, pp. 388-401.

Gawne et al., "An Opponent Dual-detector Spectral Drive Model of Emmetropization", Vision Research, vol. 173, Aug. 2020, pp. 7-20.

Gawne et al., "Chromatically Simulated Myopic Blur Counteracts a Myopiagenic Environment", Experimental Eye Research, vol. 222, Sep. 2022, pp. 1-6.

Gawne et al., "How Chromatic Cues can Guide Human Eye Growth to Achieve Good Focus", Journal of Vision, vol. 21, No. 5, May 13, 2021, pp. 1-11.

Gifford et al., "IMI—Clinical Management Guidelines Report", IOVS, Special Issue, vol. 60, No. 3, pp. M184-M203.

Graef et al., "Control of Accommodation by Longitudinal Chromatic Aberration and Blue Cones", Journal of Vision, vol. 12, Jan. 18, 2012, pp. 1-12.

Hiraoka et al., "Relationships Between Higher-order Wavefront Aberrations and Natural Progression of Myopia in Schoolchildren", Scientific Reports, vol. 7, Article No. 7876, Aug. 11, 2017, 9 Pages.

Huang et al., "Efficacy Comparison of 16 Interventions for Myopia Control in Children", America Academy of Ophthalmology, vol. 123, No. 4, Apr. 2016, pp. 697-708.

Jaskulski et al., "The Effect of Longitudinal Chromatic Aberration on the Lag of Accommodation and Depth of Field", Ophthalmic & Physiological Optics, vol. 36, No. 6, Nov. 2016, pp. 657-663.

Jiang et al., "Measuring and Compensating for Ocular Longitudinal Chromatic Aberration", Optica, vol. 6, No. 8, Aug. 2019, pp. 981-990.

Lam et al., "Defocus Incorporated Multiple Segments (DIMS) spectacle lenses slow myopia progression: a 2-year randomised clinical trial", Br J Ophthalmol, 104, 2020, pp. 363-368.

(56) References Cited

OTHER PUBLICATIONS

Leung et al., "Meridional Anisotropy of Foveal and Peripheral Resolution Acuity in Adults with Emmetropia, Myopia, and Astigmatism", Investigative Ophthalmology & Visual Science, vol. 62, No. 10, Aug. 2021, pp. 1-6.
Levick et al., "Analysis of Orientation Bias in Cat Retina", The Journal of Physiology, vol. 329, Aug. 1982, pp. 243-261.
Li et al., "Studies Using Concentric Ring Bifocal and Peripheral Add Multifocal Contact Lenses to Slow Myopia Progression in School-Aged Children: A Meta-Analysis", Ophthalmic & Physiological Optics, vol. 37, No. 1, Jan. 2017, pp. 51-59.
Lopez-Gil et al., "New Intraocular Lens for Achromatizing the Human Eye", Journal of Cataract and Refractive Surgery, vol. 33, No. 7, Aug. 2007, pp. 1296-1302.
Marcos et al., "A New Approach to the Study of Ocular Chromatic Aberrations", Vision Research, vol. 39, No. 26, Dec. 1999, pp. 4309-4323.
Martinez et al., "Chromatic Aberration Control with Liquid Crystal Spatial Phase Modulators", Optics Express, vol. 25, No. 9, May 1, 2017, pp. 9793-9801.
McLellan et al., "Imperfect Optics May be the Eye's Defence Against Chromatic Blur", Nature, vol. 417, May 9, 2002, pp. 174-176.
Moreno et al., "Modulation Light Efficiency of Diffractive Lenses Displayed in a Restricted Phase-Mostly Modulation Display", Applied Optics, vol. 43, No. 34, Dec. 1, 2004, pp. 6278-6284.
Passaglia et al., "Orientation Sensitivity of Ganglion Cells in Primate Retina", Vision Research, vol. 42, Mar. 2002, pp. 683-694.
Powell, "Lenses for Correcting Chromatic Aberration of the Eye", Applied Optics, vol. 20, No. 24, Dec. 15, 1981, pp. 4152-4155.
Resnikoff et al., "Myopia—A 21st Century Public Health Issue", Investigative Ophthalmology & Visual Science, vol. 60, No. 3, Feb. 2019, pp. Mi-Mii.
Rohrer et al., "Longitudinal Chromatic Aberration and Emmetropization: Results from the Chicken Eye", Journal of Physiology, vol. 449, Apr. 1992, pp. 363-376.
Romashchenko et al., "Peripheral refraction and higher order aberrations", Clinical and Experimental Optometry 103.1, Jan. 2020, pp. 86-94.
Rucker et al., "Chick Eyes Compensate for Chromatic Simulations of Hyperopic and Myopic Defocus: Evidence that the Eye Uses Longitudinal Chromatic Aberration to Guide Eye-growth", Vision Research, vol. 49, No. 14, Jul. 2009, pp. 1775-1783.
Rucker et al., "Signals for Defocus Arise from Longitudinal Chromatic Aberration in Chick", Experimental Eye Research, vol. 198, Sep. 2020, 10 pages.
Rucker, "The Role of Luminance and Chromatic Cues in Emmetropisation", Ophthalmic & Physiological Optics, vol. 33, No. 3, May 2013, pp. 196-214.
Savage et al., "First Demonstration of Ocular Refractive Change Using Blue-IRIS in Live Cats", Investigative Ophthalmology & Visual Science, vol. 55, No. 7, Jul. 1, 2014, pp. 4603-4612.
Schall et al., "Retinal Ganglion Cell Dendritic Fields in Old-World Monkeys are Oriented Radially", Brain Research, vol. 368, Mar. 1986, pp. 18-23.
Seidemann et al., "Effects of Longitudinal Chromatic Aberration on Accommodation and Emmetropization", Vision Research, vol. 42, No. 21, Sep. 2002, pp. 2409-2417.
Si et al., "Orthokeratology for Myopia Control: A Meta-Analysis", Optometry and Vision Science, vol. 92, No. 3, Mar. 2015, pp. 252-257.
Smith et al., "Peripheral Vision Can Influence Eye Growth and Refractive Development in Infant Monkeys", Investigative Ophthalmology & Visual Science, vol. 46, No. 11, Nov. 2005, 16 Pages.
Suchkov et al., "Impact of Longitudinal Chromatic Aberration on Through-focus Visual Acuity", Optics Express, vol. 27, No. 24, Nov. 25, 2019, pp. 35935-35947.
Swiatczak et al., "Myopia: Why the Retina Stops Inhibiting Eye Growth", Scientific Reports, vol. 12, Dec. 15, 2022, pp. 1-9.
Tedja et al., "IMI—Myopia Genetics Report", Investigative Ophthalmology & Visual Science, vol. 60, No. 3, Feb. 2019, pp. M89-M105.
Troilo et al., "IMI—Report on Experimental Models of Emmetropization and Myopia", Investigative Ophthalmology & Visual Science, vol. 60, No. 3, Feb. 2019, pp. M31-M88.
Weeber et al., "Theoretical Performance of Intraocular Lenses Correcting Both Spherical and Chromatic Aberration", Journal of Refractive Surgery, vol. 28, No. 1, Jan. 2012, pp. 48-52.
Wildsoet et al., "IMI—Interventions for Controlling Myopia Onset and Progression Report", Investigative Ophthalmology & Visual Science, vol. 60, No. 3, Feb. 2019, pp. M106-M131.
Wolffsohn et al., "IMI—Clinical Myopia Control Trials and Instrumentation Report", Investigative Ophthalmology & Visual Science, vol. 60, No. 3, Feb. 2019, pp. M132-M160.
Wolffsohn et al., "IMI—Myopia Control Reports Overview and Introduction", Investigative Ophthalmology & Visual Science, vol. 60, No. 3, Feb. 2019, pp. M1-M19.
Xu et al., "Noninvasive Intratissue Refractive Index Shaping (IRIS) of the Cornea with Blue Femtosecond Laser Light", Investigative Ophthalmology & Visual Science, vol. 52, No. 11, Oct. 17, 2011, pp. 8148-8155.
Zheleznyak et al., "Optical and Neural Anisotropy in Peripheral Vision", Journal of Vision, vol. 16, No. 5, Mar. 2016, pp. 1-11.

\* cited by examiner

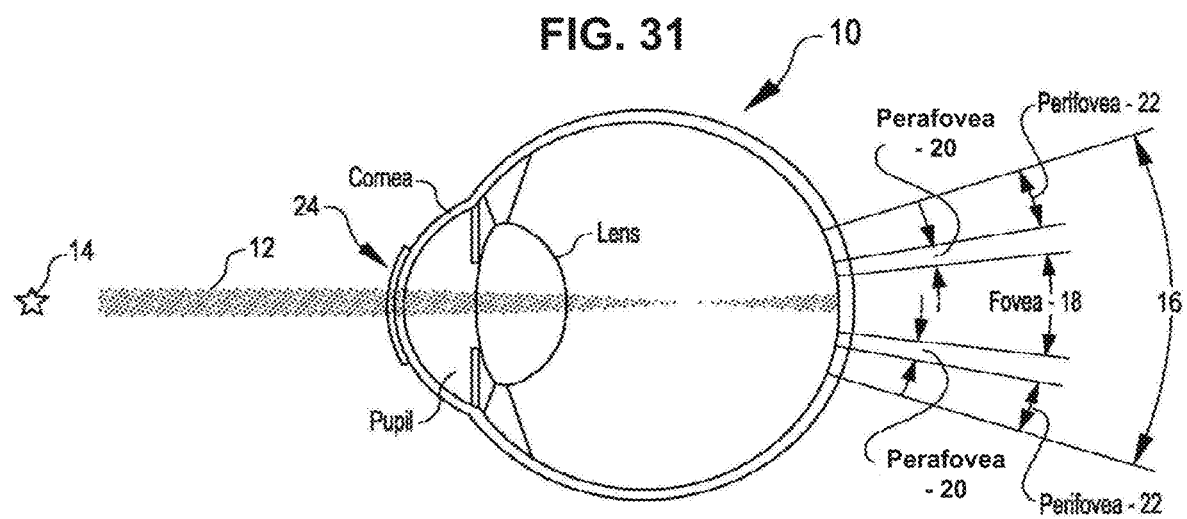
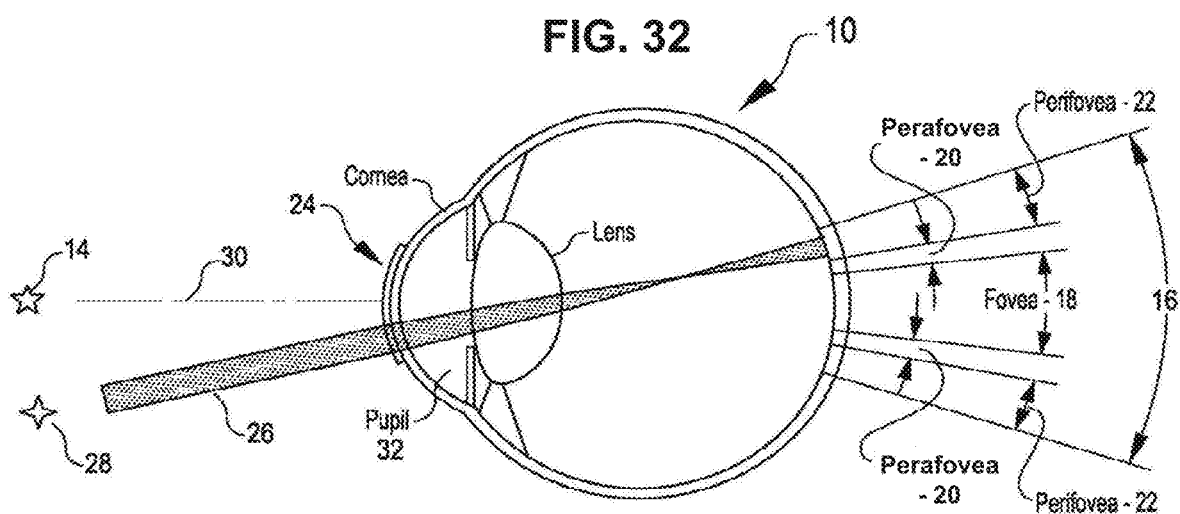

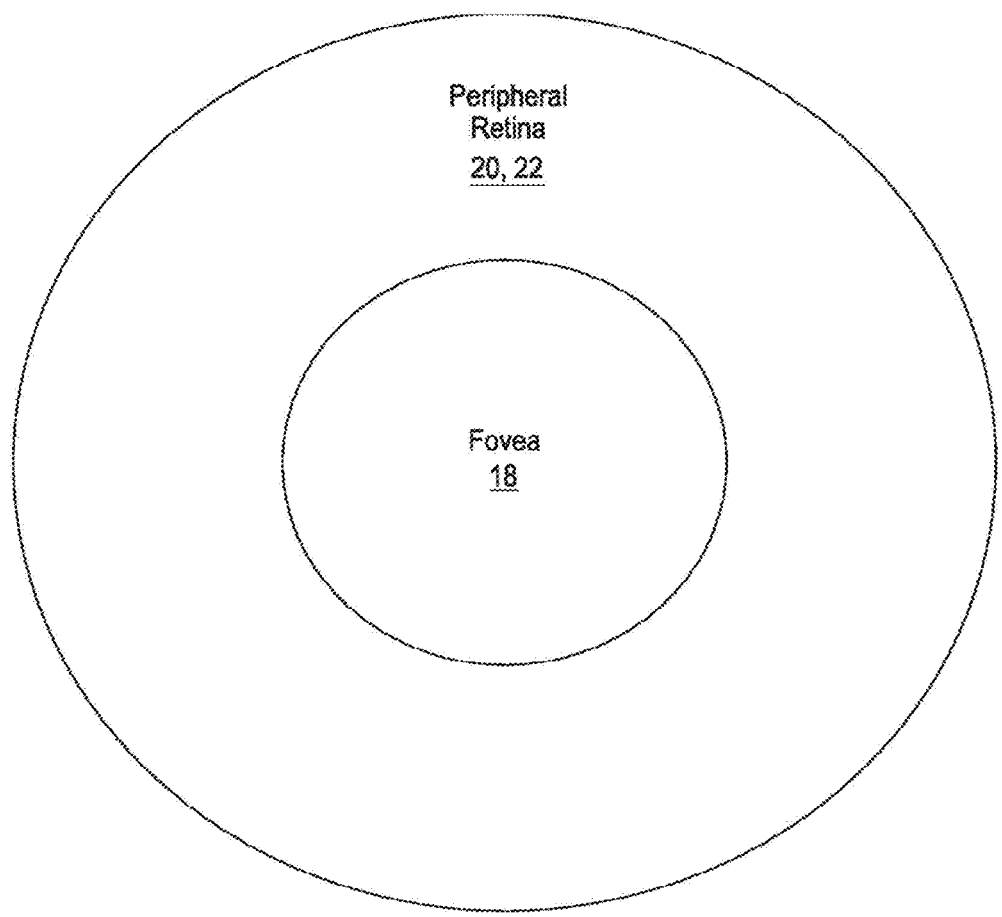

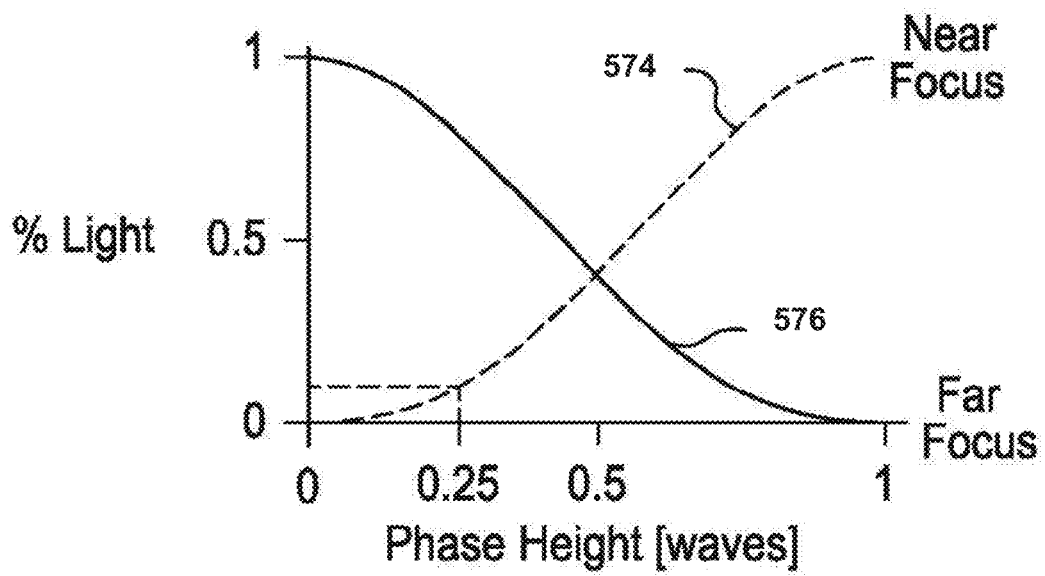
FIG. 48
FIG. 49
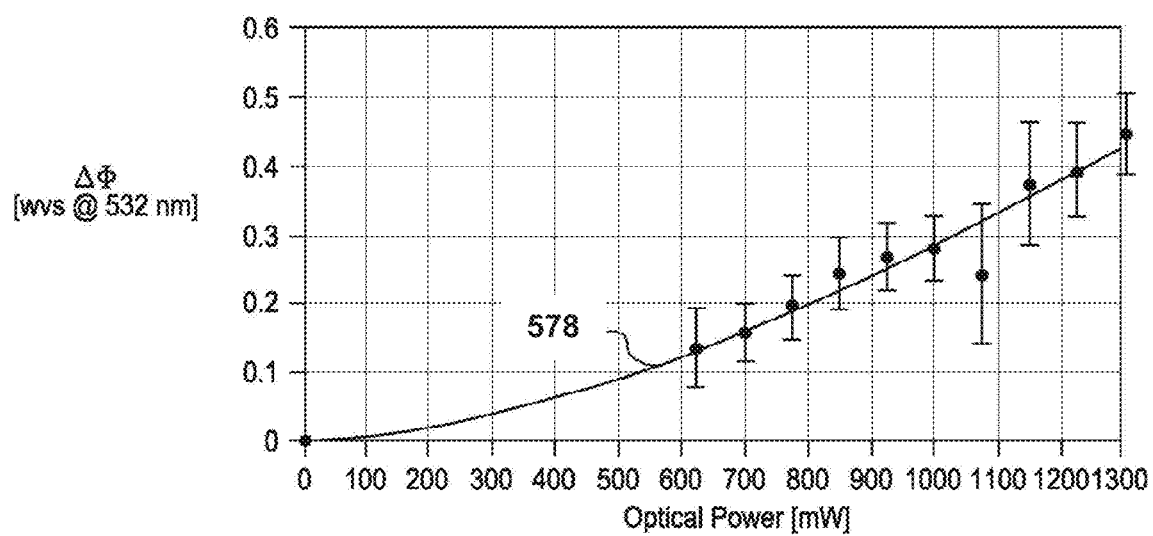

FIG. 53A
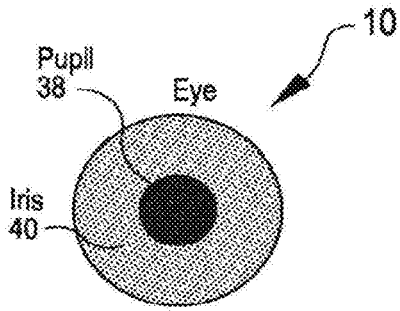
FIG. 53B
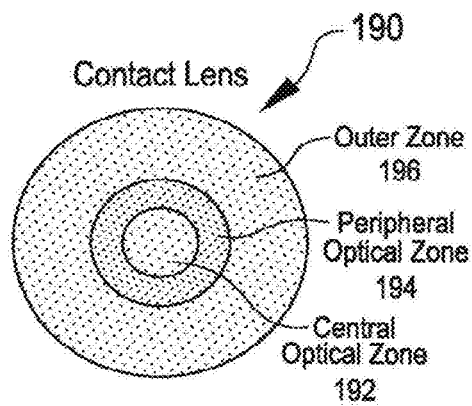
FIG. 53C
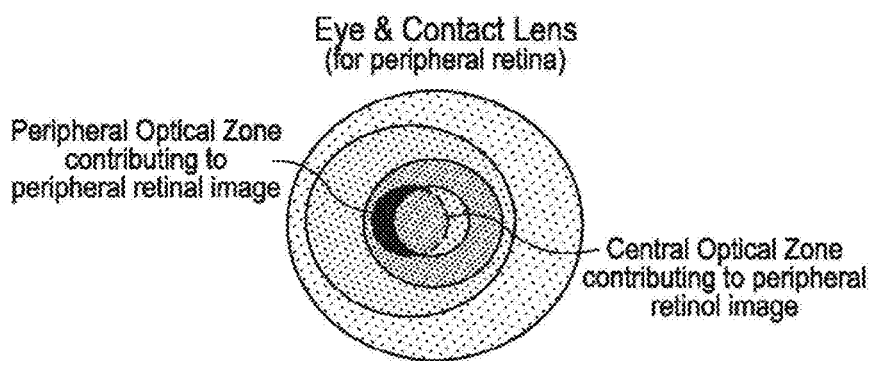
FIG. 54A
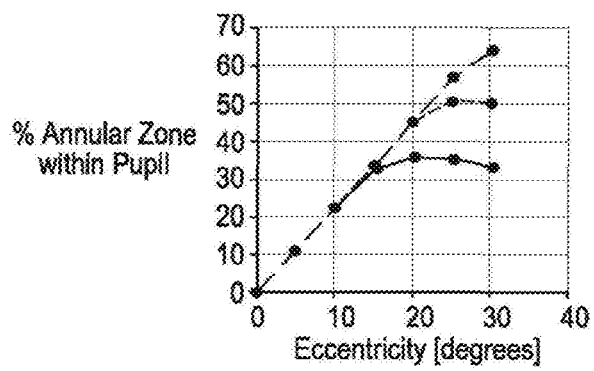

Average change in aberrations from 0 deg. To 20 deg. nasal retinal eccentricity

| 4mm Pupil n=10 | | | | | | | | | | | | |
|---|---|---|---|---|---|---|---|---|---|---|---|---|
| Astig. | Defocus | Astig. | Trefoil | Coma | Coma | Trefoil | Quasdraf. | | SA | | Quasdraf. |
| Z3 | Z4 | Z5 | Z6 | Z7 | Z8 | Z9 | Z10 | Z11 | Z12 | Z13 | Z14 |
| -0.072 | 0.264 | 0.419 | -0.004 | -0.011 | -0.110 | -0.028 | 0.001 | -0.006 | -0.007 | 0.004 | 0.002 |

FIG. 55

MYOPIA CONTROL TREATMENTS

CROSS REFERENCE TO RELATED APPLICATION DATA

The present application claims the benefit under 35 USC § 119(e) of U.S. Provisional Appln. Nos. 63/321,447 filed Mar. 18, 2022, and 63/397,128 filed Aug. 11, 2022; the full disclosures which are incorporated herein by reference in their entirety for all purposes.

BACKGROUND

Myopia (aka nearsightedness) is an optical condition where close objects are seen clearly, and distant objects appear blurry. Myopia can be caused by the eyeball that is excessively long and/or the cornea that is excessively curved so that the light from a distant object is focused in front of the retina.

Myopia is the most common form of impaired vision under the age 40. The prevalence of myopia is growing at an alarming rate. It is estimated that about 25 percent of people in the world in the year 2000 were myopic. It is projected that about 50 percent of the people in the world in the year 2050 will be myopic.

Typically, myopia develops during childhood due, at least in part, to eye growth that occurs during childhood, and progresses until about age 20. Myopia may also develop after childhood due to visual stress or health conditions such as diabetes.

A person with myopia has increased risk of other optical maladies. For example, a myopic person has significantly increased risk of developing cataracts, glaucoma, and retinal detachment. Additionally, many people with high myopia are not well-suited for LASIK or other laser refractive surgery.

BRIEF SUMMARY

The following presents a simplified summary of some embodiments of the invention to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments described herein are directed to ophthalmic lenses, and related methods, that modify images formed on the peripheral retina to inhibit progression of myopia. In many embodiments, an ophthalmic lens includes an annular zone configured to provide a myopia mitigating wavefront correction to light incident on the peripheral retina.

Thus, in one aspect, an ophthalmic lens is configured to inhibit progression of myopia in a user having a retina including a central retina and a peripheral retina. The ophthalmic lens includes a central zone and an annular zone surrounding the central zone. The annular zone includes a first annular sector configured to provide a first myopia inhibiting wavefront correction to light from a first peripheral vision region of a peripheral visual field of the user. The first annular sector is configured so that light from the first peripheral vision region passes through the first annular sector to form an image of the first peripheral vision region on a first annular region of the peripheral retina. The first myopia inhibiting wavefront correction is configured to reduce a first circumferential-to-radial aspect ratio of the image of the first peripheral vision region. The first circumferential-to-radial aspect ratio is defined as a circumferential length of the image of the first peripheral vision region in a first circumferential direction of the retina divided by a radial length of the image of the first peripheral vision region in a first radial direction of the peripheral retina. In many embodiments of the ophthalmic lens, the first annular sector is disposed on an opposite side of the eye relative to the first annular region of the peripheral retina.

In many embodiments of the ophthalmic lens, the first myopia inhibiting wavefront correction includes a positive sphere correction to the light from the first peripheral vision region that passes through the first annular sector and forms the image of the first peripheral vision region on the first annular region of the peripheral retina. The first myopia inhibiting wavefront correction can include any suitable positive sphere correction (e.g., at least 0.5 diopter, 1.0 diopter, 1.25 diopter, 1.5 diopter, in a range from 0.5 diopter to 2.5 diopter) to the light from the first peripheral vision region that passes through the first annular sector and forms the image of the first peripheral vision region on the first annular region of the peripheral retina.

In many embodiments, the ophthalmic lens further includes an annular transition zone disposed between the central zone and the annular zone. The central zone can be configured to provide an on-axis wavefront correction to the central retina. The annular transition zone can be configured to provide an annular transition zone wavefront correction that transitions from the on-axis wavefront correction provided by the central zone to the first myopia inhibiting wavefront correction provided by the first annular sector.

In many embodiments of the ophthalmic lens, the annular zone includes a first radial treatment zone and a second radial treatment zone. The first radial treatment zone surrounds the central zone and can be configured to provide a first radial treatment zone myopia inhibiting wavefront correction for a first annular portion of the peripheral retina. The second radial treatment zone surrounds the first radial treatment zone and can be configured to provide a second radial treatment zone myopia inhibiting wavefront correction for a second annular portion of the peripheral retina that surrounds the first annular portion of the peripheral retina.

In many embodiments of the ophthalmic lens, the annular zone includes a first treatment type zone and a second treatment type zone. The first treatment type zone is configured to increase contrast in the peripheral retina. The second treatment type zone is configured to decrease contrast in the peripheral retina. The second treatment type zone can be configured to induce scatter. The second treatment type zone can include optical elements that form defocus elements. Each of the defocus elements can have a diameter in a range from 0.1 to 1.0 mm and a power in a range from 1.0 to 3.0 diopters of defocus. The defocus elements can be arranged in a pattern with an inter-element spacing in a range from 0.1 to 1.0 mm. The second treatment type zone can include random subsurface optical elements configured to induce scatter. The random subsurface optical elements can be configured to induce a range of wavefront corrections between 0.1 and 1.0 waves at 550 nm wavelength.

In many embodiments, the ophthalmic lens includes a myopia inhibiting compound incorporated to provide for release into an eye of the user over time. In some embodiments of the ophthalmic lens, the myopia inhibiting compound includes atropine.

In some embodiments, the ophthalmic lens has an external shape that produces the first myopia inhibiting wavefront correction. For example, exterior surfaces of the first annular sector can be shaped to produce the first myopia inhibiting wavefront correction. An optical phase height of the first myopia inhibiting wavefront correction can vary in magnitude in a circumferential direction of the ophthalmic lens. A thickness of the first annular sector can vary in a first circumferential direction of the ophthalmic lens. The optical phase height of the first myopia inhibiting wavefront correction can have a maximum absolute height in a central portion of the first annular sector. The optical phase height of the first myopia inhibiting wavefront correction can vary in a first radial direction of the ophthalmic lens.

In some embodiments, the first myopia inhibiting wavefront correction is provided by a combination of the external shape of the ophthalmic lens and subsurface optical elements formed within the ophthalmic lens. For example, exterior surfaces of the first annular sector can be shaped to produce a first portion of the first myopia inhibiting wavefront correction. The first annular sector can include subsurface refractive index variations configured to produce a second portion of the first myopia inhibiting wavefront correction.

In many embodiments of the ophthalmic lens, the first myopia inhibiting wavefront correction is provided by subsurface refractive index variations formed within the ophthalmic lens. The subsurface refractive index variations can be formed via laser-induced changes in refractive index within the first annular sector.

The first myopia inhibiting wavefront correction can have any suitable configuration. For example, the first myopia inhibiting wavefront correction can have a phase-wrapped configuration equivalent to a non-phase-wrapped configuration of the first myopia inhibiting wavefront correction. An optical phase height of the non-phase-wrapped configuration of the first myopia inhibiting wavefront correction can vary in a circumferential direction of the ophthalmic lens. The optical phase height of the non-phase-wrapped configuration of the first myopia inhibiting wavefront correction can have a maximum absolute height in a central portion of the first annular sector. The optical phase height of the non-phase-wrapped configuration of the first myopia inhibiting wavefront correction can vary in a radial direction of the ophthalmic lens.

In many embodiments of the ophthalmic lens, the annular zone of the ophthalmic lens includes a plurality of annular sectors, wherein each of the plurality of annular sectors is configured to provide a respective myopia inhibiting wavefront correction to a respective annular sector of a peripheral retina. The plurality of annular sectors can include any suitable number of annular sectors (e.g., 2, 3, 4, 5, 6, 7, 8, or more). For example, the annular zone can include a second annular sector and a third annular sector. The second annular sector can be configured to provide a second myopia inhibiting wavefront correction to light from a second peripheral vision region of the peripheral visual field. The second annular sector can be configured so that light from the second peripheral vision region passes through the second annular sector to form an image of the second peripheral vision region on a second annular region of the peripheral retina. The second myopia inhibiting wavefront correction can be configured to reduce a second circumferential-to-radial aspect ratio of the image of the second peripheral vision region. The second circumferential-to-radial aspect ratio can be defined as a circumferential length of the image of the second peripheral vision region in a second circumferential direction of the retina divided by a radial length of the image of the second peripheral vision region in a second radial direction of the peripheral retina. The third annular sector can be configured to provide a third myopia inhibiting wavefront correction to light from a third peripheral vision region of the peripheral visual field. The third annular sector can be configured so that light from the third peripheral vision region passes through the third annular sector to form an image of the third peripheral vision region on a third annular region of the peripheral retina. The third myopia inhibiting wavefront correction can be configured to reduce a third circumferential-to-radial aspect ratio of the image of the third peripheral vision region. The third circumferential-to-radial aspect ratio can be defined as a circumferential length of the image of the third peripheral vision region in a third circumferential direction of the retina divided by a radial length of the image of the third peripheral vision region in a third radial direction of the peripheral retina. The first, second, and third myopia inhibiting wavefront corrections can be the same or have any suitable variation to account for measured optical aberrations of the user's eye. The first annular sector can be disposed on an opposite side of the eye relative to the first annular region of the peripheral retina. The second annular sector can be disposed on an opposite side of the eye relative to the second annular region of the peripheral retina. The third annular sector can be disposed on an opposite side of the eye relative to the third annular region of the peripheral retina.

In many embodiments of the ophthalmic lens, each of the first, second, and third myopia inhibiting wavefront corrections includes a positive sphere correction to the light from the respective peripheral vision regions that passes through the respective annular sector and forms the image of the respective peripheral vision region on the respective annular region of the peripheral retina. Each of the first, second, and third myopia inhibiting wavefront corrections can include any suitable positive sphere correction (e.g., at least 0.5 diopter, 1.0 diopter, 1.25 diopter, 1.5 diopter, in a range from 0.5 diopter to 2.5 diopter) to the light from the respective peripheral vision region that passes through the respective annular sector and forms the image of the respective peripheral vision region on the respective annular region of the peripheral retina.

In some embodiments, the ophthalmic lens has an external shape that produces each of the first, second, and third myopia inhibiting wavefront corrections. For example, exterior surfaces of each of the first, second, and third annular sectors can be shaped to produce the first second, and third myopia inhibiting wavefront corrections, respectively. An optical phase height of each of the first, second, and third myopia inhibiting wavefront corrections can vary in a respective circumferential direction of the ophthalmic lens. A respective thickness of each of the first, second, and third annular sectors can vary in a respective circumferential direction of the ophthalmic lens. A respective optical phase height of each of the first, second, and third myopia inhibiting wavefront corrections can have a respective maximum absolute height in a central portion of the respective annular sector. The respective optical phase height of each of the first, second, and third myopia inhibiting wavefront corrections can vary in a respective radial direction of the ophthalmic lens.

In some embodiments, each of the first, second, and third myopia inhibiting wavefront corrections is provided by a combination of the external shape of the ophthalmic lens and subsurface refractive index variations formed within the ophthalmic lens. For example, exterior surfaces of each of the respective annular sectors can be shaped to produce a respective first portion of the respective myopia inhibiting wavefront correction. Each of the first, second, and third annular sectors can include subsurface refractive index variations within the respective annular sector. The subsurface refractive index variations within each of the first, second, and third annular sectors can be configured to produce a respective second portion of the respective myopia inhibiting wavefront correction.

In many embodiments of the ophthalmic lens, each of the first, second, and third myopia inhibiting wavefront corrections is provided by subsurface refractive index variations formed within the ophthalmic lens. For example, each of the first, second, and third annular sectors can include subsurface refractive index variations formed via laser-induced changes in refractive index within the respective annular sector.

Each of the first, second, and third myopia inhibiting wavefront corrections can have any suitable configuration. For example, each of the first, second, and third myopia inhibiting wavefront corrections can have a phase-wrapped configuration equivalent to a non-phase-wrapped configuration of the respective myopia inhibiting wavefront correction. An optical phase height of the respective non-phase-wrapped configuration of each of the first, second, and third myopia inhibiting wavefront corrections can vary in a respective circumferential direction of the ophthalmic lens. The optical phase height of the respective non-phase-wrapped configuration of each of the first, second, and third myopia inhibiting wavefront corrections can have a maximum absolute height in a respective central portion of the respective annular sector. The optical phase height of the respective non-phase-wrapped configuration of each of the first, second, and third myopia inhibiting wavefront correction can vary in a respective radial direction of the ophthalmic lens.

The ophthalmic lens can be configured as any suitable type of ophthalmic lens. For example, the ophthalmic lens can be configured as a contact lens, an intraocular lens, a corneal inlay, or a corneal onlay.

In another aspect, a method is provided for inhibiting progression of myopia in an eye having a retina that includes a central retina and a peripheral retina. The method includes applying a first myopia inhibiting wavefront correction, by a first annular sector of an ophthalmic lens, to light from a first peripheral vision region of a peripheral visual field of a user of the ophthalmic lens. The first annular sector is configured so that light from the first peripheral vision region passes through the first annular sector to form an image of the first peripheral vision region on a first annular region of the peripheral retina. The first myopia inhibiting wavefront correction is configured to reduce a first circumferential-to-radial aspect ratio of the image of the first peripheral vision region. The first circumferential-to-radial aspect ratio is defined as a circumferential length of the image of the first peripheral vision region in a first circumferential direction of the retina divided by a radial length of the image of the first peripheral vision region in a first radial direction of the peripheral retina. In many embodiments of the method, the first annular sector is disposed on an opposite side of the eye relative to the first annular region of the peripheral retina.

The method of inhibiting progression of myopia can be practiced using any suitable ophthalmic lens. For, example, the method can be practiced using an ophthalmic lens described herein. The method can also be practiced via modification of a native lens of an eye, such as the cornea or native lens. For example, the method can further include modifying a first annular sector of the cornea to configure the first annular sector of the cornea to apply the first myopia inhibiting wavefront correction to the light from the first peripheral vision region of the peripheral visual field. The exterior side of the first annular sector of the cornea can be reshaped using laser ablation and/or subsurface refractive index variations can be formed within the first annular sector of the cornea using the approaches described herein. As another example, the method can include modifying a first annular sector of a native lens of the eye to configure the first annular sector of the native lens to apply the first myopia inhibiting wavefront correction to the light from the first peripheral vision region of the peripheral visual field. The native lens can be modified to form subsurface refractive index variations within the native lens using the approaches described herein.

For a fuller understanding of the nature and advantages of the present invention, reference should be made to the ensuing detailed description and accompanying drawings.

BRIEF DESCRIPTION OF THE DRAWINGS

FIG. 31 shows a cross-sectional view of an eye that illustrates transmission of light from an object located in the center of a field of view, through a central zone of an ophthalmic lens, to the fovea.

FIG. 32 shows a cross-sectional view of an eye that illustrates transmission of light from an object located in the periphery of a field of view, through an annular zone of an ophthalmic lens, to the perifovea.

FIG. 40A is a simplified schematic drawing showing regions of a retina.

FIG. 48 graphically illustrates diffraction efficiency for near focus and far focus versus phase height.

FIG. 49 graphically illustrates an example calibration curve for resulting phase change height as a function of laser pulse train optical power.

FIG. 53A, FIG. 53B, and FIG. 53C illustrate transmission of light onto a portion of the peripheral retina via central and peripheral zones of an ophthalmic lens.

FIG. 54A and FIG. 54B illustrate relative coverage of an example pupil by example annular zones of an ophthalmic lens for different viewing angle eccentricities.

FIG. 55 shows example average changes in optical aberrations from 0 degree to 20 degree retinal eccentricity for a group of 10 individuals.

DETAILED DESCRIPTION

Figure 1:
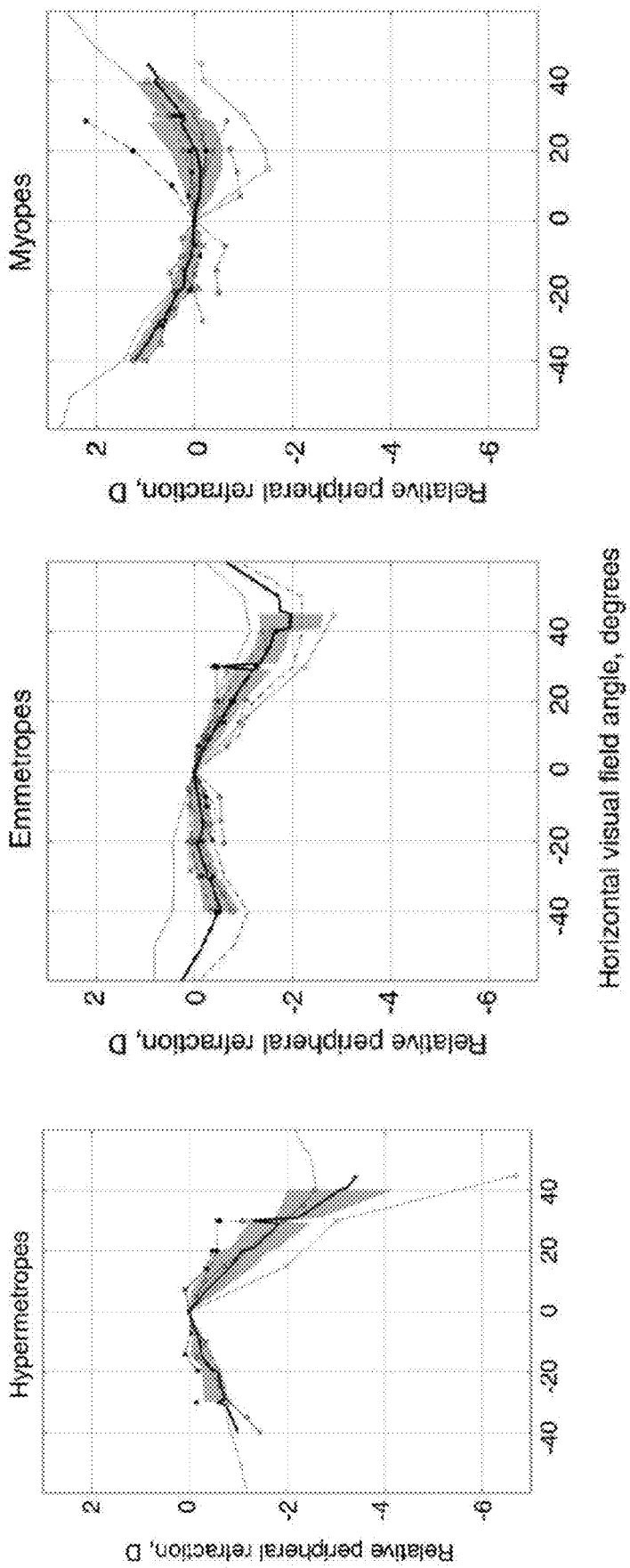
FIG. 1 shows plots of relative peripheral refraction for hyperopes, emmetropes, and myopes.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Anisotropy of Images Formed in the Peripheral Retina

As described herein, analysis of published refractive error data (Romashchenko, D, R. Rosen, and L. Lundstrom. "Peripheral refraction and higher order aberrations." *Clinical and Experimental Optometry* 103.1 (2020): 86-94) indicates that image blur in the peripheral retina varies remarkably between individuals with respect to their refractive states. Furthermore, the sign and shape of peripheral image blur may provide a cue for the sign of defocus, and hence may play a role in accommodation and emmetropization. The analysis of the published refractive data [Romashchenko et al. 2020] included calculation of through-focus image quality and assessment of how the through-focus image quality depends on the eye's refractive error.

Zernike coefficients across retinal eccentricity (0, 10, 20 and 30 deg horizontal visual field) from the published refractive data [Romashchenko et al. 2020] were used to compute the monochromatic modulation transfer function (MTF) at 555 nm for a 4 mm pupil. Two-dimensional MTF was computed through-focus, from −3 to +3 D in 0.1 D steps at each eccentricity and used to define two metrics of image quality: (1) overall image quality defined as the volume under the MTF (vMTF), and (2) image blur anisotropy defined as the ratio of the horizontal to vertical meridians of the MTF (HVRatio).

The analysis of the published refractive data [Romashchenko et al. 2020] revealed some correlations that may be of particular interest with respect to inhibiting myopia progression. Across the horizontal visual field (at 10, 20, 30 deg), through-focus vMTF revealed best focus (max vMTF) close to the retina in emmetropes (−0.3, −0.3, 0.0 D, respectively), as opposed to myopes whose best focus was behind the retina (−0.1, 0.4, 1.5 D, respectively) and hyperopes in front of the retina (−0.5, −0.6, −0.6 D). At 0.0 D (on the retina), emmetropes and hyperopes both exhibited radially elongated image blur, whereas myopes had circumferentially elongated image blur (HVRatio=0.3, 0.7 and 2.8, respectively, at 30 deg eccentricity). In all groups, peak vMTF (best focus) coincided with radially elongated image blur.

It is believed that certain conclusions may be warranted in view of the analysis of the published refractive data [Romashchenko et al. 2020] with respect to possible approaches for inhibiting myopia progression. Specifically, it appears that image blur in the peripheral retina is dominated by so-called "odd-error" image blur signals, primarily due to oblique astigmatism. Thus, orientation of peripheral image blur (radial vs circumferential) may provide the eye with an optical cue for the sign of defocus and may play a role in mechanisms of accommodation and emmetropization. All subject groups in the published refractive data [Romashchenko et al. 2020] had anisotropic image blur in the periphery with myopes having a circumferentially elongated peripheral image blur and emmetropes and hyperopes having radial image blur.

The analysis of the published refractive data [Romashchenko et al. 2020] included wavefront calculation for 2492 subjects at 0, 10, 20, and 30 degrees nasal retina. The wavefront calculation was performed using Zernike data from the published refractive data [Romashchenko et al. 2020] and Matlab with 550 nm wavelength, pupil function: m=400, 8×8 mm, and a 4 mm pupil.

The analysis of the published refractive data [Romashchenko et al. 2020] included four steps. In step 1, the average relative peripheral refraction [diopters] for emmetropes, myopes, and hyperopes listed in Table 1 were obtained from FIG. 1 of Romashchenko et al. 2020 (reproduced herein in FIG. 1) for 0, 10, 20, and 30 degrees nasal retina.

TABLE 1

Average Relative Peripheral Refraction by Refractive Group

|  | 0 deg. | 10 deg. | 20 deg. | 30 deg. |
|---|---|---|---|---|
| Emmetropes | 0 | −0.35 | −0.78 | −1.25 |
| Myopes | 0 | −0.15 | −0.05 | 0.25 |
| Hyperopes | 0 | −0.53 | −1.10 | −1.93 |

In step 2, Zernike defocus (C (2,0) in microns) is calculated using equation (1).

$$M = -\frac{4\sqrt{3}}{r_{pupil}^2} C_2^0 + \frac{12\sqrt{5}}{r_{pupil}^2} C_4^0 \qquad \text{Equation (1)}$$

In equation (1), M is equal to the average relative peripheral refraction from Table 1 and C (4,0) is obtained from the published refractive data [Table 2 of Romashchenko et al. 2020]. Table 2 lists resulting calculated Zernike coefficients for Emmetropes for 0, 10, 20, and 30 degrees nasal retina and includes Zernike defocus Z4 (C (2,0) in microns). Table 3 lists resulting calculated Zernike coefficients for Myopes for 0, 10, 20, and 30 degrees nasal retina and includes Zernike defocus Z4 (C (2,0) in microns).

TABLE 2

Zernike coefficients for Emmetropes for 0, 10, 20, and 30 degrees Nasal Retina.
Emmetropes ave

|  |  | 0 deg | 10 deg | 20 deg | 30 deg |
|---|---|---|---|---|---|
|  | RPD [D] | 0 | −0.35 | −0.78 | −1.25 |
| Z3 | C(2, −2) | −0.038 | −0.057 | −0.047 | −0.126 |
| Z4 | C(2, 0) | 0.058 | 0.268 | 0.512 | 0.772 |
| Z5 | C(2, 2) | −0.03 | 0.07 | 0.296 | 0.823 |
| Z6 | C(3, −3) | −0.019 | −0.013 | −0.007 | 0.008 |
| Z7 | C(3, −1) | 0.007 | −0.003 | 0.001 | −0.001 |
| Z8 | C(3, 1) | −0.03 | −0.059 | −0.125 | −0.252 |
| Z9 | C(3, 3) | 0 | −0.007 | −0.018 | −0.054 |
| Z10 | C(4, −4) | 0.002 | 0.001 | 0.002 | 0.007 |
| Z11 | C(4, −2) | 0 | −0.001 | 0 | 0 |
| Z12 | C(4, 0) | 0.015 | 0.017 | 0.016 | 0.013 |
| Z13 | C(4, 2) | 0 | 0.001 | 0.002 | −0.001 |
| Z14 | C(4, 4) | 0.001 | 0.002 | 0.003 | −0.003 |

TABLE 3

Zernike coefficients for Myopes for 0, 10, 20, and 30 degrees Nasal Retina.
Myopes ave

|  |  | 0 deg | 10 deg | 20 deg | 30 deg |
|---|---|---|---|---|---|
|  | RPD [D] | 0 | −0.15 | −0.05 | 0.25 |
| Z3 | C(2, −2) | −0.038 | −0.057 | −0.047 | −0.126 |
| Z4 | C(2, 0) | 0.058 | 0.152 | 0.091 | −0.094 |
| Z5 | C(2, 2) | −0.03 | 0.07 | 0.296 | 0.823 |

TABLE 3-continued

Zernike coefficients for Myopes for 0, 10, 20, and 30 degrees Nasal Retina.

| | | Myopes ave | | | |
|---|---|---|---|---|---|
| | | 0 deg | 10 deg | 20 deg | 30 deg |
| Z6 | C(3, −3) | −0.019 | −0.013 | −0.007 | 0.008 |
| Z7 | C(3, −1) | 0.007 | −0.003 | 0.001 | −0.001 |
| Z8 | C(3, 1) | −0.03 | −0.059 | −0.125 | −0.252 |
| Z9 | C(3, 3) | 0 | −0.007 | −0.018 | −0.054 |
| Z10 | C(4, −4) | 0.002 | 0.001 | 0.002 | 0.007 |
| Z11 | C(4, −2) | 0 | −0.001 | 0 | 0 |
| Z12 | C(4, 0) | 0.015 | 0.017 | 0.016 | 0.013 |
| Z13 | C(4, 2) | 0 | 0.001 | 0.002 | −0.001 |
| Z14 | C(4, 4) | 0.001 | 0.002 | 0.003 | −0.003 |

Figure 2:
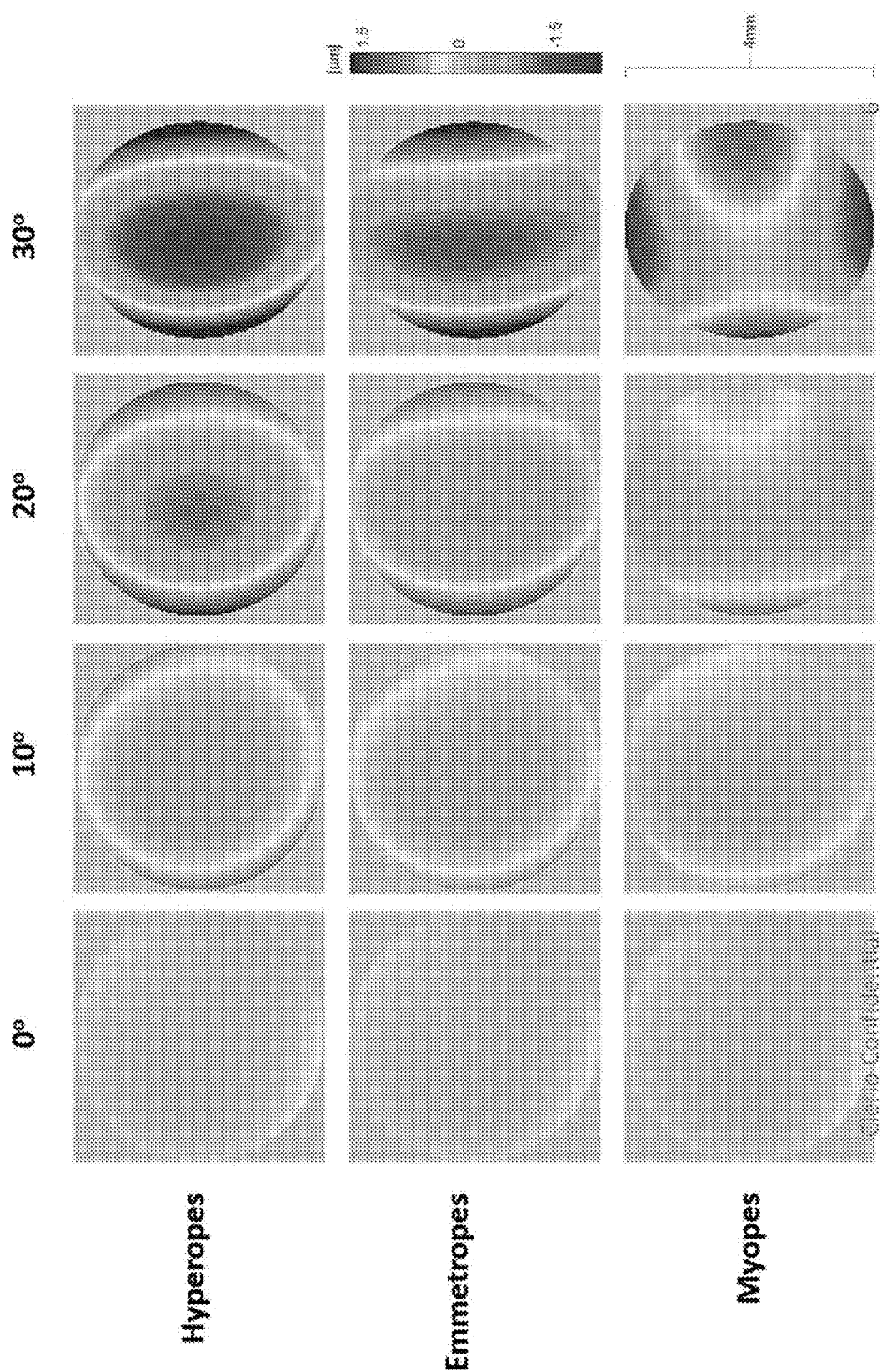
FIG. 2 illustrates wavefronts for 0, 10, 20, and 30 degrees nasal retina for hyperopes, emmetropes, and myopes.

In step 3, a wavefront for each of 0, 10, 20, and 30 degrees nasal retina is created for each of the population groups (i.e., Hyperopes, Emmetropes, and Myopes) using the Zernike coefficients up to and including the fourth order. Each of the wavefronts for 10, 20, and 30 degrees nasal retina is rescaled for a corresponding elliptical pupil. FIG. 2 illustrates the resulting rescaled wavefronts.

Figure 3:
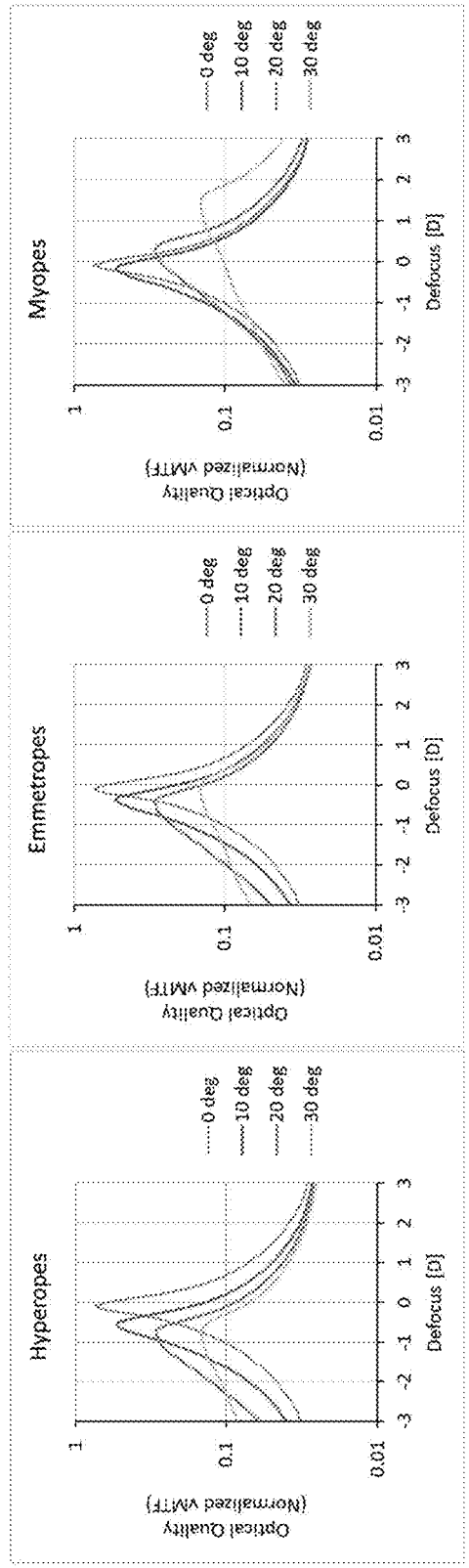
FIG. 3 shows plots of through-focus optical quality for 0, 10, 20, and 30 degrees nasal retina for hyperopes, emmetropes, and myopes.
Figure 4:
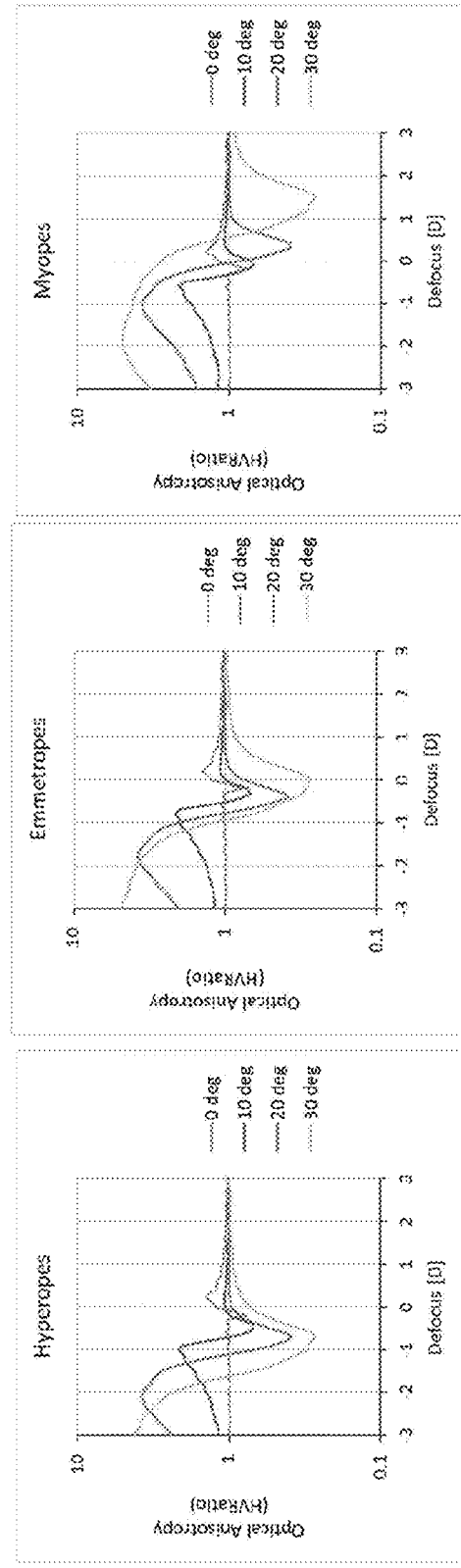
FIG. 4 shows plots of through-focus optical anisotropy for 0, 10, 20, and 30 degrees nasal retina for hyperopes, emmetropes, and myopes.
Figure 5:
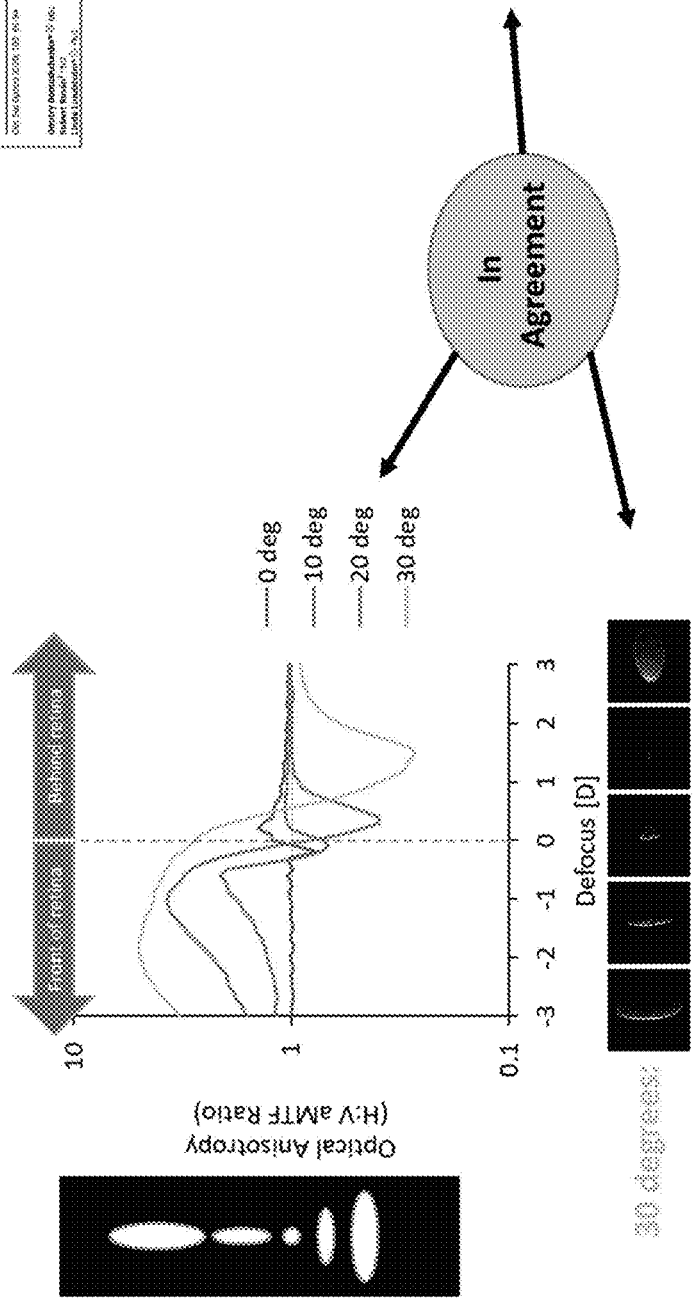
FIG. 5 illustrates sign conventions for the plots of optical anisotropy of FIG. 4.

In step 4, through-focus MTF is calculated for each of 0, 10, 20, and 30 degrees nasal retina for each of the population groups. FIG. 3 shows plots of optical quality (in the form of normalized vMTF) for each of 0, 10, 20, and 30 degrees nasal retina for each of the population groups. FIG. 4 shows plots of optical anisotropy (in the form of horizontal/vertical MTF ratio) for each of 0, 10, 20, and 30 degrees nasal retina for each of the population groups. FIG. 5 illustrates sign conventions for the plots of optical anisotropy of FIG. 4.

The analysis of the published refractive data [Romashchenko et al. 2020] supports several observations with potential applicability with respect to possible approaches for inhibiting myopia progression. Specifically, emmetropic eyes are typically well corrected across the visual field. Myopic eyes have relative hyperopia in the periphery. Emmetropic eyes have peripheral radial image blur. Myopic eyes have peripheral vertical image blur. Due to aberration interaction between astigmatism and coma, the peak of through-focus relative image quality (TF-RIQ) coincides with the most radial focus.

Figure 6:
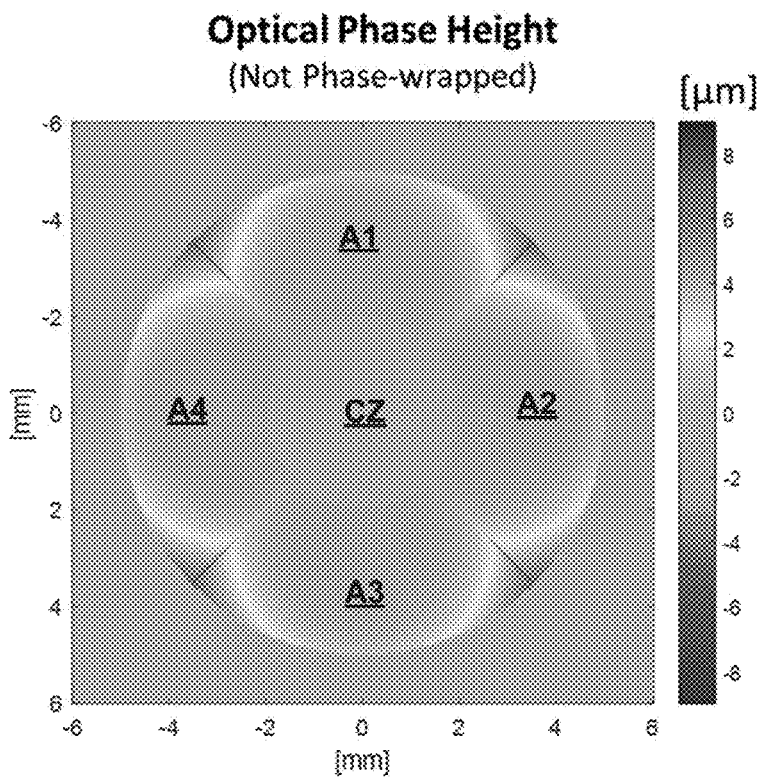
FIG. 6 shows a plot of optical phase height for annular sectors of a first example design of a myopic inhibiting ophthalmic lens for an example myopic eye, in accordance with embodiments.
Figure 7:
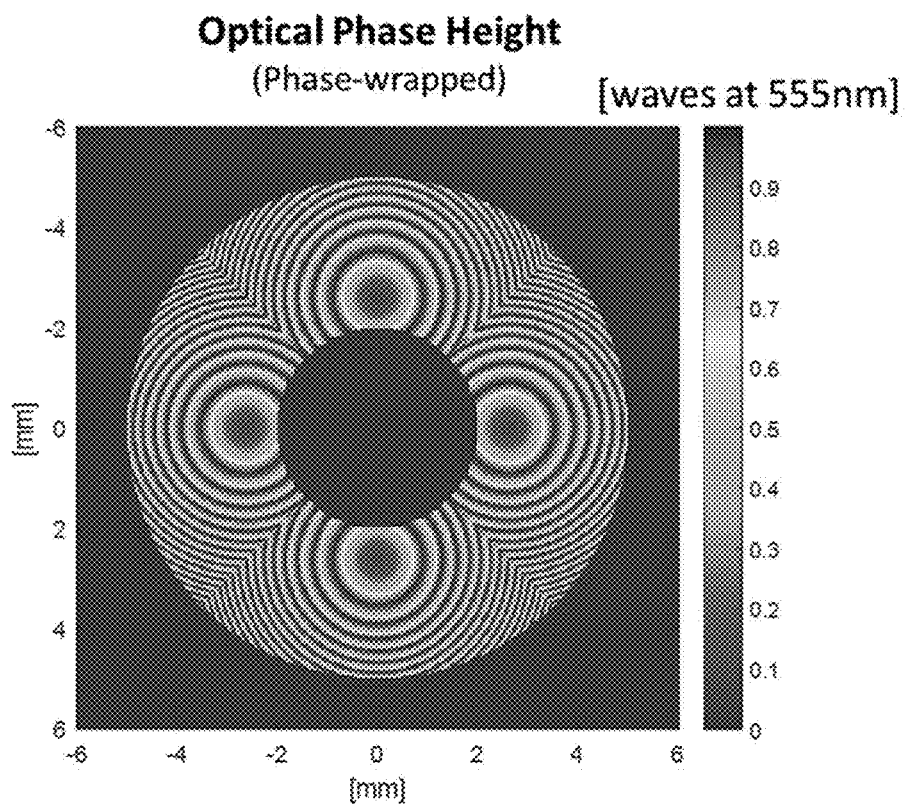
FIG. 7 shows a plot of optical phase in waves for a phase-wrapped configuration of the ophthalmic lens of FIG. 6.

Reduction of Circumferential-to-Radial Aspect Ratio of Images in the Peripheral Retina FIG. 6 shows a plot of optical phase height in four annular sectors A1, A2, A3, A4 of a first example design of a myopic inhibiting ophthalmic lens for an example myopic eye, in accordance with embodiments. In the first example design, the ophthalmic lens has a central zone CZ and the annular sectors A1, A2, A3, A4. The central zone CZ has a 4 mm outer diameter and the annular sectors A1, A2, A3, A4 form an annular zone that surrounds the central zone CZ and has a 10 mm outer diameter. Each of the annular sectors A1, A2, A3, A4 is configured to provide a respective positive sphere correction of 1.35 diopter to light passing through the annular sector to a respective annular sector of the peripheral retina. Each of the positive sphere corrections of 1.35 diopter reduces a circumferential-to-radial aspect ratio of an image formed on the respective oppositely disposed annular sector of the peripheral retina. FIG. 7 shows a plot of optical phase in waves for a phase-wrapped configuration of the first example design of FIG. 6.

The first example design can be implemented in an ophthalmic lens using any suitable approach including, but not limited to: (a) shaping exterior surfaces of each of the annular sectors A1, A2, A3, A4 to have a convex shaped configured to provide the respective positive sphere correction of 1.35 diopter to light passing through the annular sector to a respective oppositely disposed annular sector of the peripheral retina, (b) forming subsurface optical structures within each of the annular sectors A1, A2, A3, A4 (e.g., using the approaches described herein) so that the formed subsurface optical structures are configured to provide the respective positive sphere correction of 1.35 diopter to light passing through the annular sector to a respective oppositely disposed annular sector of the peripheral retina, and (c) a combination of (a) and (b) in which each approach provides a respective portion of the positive sphere corrections of 1.35 diopter provided by the annular sectors A1, A2, A3, A4.

Figure 8:
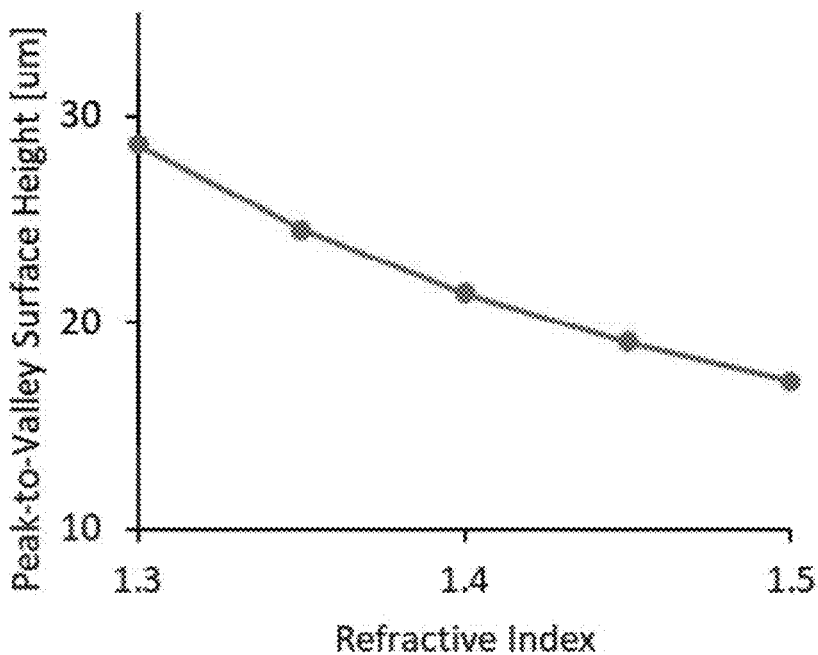
FIG. 8 shows a plot of variation of relative peak to valley surface height (within one of the annular sectors) with refractive index of the ophthalmic lens of FIG. 6.
Figure 9:
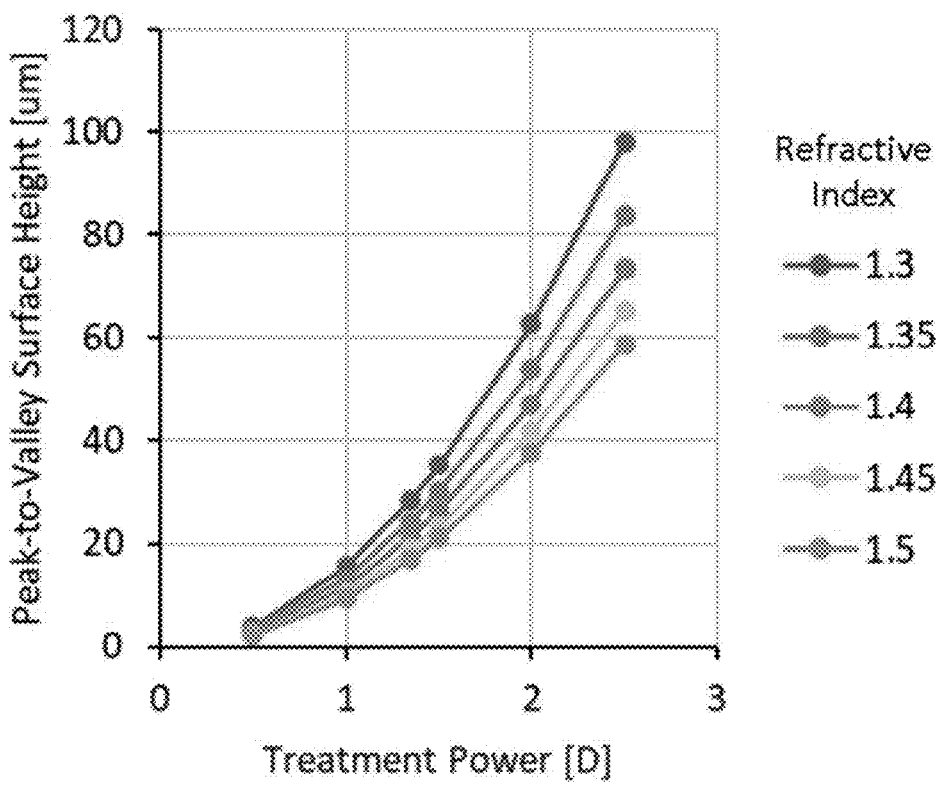
FIG. 9 shows a plot of variation of relative peak to valley surface height (within one of the annular sectors) with optical power of the annular sector and refractive index of the ophthalmic lens of FIG. 6.

In embodiments in which the first example design is implemented by shaping exterior surfaces of each of the annular sectors A1, A2, A3, A4 to have a convex shaped configured to provide the respective positive sphere correction of 1.35 diopter, the peak-to-valley surface height of each of the annular sectors A1, A2, A3, A4 is dependent on the refractive index of the material used to form the ophthalmic lens. FIG. 8 shows a plot of variation in relative of peak-to-valley surface height within each of the annular sectors A1, A2, A3, A4 of the ophthalmic lens of FIG. 6 with refractive index of the ophthalmic lens. The peak-to-valley surface height of each of the annular sectors A1, A2, A3, A4 is also dependent on magnitude of the positive sphere correction provided by each of the annular sectors A1, A2, A3, A4. FIG. 9 shows a plot of variation in peak-to-valley surface height within one of the annular sectors of the ophthalmic lens of FIG. 6 with the magnitude of the positive sphere correction provided by each of the annular sectors A1, A2, A3, A4 and the refractive index of the ophthalmic lens.

Each of the annular sectors A1, A2, A3, A4 in the first example design provide the same positive sphere 1.35 diopter correction. As a result of the spherical convergence of light passing through the annular sector to the oppositely disposed annular sector of the peripheral retina, the positive sphere 1.35 diopter correction will reduce the circumferential-to-radial aspect ratio of an image formed in the peripheral retina. Each annular sector, however, can be configured to provide any suitable positive sphere correction (e.g., in a range from 0.5 to 3.0 diopter, in a range from 1.0 to 2.0 diopter, in a range from 1.25 to 1.5 diopter).

Figure 10:
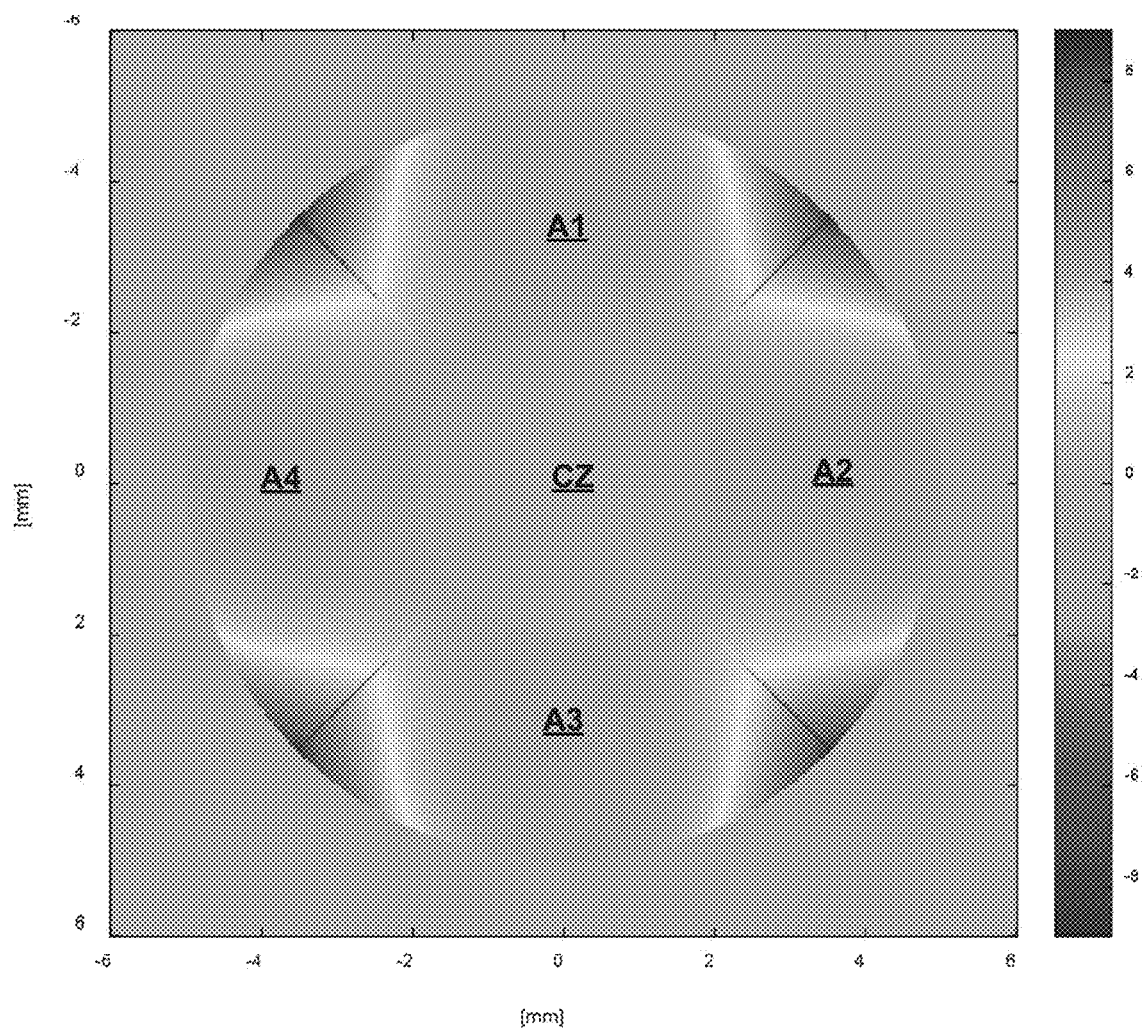
FIG. 10 shows a plot of optical phase height for annular sectors of a second example design of a myopic inhibiting ophthalmic lens for the example myopic eye, in accordance with embodiments.
Figure 11:
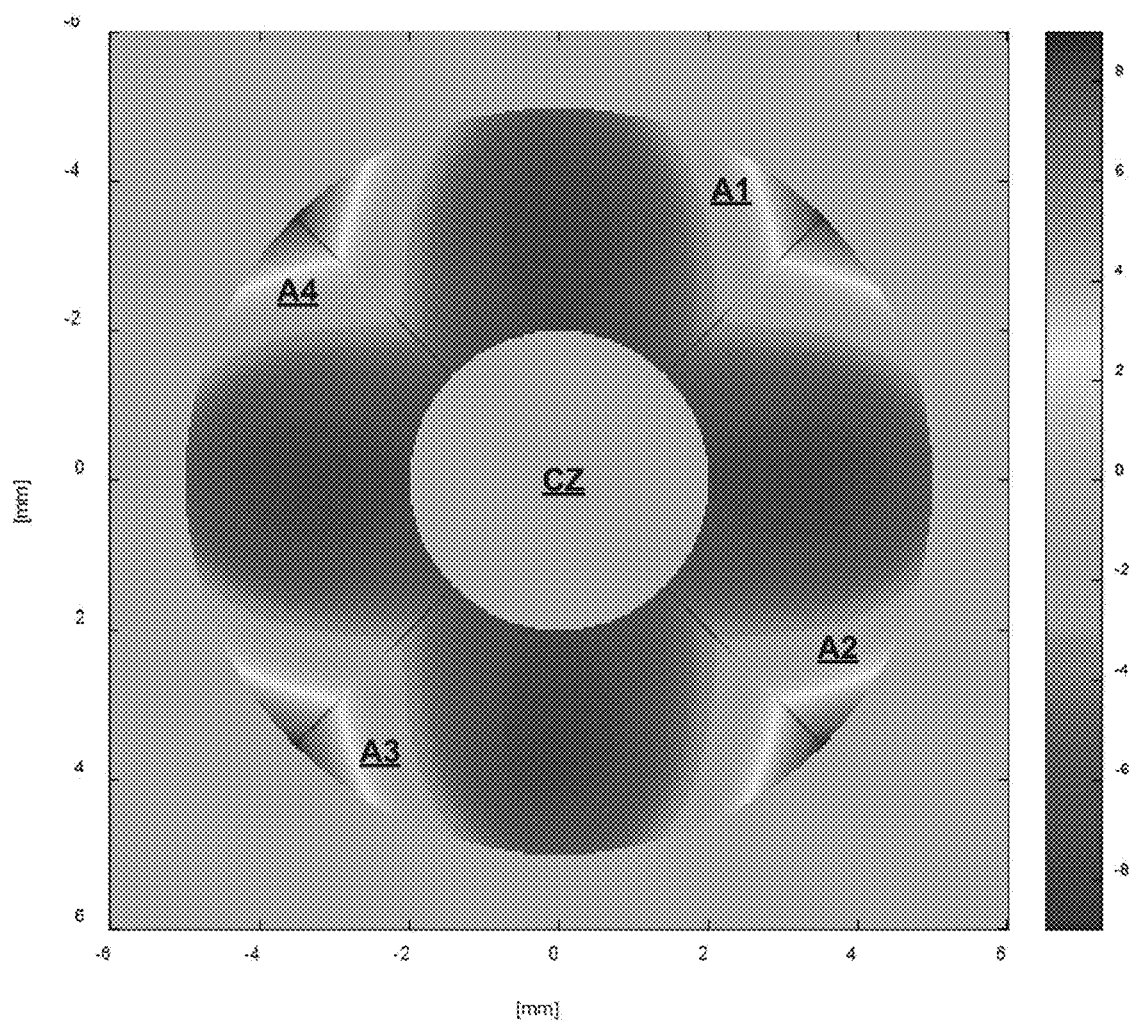
FIG. 11 shows a plot of optical phase height for annular sectors of a third example design of a myopic inhibiting ophthalmic lens for the example myopic eye, in accordance with embodiments.

The optical wavefront correction provided by each of the annular sectors A1, A2, A3, A4, however, can be customized based on the uncorrected wavefront for each respective oppositely disposed annular sector of the peripheral retina of the user of the ophthalmic lens. For example, each of the annular sectors A1, A2, A3, A4 can be configured to provide a wavefront correction that includes a customized positive sphere correction suitable for the corresponding oppositely disposed annular sector of the peripheral retina and/or so that the provided wavefront correction corrects a higher-order optical aberration of the uncorrected wavefront. FIG. 10 shows a plot of optical phase height for annular sectors of a second example design of a myopic inhibiting ophthalmic lens for the example myopic eye, in accordance with embodiments. Each of the annular sectors A1, A2, A3, A4 in the second example design is configured to provide a full optical correction to the light passing through the annular sector to fully focus the image formed on the oppositely disposed peripheral retina sector. FIG. 11 shows a plot of optical phase height for annular sectors of a third example design of a myopic inhibiting ophthalmic lens for the example myopic eye, in accordance with embodiments. Each of the annular sectors A1, A2, A3, A4 in the third example design is configured to provide an optical over-correction to the light passing through the annular sector to fully focus the image in front of the oppositely disposed peripheral retina sector. Focusing of the image in front of the peripheral retina may further inhibit myopia progression as described herein.

Evaluation of the first example design, the second example design, and the third example design showed that the first example design was significantly better than the second and third example designs. The first example design can be described as a 4 quadrant wavefront correction, with each treatment quadrant providing a positive 1.35 diopter sphere correction that is offset by 2.6 mm from the center of the lens. The central zone of the first example design is configured to provide a distance vision wavefront correction. The annular treatment zone has a 4 mm inner diameter and a 10 mm outer diameter. Suitable variations to the first example design can be employed. For example, any suitable variation in the magnitude of the positive sphere correction provided in each of the quadrants can be employed. As another example, the offset distance between the axis of the positive sphere correction provided by each of the annular sectors and the central optical axis of the ophthalmic lens can be selected to target a desired retinal eccentricity. For example, the 2.6 mm offset of the first example design corresponds to 30 degrees of retinal eccentricity. The offset can be increased to increase the targeted retinal eccentricity and decreased to decrease the targeted retinal eccentricity.

Figure 12:
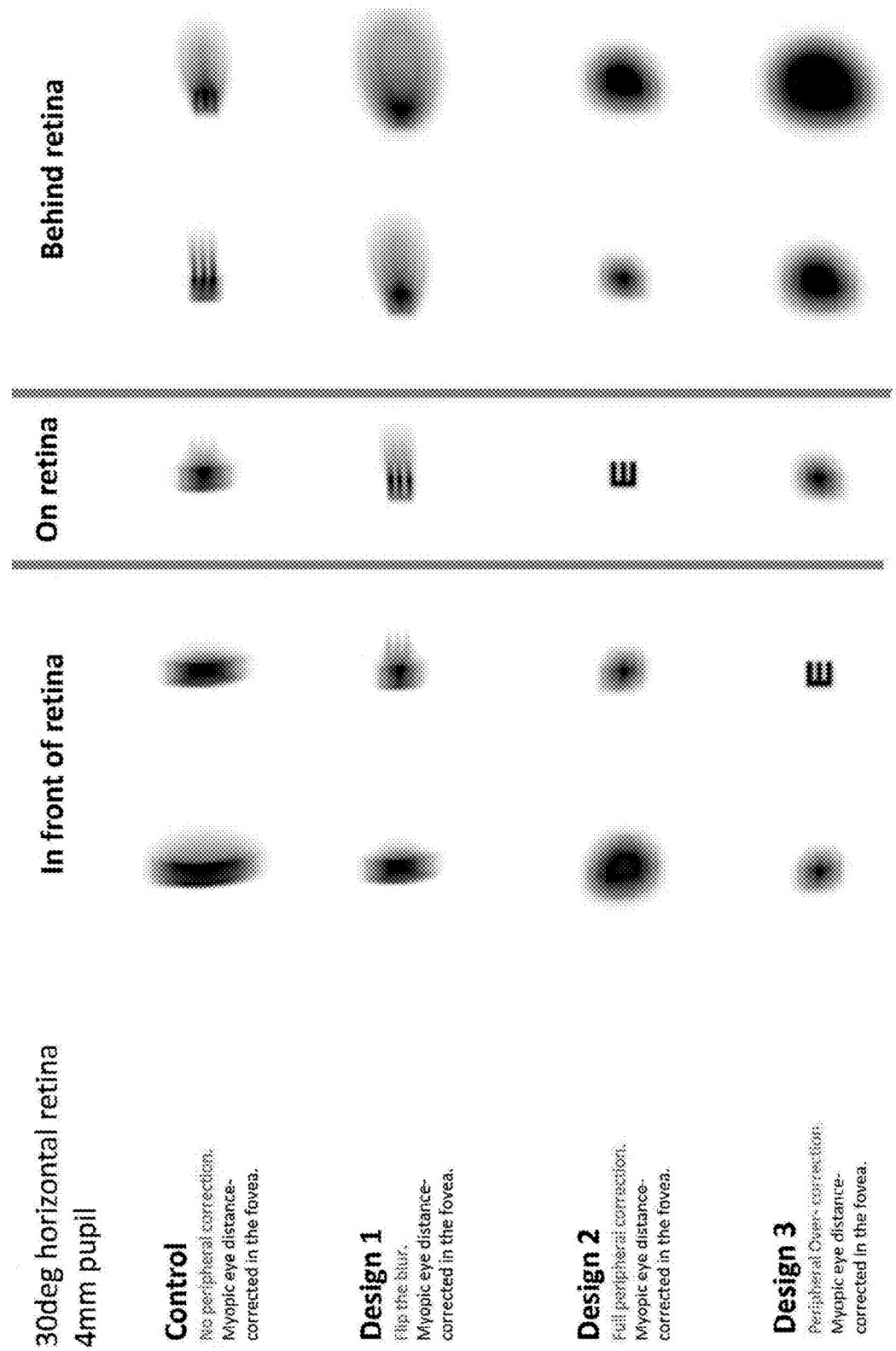
FIG. 12 illustrates resulting changes in an image of a peripheral vision region formed on the peripheral retina of the example myopic eye for the first example design of FIG. 6, the second example design of FIG. 10, and the third example design of FIG. 11.

FIG. 12 illustrates resulting changes in an image formed on the peripheral retina of the example myopic eye for the first example design of FIG. 6, the second example design of FIG. 10, and the third example design of FIG. 11 relative to the starting uncorrected circumferentially elongated image blur on the 30 degree horizontal retina of an example myopic eye. As shown, the starting uncorrected image formed on the 30 degree horizontal retina of the example myopic eye is vertically elongated and therefore circumferentially elongated on the 30 degree horizontal retina. Applying the first example design of FIG. 6, the resulting corrected image formed on the 30 degree horizontal retina is now somewhat horizontally elongated and therefore radially elongated on the 30 degree horizontal retina. As discussed herein, a radially elongated image formed on the peripheral retina may result in a reduced stimulus for myopia progression as compared to the stimulus for myopia progression resulting from a circumferentially elongated image formed on the peripheral retina. Applying the second example design of FIG. 10, the resulting corrected image formed on the 30 degree horizontal retina is no longer circumferentially elongated and is fully focused on the 30 degree horizontal retina. Applying the third example design of FIG. 11, the resulting corrected image formed on the 30 degree horizontal retina is no longer circumferentially elongated and is fully focused in front of the 30 degree horizontal retina.

Figure 13:
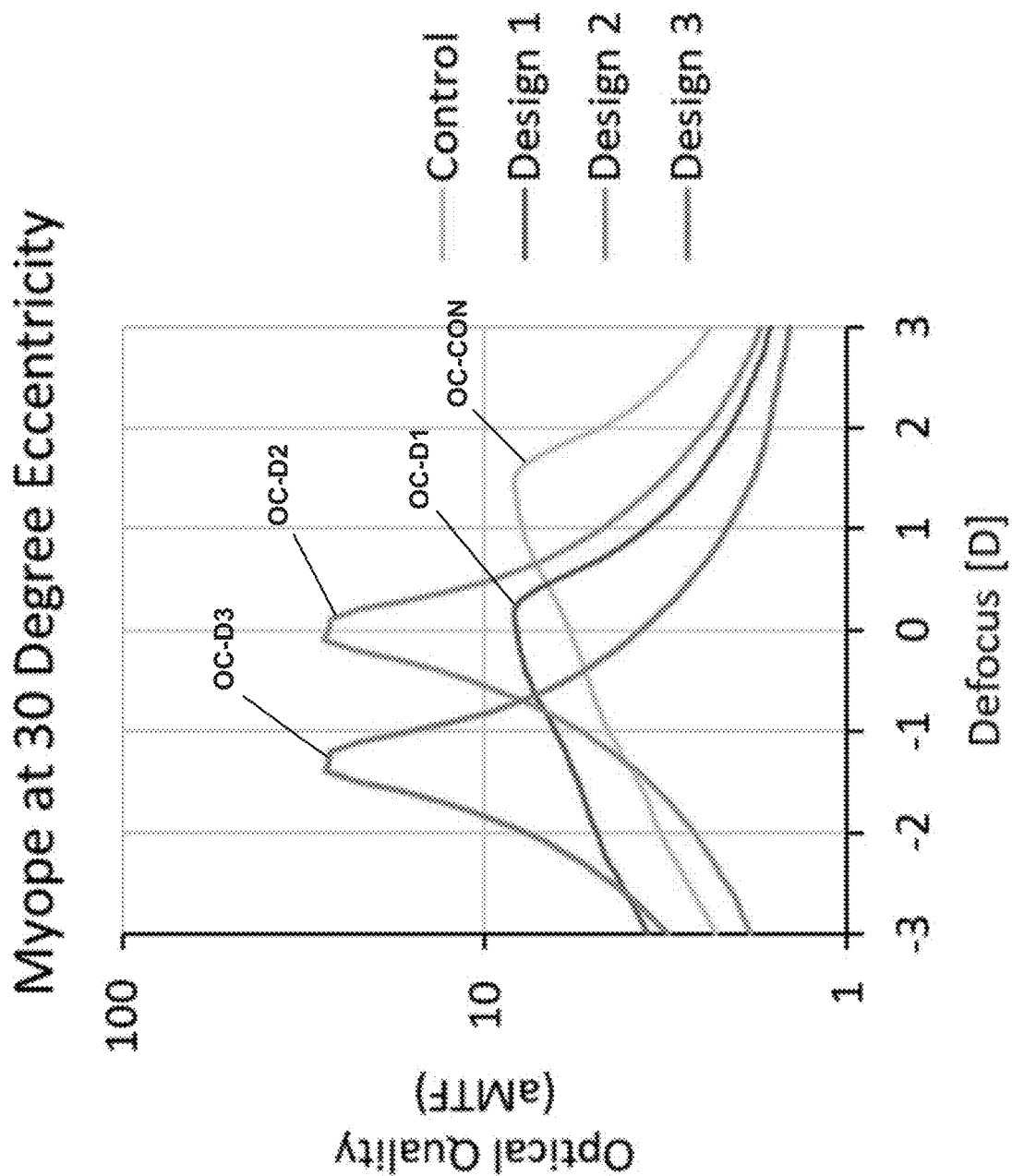
FIG. 13 shows plots of through-focus optical quality at 30-degree eccentricity for the example myopic eye (uncorrected), the example myopic eye with the first example design myopia inhibiting ophthalmic lens, the example myopic eye with the second example design myopia inhibiting ophthalmic lens, and the example myopic eye with the third example design myopia inhibiting ophthalmic lens.

FIG. 13 shows plots OC-CON, OC-D1, OC-D2, OC-D3 of through-focus optical quality at 30 degree eccentricity for the example myopic eye uncorrected, the example myopic eye with the first example design ophthalmic lens of FIG. 6, the example myopic eye with the second example design ophthalmic lens of FIG. 10, and the example myopic eye with the third example design ophthalmic lens of FIG. 11. While the second example design provides the best optical quality at zero defocus, the optical quality of the second example design is less than the optical quality of the first example design for defocus less than about −0.85 diopter. And while the third example design provides the best optical quality at about −1.3 diopter defocus, the optical quality provided by the third example design is less than the optical quality of both the first and second example designs for defocus greater than about −0.85 diopter. The variation in optical quality provided by each of the first, second, and third exampled designs can be accounted for when configuring each of the annular sectors A1, A2, A3, A4 to provide a suitable tradeoff between myopia inhibition and optical quality in the peripheral retina.

Figure 14:
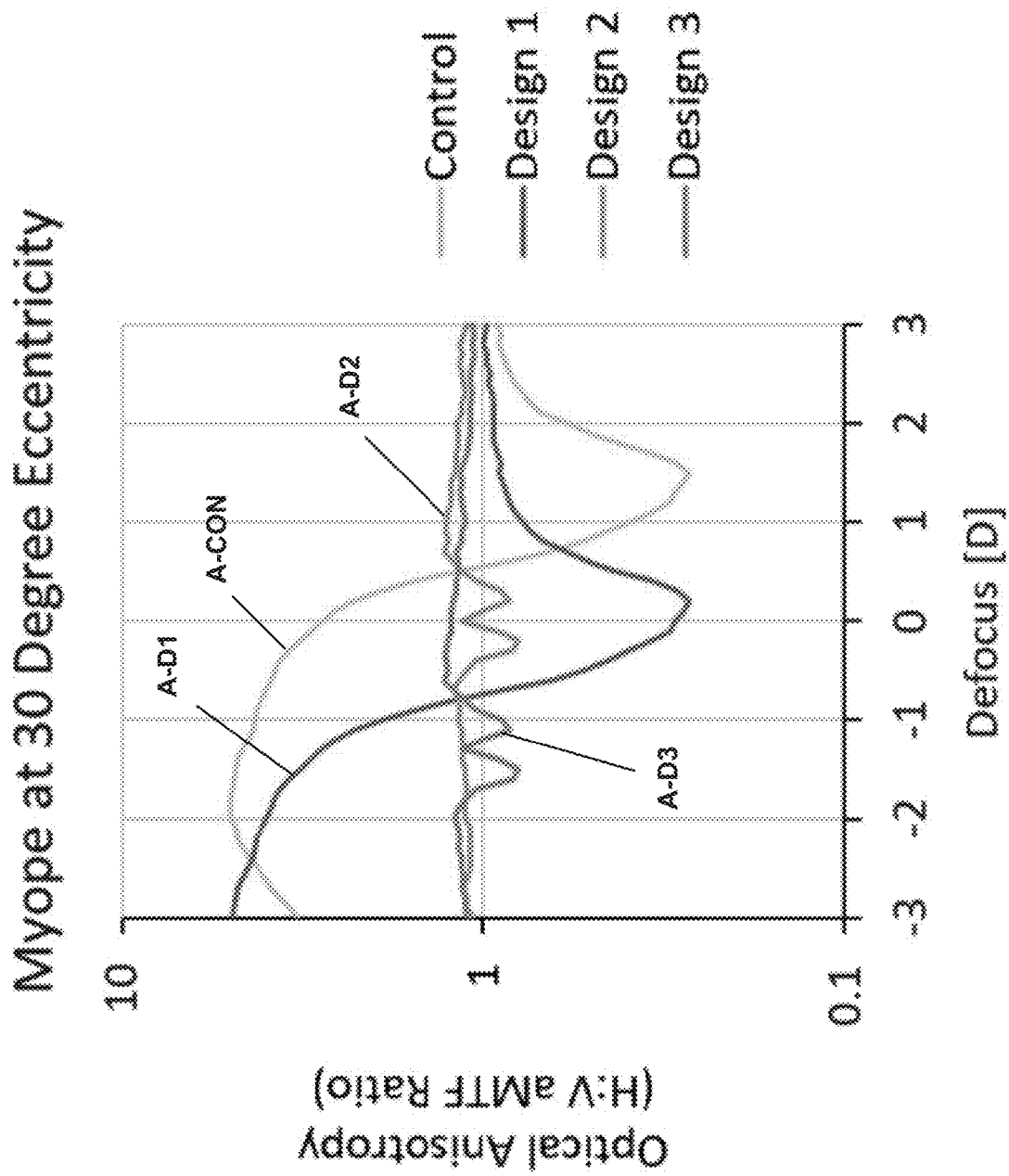
FIG. 14 shows plots of through-focus optical anisotropy at 30-degree eccentricity for the example myopic eye (uncorrected), the example myopic eye with the first example design myopia inhibiting ophthalmic lens, the example myopic eye with the second example design myopia inhibiting ophthalmic lens, and the example myopic eye with the third example design myopia inhibiting ophthalmic lens.

As described herein, circumferentially elongated image formed on the peripheral retina may result in elevated stimulus for myopia progression. FIG. 14 shows plots A-CON, A-D1, A-D2, A-D3 of through-focus optical anisotropy (greater than 1 indicates circumferential elongation, less than 1 indicates radial elongation) at 30 degree eccentricity for the example myopic eye uncorrected, the example myopic eye with the first example design ophthalmic lens, the example myopic eye with the second example design ophthalmic lens, and the example myopic eye with the third example design ophthalmic lens. While the image formed on the peripheral retina of the uncorrected example myopic eye is the most radially elongated of the formed images at about 1.5 diopter defocus, the uncorrected image has a substantial amount of circumferential elongation below about 0.3 diopter of defocus. With the first example design, the corrected image formed on the peripheral retina is not circumferentially elongated above about −1.2 diopter of defocus. Each of the second example design and the third example design result in a substantially non-elongated image throughout the illustrated defocus range (−3.0 diopter to 3.0 diopter).

Reverse Apodization (RA)

Figure 15:
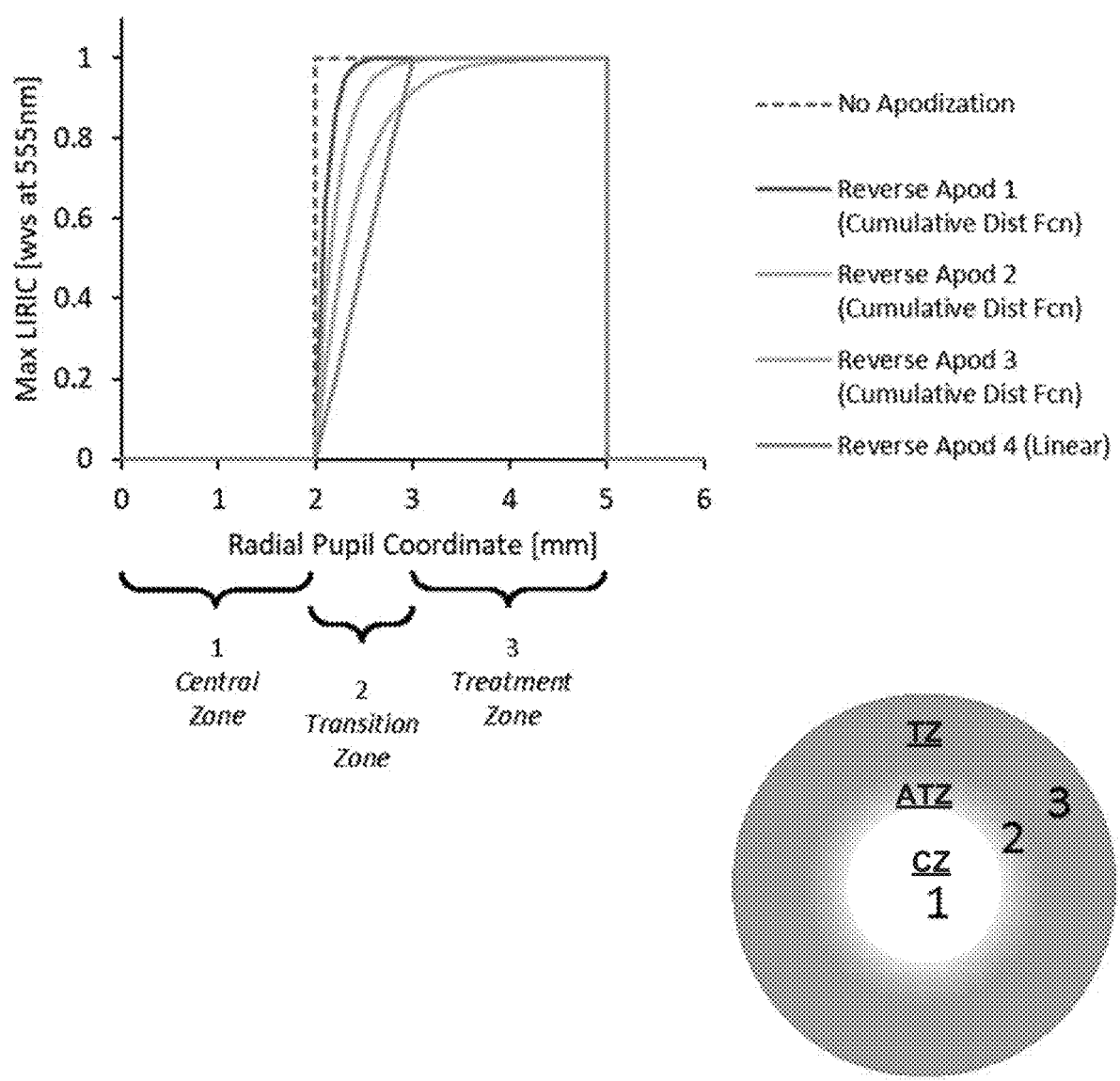
FIG. 15 illustrates an example ophthalmic lens with an annular transition zone that surrounds a central vision zone and separates the central vision zone from a myopia inhibiting peripheral zone, in accordance with embodiments.

In many embodiments described herein, a myopia inhibiting peripheral treatment zone of an ophthalmic lens (e.g., contact lens, spectacle lens, natural lens, cornea, intraocular lens) is configured to provide an off-axis optical correction to correct a myopia inducing optical anisotropy in the peripheral retina. In many embodiments, the myopia inhibiting peripheral treatment zone of the ophthalmic lens surrounds a central zone of the ophthalmic lens that may be configured to provide an on-axis optical correction for the fovea and not provide an off-axis optical correction to correct a myopia inducing optical anisotropy in the peripheral retina. FIG. 15 illustrates an approach in which an annular transition zone (ATZ) is disposed between the central zone (CZ) and the myopia inhibiting peripheral treatment zone (TZ). The annular transition zone (ATZ) is configured to provide a suitable transition from the on-axis optical correction provided by the central zone (CZ) to the off-axis correction provided by the myopia inhibiting peripheral treatment zone (TZ) to improve central (foveal) visual quality with the pupil is large. In many embodiments, the annular transition zone (ATZ) is configured to allocate some portion of light to improve central visual quality. In many embodiments, annular transition zone (ATZ) is configured to transition from providing the same visual correction as the central zone (CZ) at the inner boundary of the annular transition zone (ATZ) to providing the same visual correction as the myopia inhibiting peripheral treatment zone (TZ) at the outer boundary of the annular transition zone (TZ). FIG. 15 shows some example transition profiles that can be used in the annular transition zone (ATZ) to transition from the on-axis optical correction provided by the central zone (CZ) to the off-axis optical correction provided by the myopia inhibiting peripheral treatment zone (TZ). The example transition profiles are expressed in maximum waves at 555 nm wavelength that the annular transition zone (ATZ) provides to the peripheral retina starting at 0.0 waves at the inner boundary of the annular transition zone (ATZ) and progressing up to 1.0 wave at the outer boundary of the annular transition zone (ATZ).

Stepwise Radial Correction (SRC)

Figure 17:
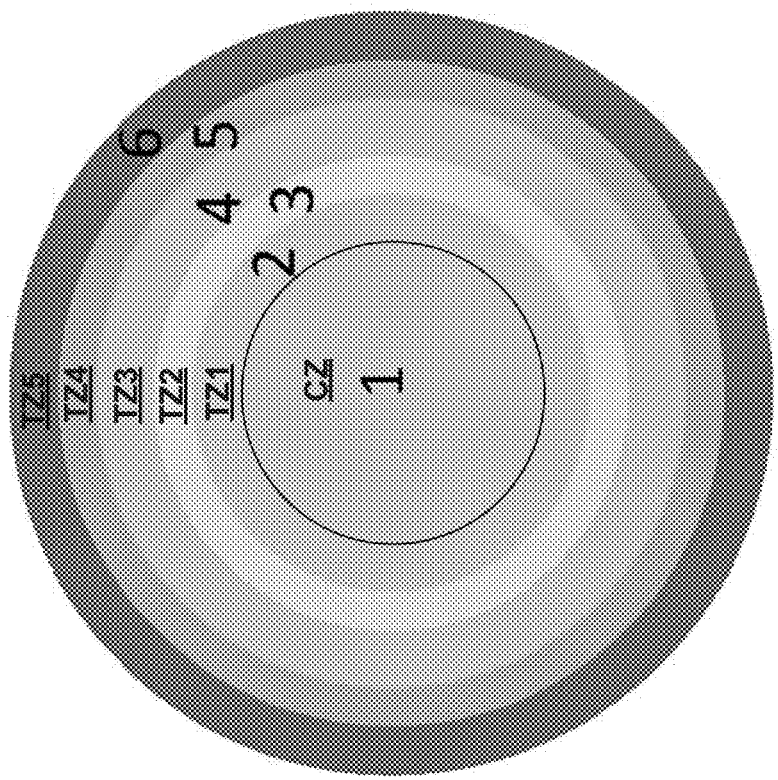
FIG. 16 and FIG. 17 illustrate example ophthalmic lenses with radial treatment zones optimized for providing off-axis corrections for corresponding field angles in the peripheral retina, in accordance with embodiments.
Figure 16:
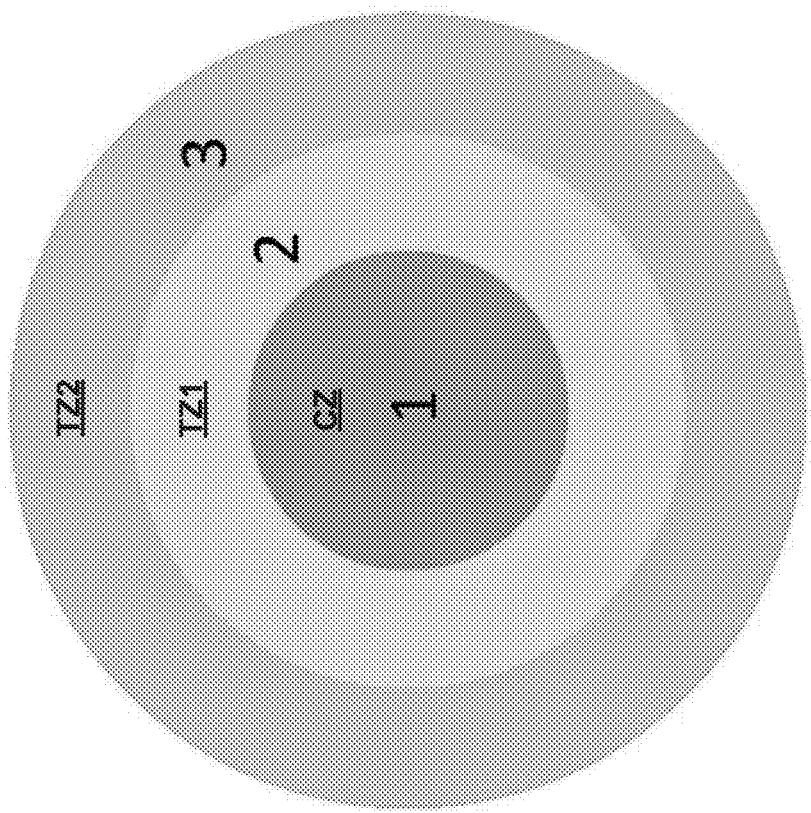

FIG. 16 and FIG. 17 illustrate the use of multiple myopia inhibiting radial treatment zones in which each of the radial treatment zones is optimized for providing an off-axis optical correction for a particular field angle. As reflected in the published refractive data [Romashchenko et al. 2020], the optical aberrations in the peripheral retina increase with field angle. Any suitable number of radial treatment zones can be employed. For example, FIG. 16 shows an embodiment that employs two radial treatment zones (TZ1, TZ2), which surround a central optical zone (CZ) configured to optimize central (foveal) vision using a suitable optical correction (e.g., sphere, cylinder, axis). The first radial treatment zone (TZ1) is configured to provide an optical correction for the mid-peripheral retina (e.g., 15-30 degrees field angle). As an example, the optical correction for the mid-peripheral retina can be defined by average aberrations between 15 and 30 degrees field angle. The optical correction for the mid-peripheral retina can also be configured to correct a myopia inducing optical anisotropy in the mid-peripheral retina. The second radial treatment zone (TZ2) is configured to provide an optical correction for the far-peripheral retina (e.g., >30 degrees field angle). As an example, the optical correction for the far-peripheral retina can be defined by average aberrations between 30 and 45 degrees field angle. The optical correction for the far-peripheral retina can also be configured to correct a myopia inducing optical anisotropy in the far-peripheral retina. The number of radial treatment zones can vary. For example, FIG. 17 shows an embodiment that includes 5 radial treatment zones (TZ1, TZ2, TZ3, TZ4, TZ5) with each of the 5 radial treatment zones (TZ1, TZ2, TZ3, TZ4, TZ5) being configured to provide an optical correction to a corresponding portion of the peripheral retina covering a corresponding range of field angles.

Subsurface Refractive Index Variations and Scatter (SRIV&S)

Figure 19:
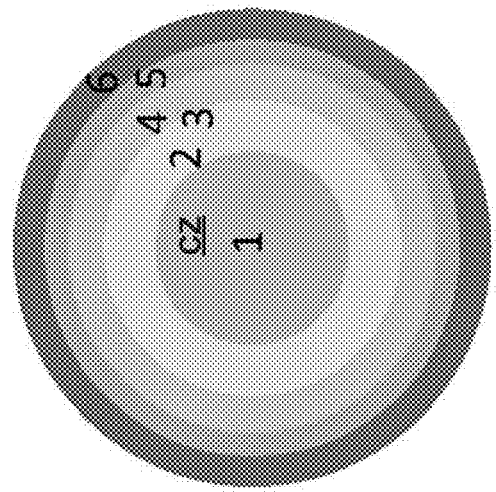
FIG. 18, FIG. 19, and FIG. 20 illustrate example ophthalmic lenses that includes first type radial treatment zones that increase peripheral contrast and second type radial treatment zones that decrease peripheral contrast, in accordance with embodiments.
Figure 20:
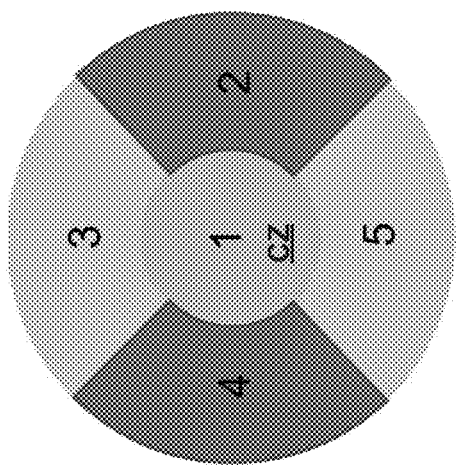
Figure 18:
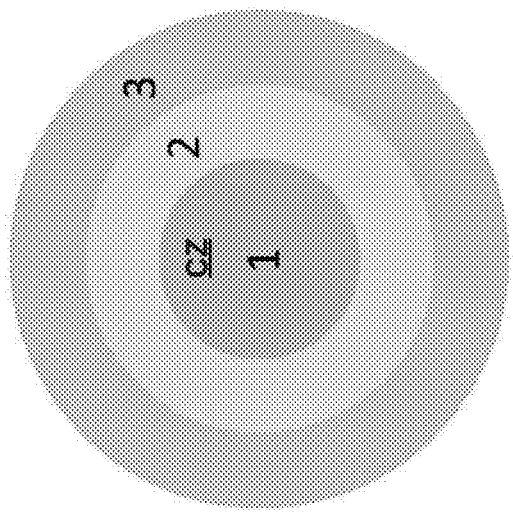

FIG. 18, FIG. 19, and FIG. 20 illustrate the combined use of a first type of radial treatment zone and a second type of radial treatment zone. The first type of radial treatment zone is configured to increase peripheral contrast. For example, the first type of radial treatment zone can be configured to correct an image formed on a peripheral retina from circumferential to radial, correct the peripheral aberrations (e.g., astigmatism and coma), or over-correct the peripheral aberrations. The first type of radial treatment zone can include any suitable type of optical elements configured to increase peripheral contrast. For example, the first type of radial treatment zone can include subsurface optical elements formed via laser-induced changes in refractive index and configured to increase peripheral contrast or an exterior surface shape that is configured to increase peripheral contrast. The second type of radial treatment zone is configured to decrease peripheral contrast. For example, the second type of radial treatment zone can include subsurface optical elements formed via laser-induced changes in refractive index configured to induce scatter. For example, the second type of radial treatment zone can include optical elements that form a lenslet array pattern of defocus elements. Each of the defocus elements can have any suitable configuration. For example, each of the defocus elements can have a diameter of 0.1 to 1.0 mm and power between 1 to 3 diopters of defocus. The defocus elements defocus elements can be arranged in a pattern (e.g., a cartesian (x, y) pattern, a polar (r, theta) pattern, a hexagonal pattern, or an irregular pattern) with an inter-element spacing ranging from 0.1 to 1.0 mm. The optical elements that form the lenslet array pattern of defocus elements can be formed using any suitable approach. For example, the optical elements that form the defocus elements can include subsurface optical elements formed via laser-induced changes in refractive index and/or the defocus elements can be formed via exterior surface shape. The subsurface optical elements formed via laser-induced changes in refractive index can provide a maximum of 1.0 waves at 550 nm wavelength for 100% diffraction efficiency in each defocus element. As another example, the second type of radial treatment zone can include random subsurface optical elements formed via laser-induced changes in refractive index to induce scatter. The random subsurface optical elements can be configured to provide a range of waves between 0.1 and 1.0 waves at 550 nm wavelength. FIG. 18 shows a configuration that employs two radial treatment zones in which one of the radial treatment zones is the first type of radial treatment zone and the other radial treatment zone is the second type of radial treatment zone.

FIG. 19 shows a configuration that employs five radial treatment zones in which the type of radial treatment zone employed alternates radially between the first type of radial treatment zone and the second type of radial treatment zone. FIG. 20 shows a configuration that employs fourth radial treatment zones in which the type of radial treatment zone employed alternates circumferentially between the first type of radial treatment zone and the second type of radial treatment zone.

Combined Optical and Pharmacological Treatment (CO&PT)

Any of the optical treatments described herein can be combined with a suitable pharmacological treatment to inhibit progression of myopia. For example, a contact lens or contact lenses can include atropine within the contact lens or contact lenses such that the contact lens or contact lenses serve as a delivery vehicle for the atropine. The optical treatments described herein slow the rate of eye growth via visual stimulation in the peripheral retina. The atropine slows the rate of eye growth via pharmacological signals. Eye drops having a low dose of 0.1% to 1.0% atropine are currently used clinically as a myopia treatment. The atropine can be incorporated into the contact lens or the contact lenses to provide a suitable slow release into the eye or eyes.

Radial Treatment Zones with Combined Central Vision and Peripheral Myopia-Inhibiting Corrections (CV&PC)

Figure 21:
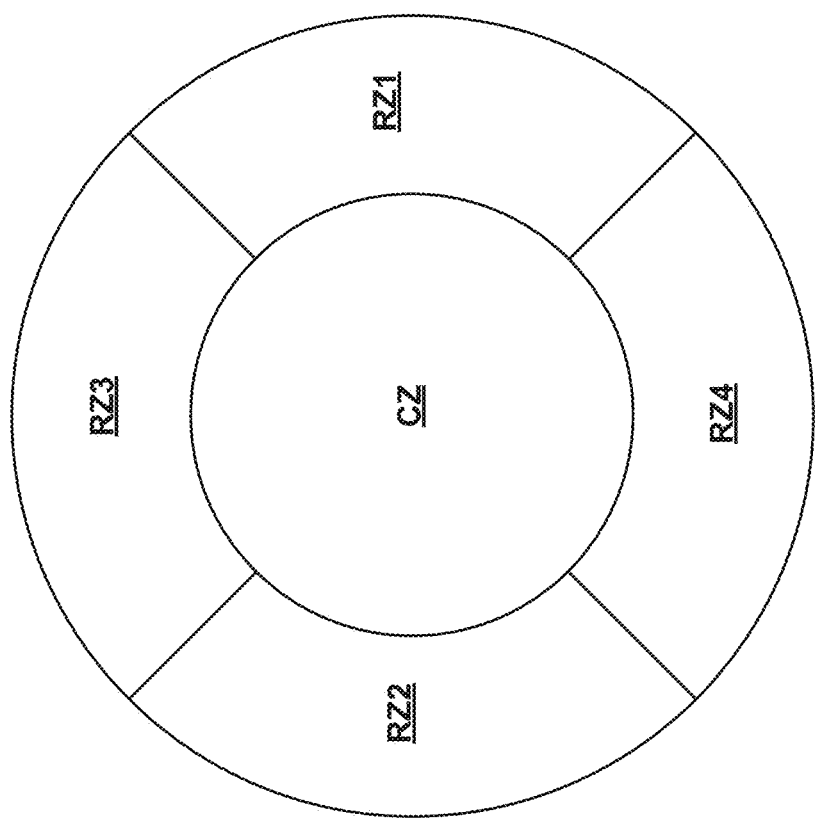
FIG. 21 illustrates an example ophthalmic lens that includes radial treatment zones configured to provide a combined on-axis correction for central vision improvement and off-axis correction to inhibit myopia progression, in accordance with embodiments.
Figures 22, 23, 24:
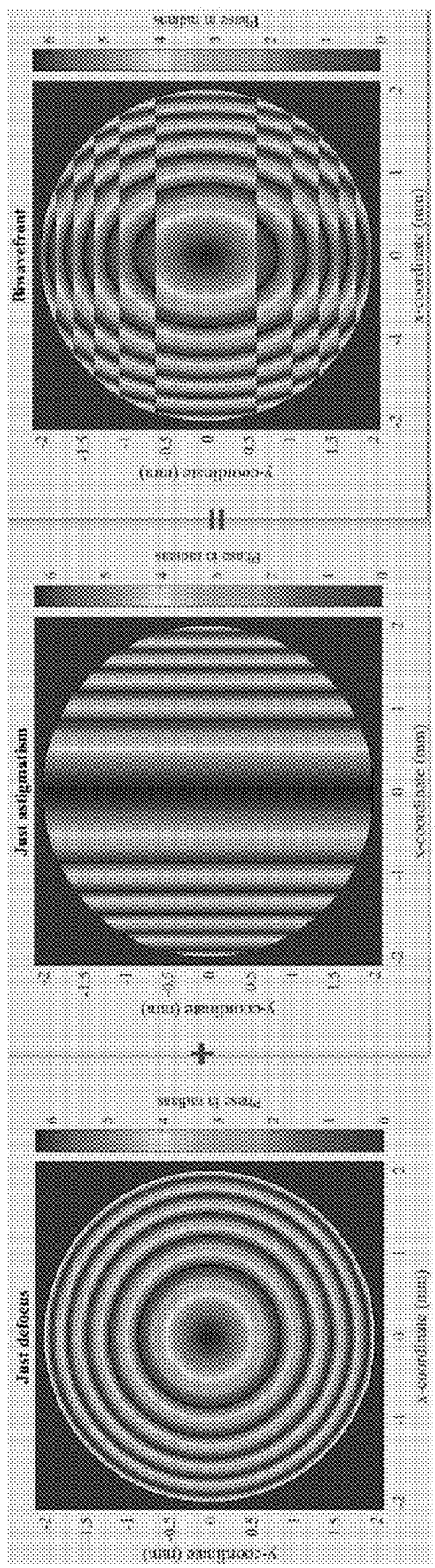
FIG. 22 through FIG. 30 illustrate a biwavefront combined optical correction approach that can be employed in the example ophthalmic lens of FIG. 21.

FIG. 21 illustrates an example ophthalmic lens that includes a central zone (CZ) and four radial zones (RZ1, RZ2, RZ3, RZ4). The central zone (CZ) can be configured to provide an on-axis optical correction to improve central (foveal) vision. In some embodiments, the central zone (CZ) does not provide an off-axis optical correction to correct a myopia inducing optical anisotropy in the peripheral retina. Each of the four radial zones (RZ1, RZ2, RZ3, RZ4) can be configured to provide a combined optical correction that combines an on-axis optical correction that improves central (foveal) vision and an off-axis correction configured to correct a myopia inducing optical anisotropy in the peripheral retina. While the example ophthalmic lens includes the four radial zones (RZ1, RZ2, RZ3, RZ4), an ophthalmic lens can include any suitable number and distribution of radial zones that are configured to provide a combined optical correction that combines an on-axis optical correction that improves central (foveal) vision and an off-axis correction configured to correct a myopia inducing optical anisotropy in the peripheral retina.

Figure 25:
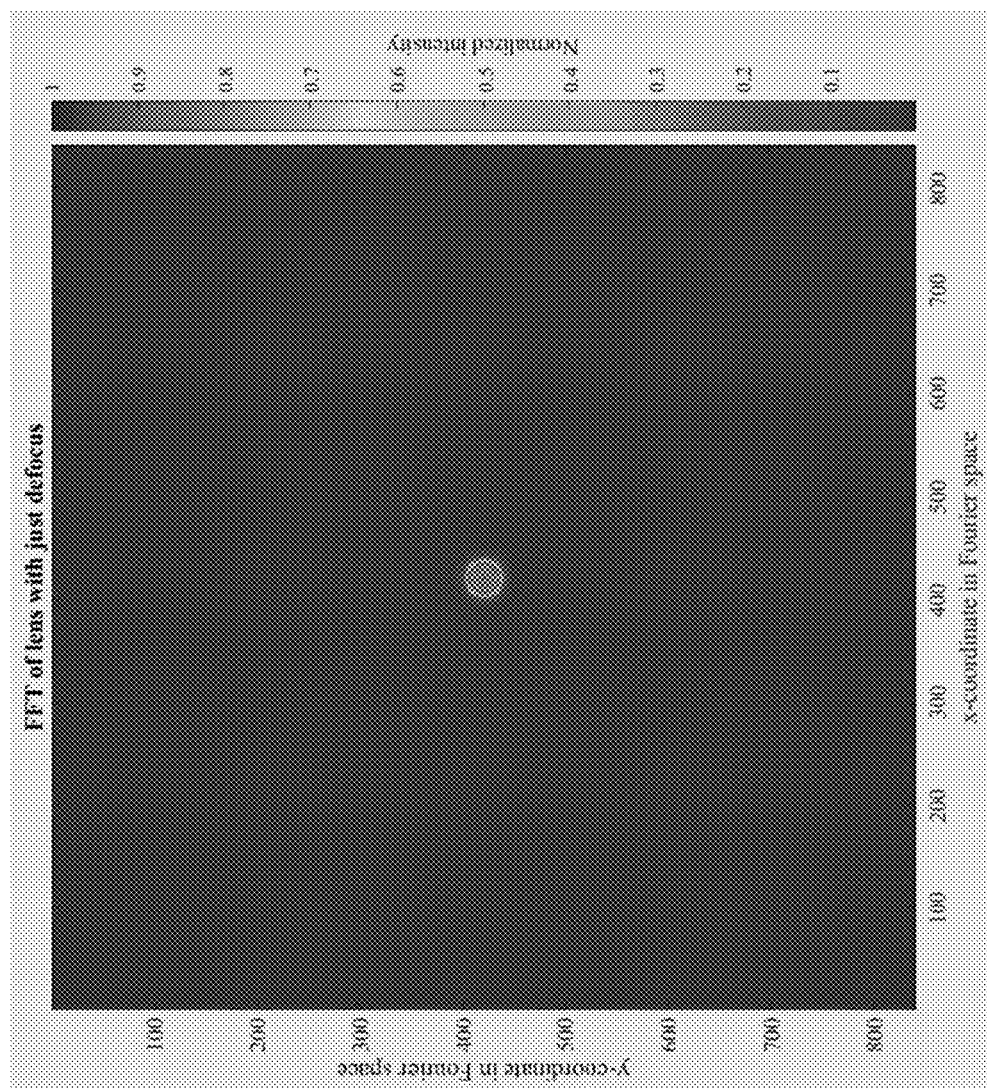

Each radial zone can have any suitable configuration that provides a combined optical correction that combines an on-axis optical correction that improves central (foveal) vision and an off-axis correction configured to correct a myopia inducing optical anisotropy in the peripheral retina. For example, FIG. 22 through FIG. 30 illustrate a biwavefront combined optical correction approach that can be used to configure a radial zone to provide a combined optical correction that combines an on-axis optical correction that improves central (foveal) vision and an off-axis correction configured to correct a myopia inducing optical anisotropy in the peripheral retina. In the illustrated approach, an optical correction for defocus (illustrated in FIG. 22) is combined with an optical correction for astigmatism (illustrated in FIG. 23) to form a biwavefront combined optical correction for defocus and astigmatism (illustrated in FIG. 24). FIG. 25 shows a Fast Fourier Transformation (FFT) of the defocus correction of FIG. 22.

Figure 26:
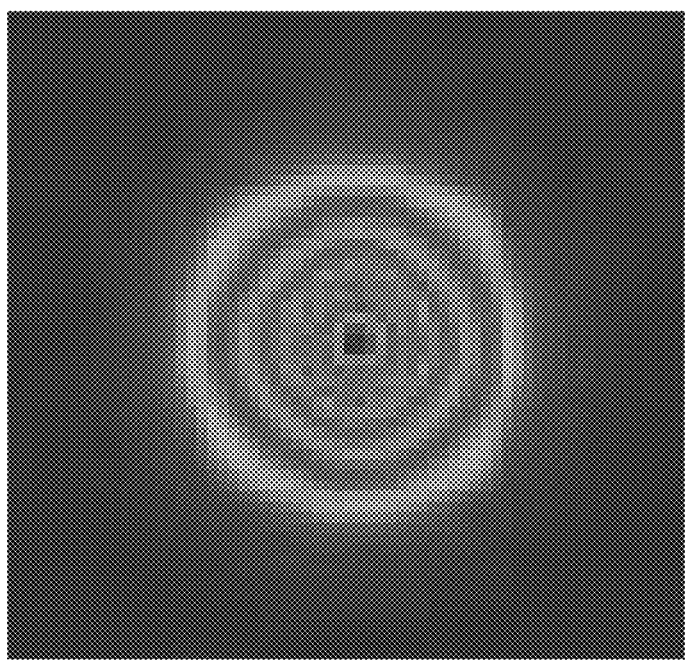
Figure 27:
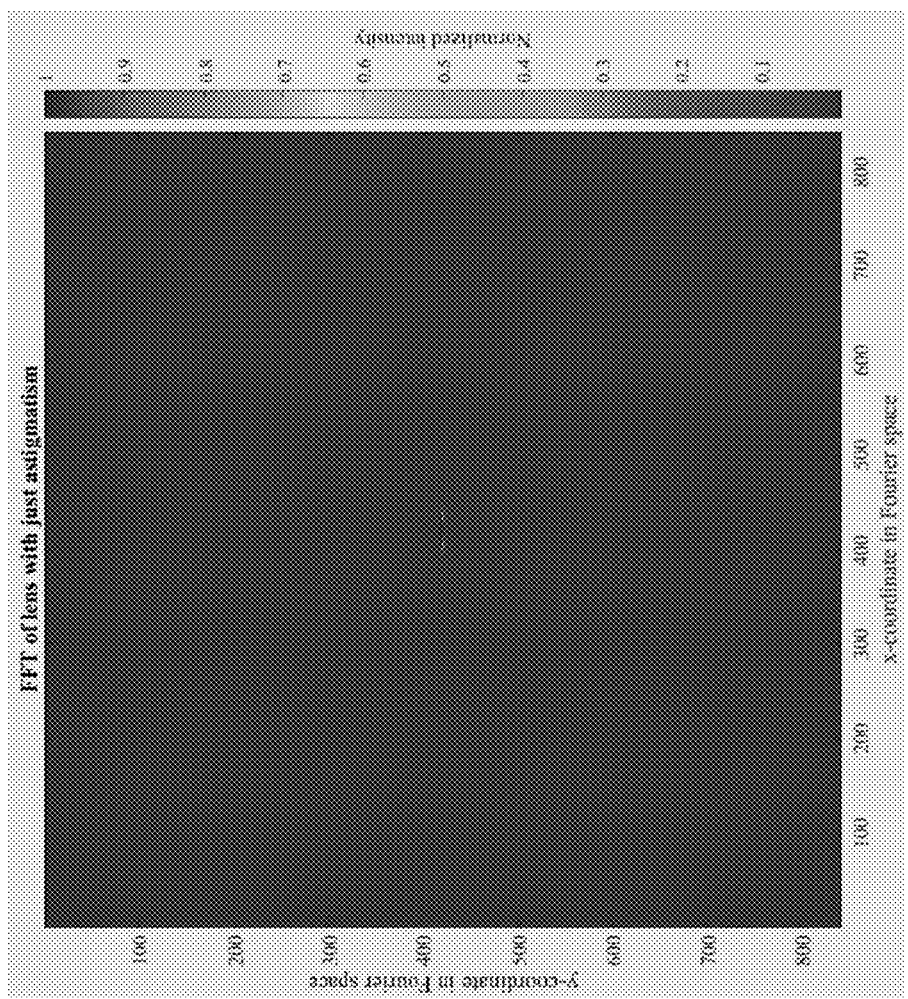
Figure 28:
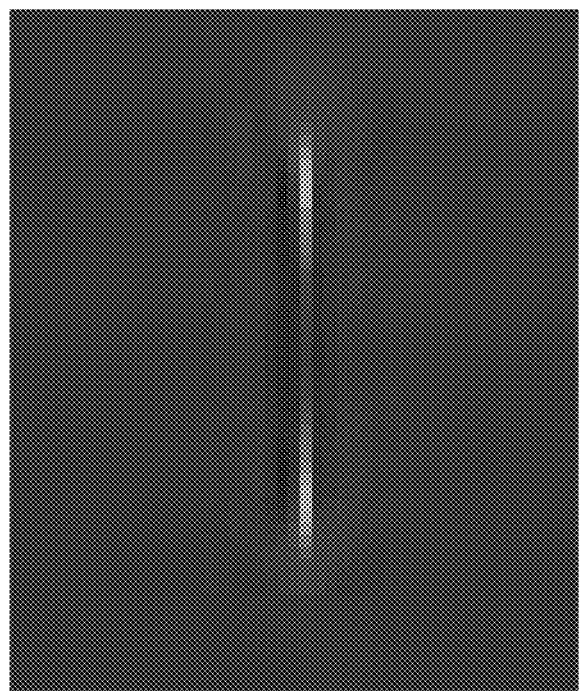
Figure 30:
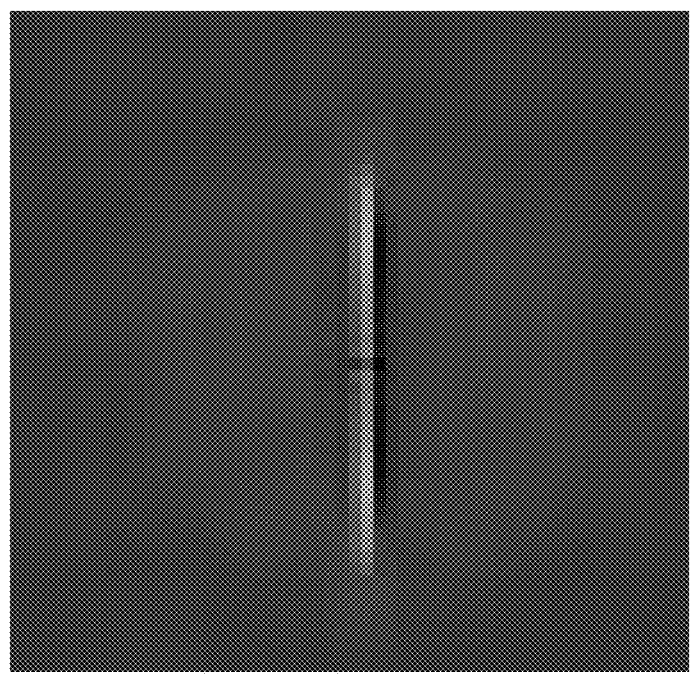
Figure 29:
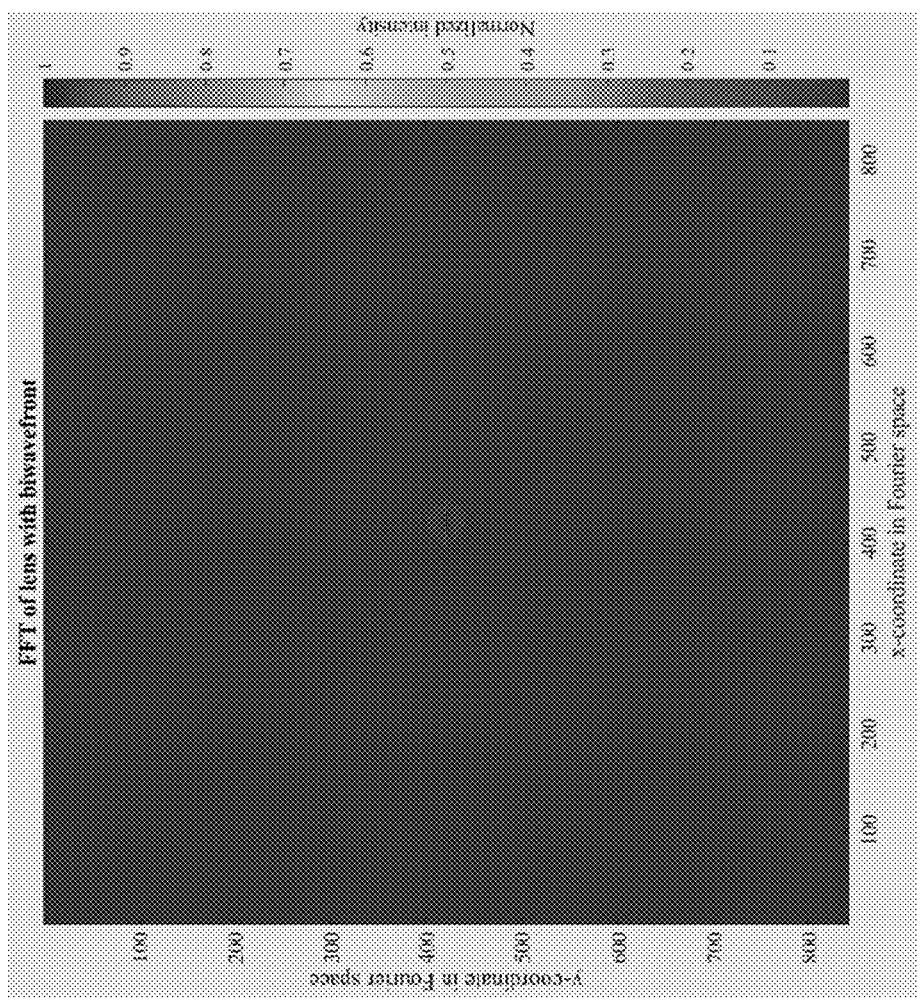

FIG. 26 shows a close-up view of the relevant portion of the FFT of FIG. 25. FIG. 27 shows a Fast Fourier Transformation (FFT) of the astigmatism correction of FIG. 23. FIG. 28 shows a close-up view of the relevant portion of the FFT of FIG. 27. FIG. 29 shows a Fast Fourier Transformation (FFT) of the biwavefront combined optical correction for defocus and astigmatism of FIG. 24. FIG. 30 shows a close-up view of the relevant portion of the FFT of FIG. 29. The FFT of FIG. 24 appears to be a linear combination of the FFT of the defocus correction of FIG. 22 and the FFT of the astigmatism correction of FIG. 23 and confirms that the example biwavefront combined optical correction provides a combined defocus and astigmatism correction.

A biwavefront results from the coherent interference of the two component wavefronts. A biwavefront can be created by extracting the phase profile resulting from the coherent interference of the two component wavefronts. Equation (2) calculates a biwavefront as a function of the two component wavefronts, where "RDE$_1$" is the relative diffraction efficiency of wavefront 1 and "α" is a piston displacement that maximizes the size of the areas where constructive interference happens between both wavefronts. Equation (3) is a generalized version of Equation (2) where "RDE1" is a function of the polar coordinates (ρ, θ).

$$W_3(\rho,\theta) = \text{angle}((\sqrt{RDE_1})e^{iW_1(\rho,\theta)} + (\sqrt{1-RDE_1})e^{i(W_2(\rho,\theta)+\alpha)}) \quad \text{Equation(2)}$$

$$W_3(\rho,\theta) = \text{angle}((\sqrt{RDE_1(\rho,\theta)})e^{iW_1(\rho,\theta)} + (\sqrt{1-RDE_1(\rho,\theta)})e^{i(W_2(\rho,\theta)+\alpha)}) \quad \text{Equation (3)}$$

Combined Approaches for Inhibiting Myopia Progression

The approaches for inhibiting myopia progression described herein can be combined in any suitable combination. For example, the approaches for inhibiting myopia progression described herein can be combined as indicated in Table 4.

TABLE 4

Combinations of Approaches for Inhibiting Myopia Progression.

|  | RA | SRC | SRIV&S | CO&PT | CV&PC |
|---|---|---|---|---|---|
| RA | — | YES | YES | YES | YES |
| SRC | YES | — | YES | YES | YES |
| SRIV&S | YES | YES | — | YES | YES |

TABLE 4-continued

Combinations of Approaches for Inhibiting Myopia Progression.

|  | RA | SRC | SRIV&S | CO&PT | CV&PC |
|---|---|---|---|---|---|
| CO&PT | YES | YES | YES | — | YES |
| CV&PC | YES | YES | YES | YES | — |

Ballast

Contact lenses can include ballast to orient the contact lens in an eye so that the annular treatment zones have a specific orientation relative to the peripheral retina to provide the intended myopia inhibiting off-axis correction to the corresponding portions of the peripheral retina.

Ophthalmic lenses described herein are configured to impart an optical correction to light focused on a peripheral retina so as to reduce progression of myopia. In many embodiments, subsurface optical elements are disposed in an annular zone of the ophthalmic lens and are formed via laser-induced changes in refractive index of a material forming the annular zone. In many embodiments, optical aberrations are measured for one or more locations in a peripheral retina of a subject. In many embodiments, based on the measured optical aberrations, a myopia progression inhibiting optical correction is determined for each of the one or more locations in the peripheral retina of the subject. In many embodiments, surface refractive index changes are determined for forming the subsurface optical elements configured to provide the myopia progression inhibiting optical correction for each of the one or more locations in the peripheral retina. In many embodiments, the subsurface refractive index changes are induced by focusing laser light to corresponding subsurface locations in respective one or more annular zones of an ophthalmic lens. In many embodiments, each of the one or more annular zones of the ophthalmic lens is positioned opposite to the associated location in the peripheral retina with respect to the optical axis of an eye having the peripheral retina. Ophthalmic lens configured as described herein to inhibit progression of myopia can be any suitable type of ophthalmic lens including, for example, spectacles (aka glasses), contact lenses, corneas, native lenses, and intraocular lenses.

FIG. 31 shows a cross-sectional view of an eye 10 that illustrates transmission of light 12 to the retina 16 of the eye 10 from a first object 14 disposed at a first location to be in the center of a field of view of the eye 10. The retina 16 includes the fovea 18, the perafovea 20, and the perifovea 22. The fovea 18 is the central portion of the retina 16. The perafovea 20 and the perifovea 22 form the peripheral portion of the retina. Retinal cones are concentrated in the fovea 18. The light 12 is incident upon the fovea 18, thereby providing the highest visual acuity to the center of field of view. In the illustrated embodiment, the light 12 passes through a central portion of a contact lens 24 worn on the eye 10. The contact lens 24 is an example of a type of ophthalmic lens that can be configured to inhibit progression of myopia as described herein. In alternate embodiments, the cornea of the eye 10, the lens of the eye 10, spectacles, and/or an intraocular lens can be configured to inhibit progression of myopia (of the eye 10) as described herein.

FIG. 32 illustrates transmission of light 26 to the retina 16 from a second object 28 disposed at a second location so as to be in the periphery of the field of view of the eye 10. The eye 10 has an optical axis 30 that extends from the center of the fovea 18 through the center of the pupil 32. Due to the peripheral location of the second object 28 with respect to the optical axis 30, the light 26 passes through a peripheral portion of the contact lens 24 and is incident on the perifovea 22 portion of the retina 16. The light 26 also passes through a peripheral portion of the cornea of the eye 10 and through a peripheral portion of the lens of the eye 10. If the lens of the eye 10 is replaced by an intraocular lens, light 26 would pass through a peripheral portion of the intraocular lens.

Figure 33:
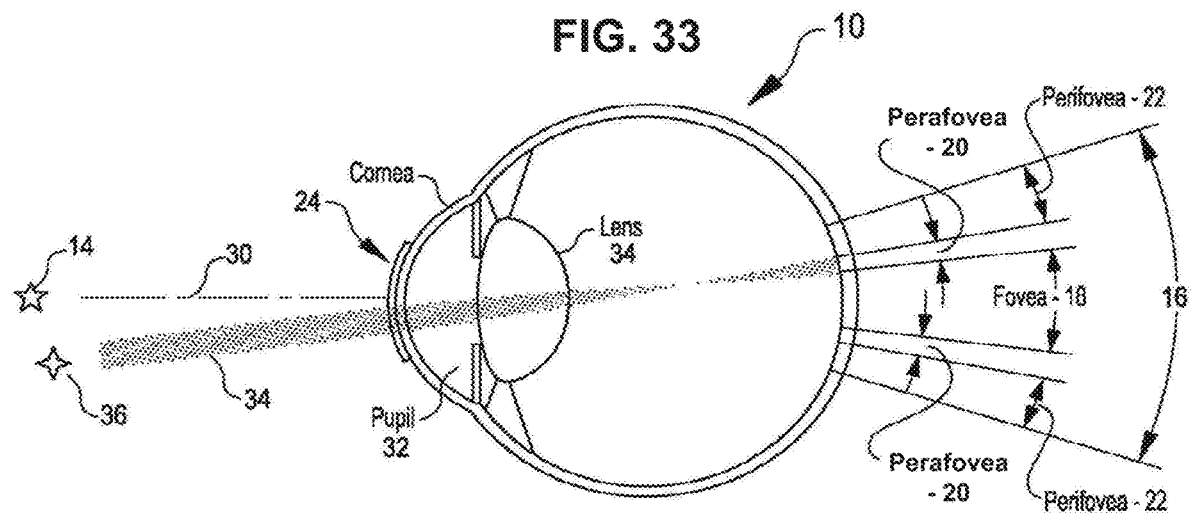
FIG. 33 shows a cross-sectional view of an eye that illustrates transmission of light from an object located in the periphery of a field of view, through a central zone and an annular zone of an ophthalmic lens, to the perafovea.

FIG. 33 illustrates transmission of light 34 from a third object 36 disposed at a third location so as to be in the periphery of a field of view to the retina 16. Due to the peripheral location of the third object 36 with respect to the optical axis 30, the light 34 passes through both a central portion and a peripheral portion of the contact lens 24 and is incident on the perafovea 20 portion of the retina. Likewise, the light 34 also passes through a central portion and a peripheral portion of the cornea of the eye 10, and through a central portion and a peripheral portion of the cornea of the eye 10. If the lens of the eye 10 is replaced by an intraocular lens, light 34 would pass through a central portion and a peripheral portion of the intraocular lens.

Visual acuity for objects seen via the peripheral retina (i.e., the perafovea 20 and/or the perifovea 22) is less than for objects seen via the fovea 18. As illustrated in FIG. 33, the light incident on the peripheral retina can be a combination of light that passes through a peripheral portion and a central portion of the contact lens 24, a peripheral portion and a central portion of the cornea of the eye 10, and a peripheral portion and a central portion of the lens of the eye 10 or a peripheral portion and a central portion of an intraocular lens that replaces the lens of the eye 10. The eye 10 may also focus light better on the fovea 18 than on the peripheral retina 20, 22, thereby potentially further decreasing the level of visual acuity for objects seen via the peripheral retina 20, 22 relative to an object seen via the fovea 18.

Myopia progression has been associated with excessive eye growth, which can increase the distance between the fovea 18 and lens 34 of the eye 10. The increasing distance between the fovea 18 and the lens 34 results in the image being focused further forward of the fovea 18, thereby increasing myopia.

Studies have suggested that eye growth is influenced by light incident upon the peripheral retina. For example, one study, Smith, Earl L., et al. "Peripheral vision can influence eye growth and refractive development in infant monkeys" *Investigative ophthalmology & visual science* 46.11 (2005): 3965-3972, shows that eye growth in infant monkeys with no fovea (i.e., only the peripheral retina) is influenced by the optics of the eye with respect to the peripheral retina. As another example, in another study, Hiraoka, Takahiro, et al. "Relationship between higher-order wavefront aberrations and natural progression of myopia in schoolchildren" *Scientific reports* 7.1 (2017): 7876, 64 children were studied over 2 years. Of the 64 children studied, those who naturally had higher order aberrations (which provide a longer depth of focus) had less myopic progression over the 2 years.

Figure 34:
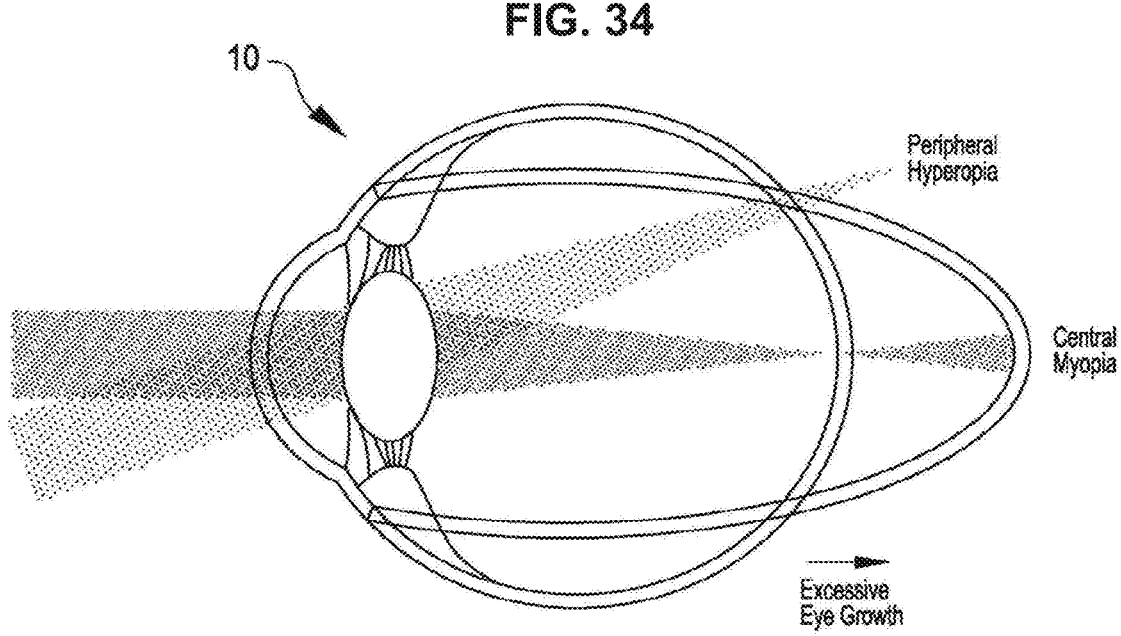
FIG. 34 illustrates coexistence of central myopia and peripheral hyperopia in an example eye.

The shape of the ocular globe can impact the nature of the light incident upon the peripheral retina. As illustrated in FIG. 34, for an ocular globe with a prolate shape, peripheral hyperopia can coexist with central myopia. Peripheral hyperopia has been identified as a potential stimulus for continued growth of the eye, which exacerbates central myopia.

Figure 35:
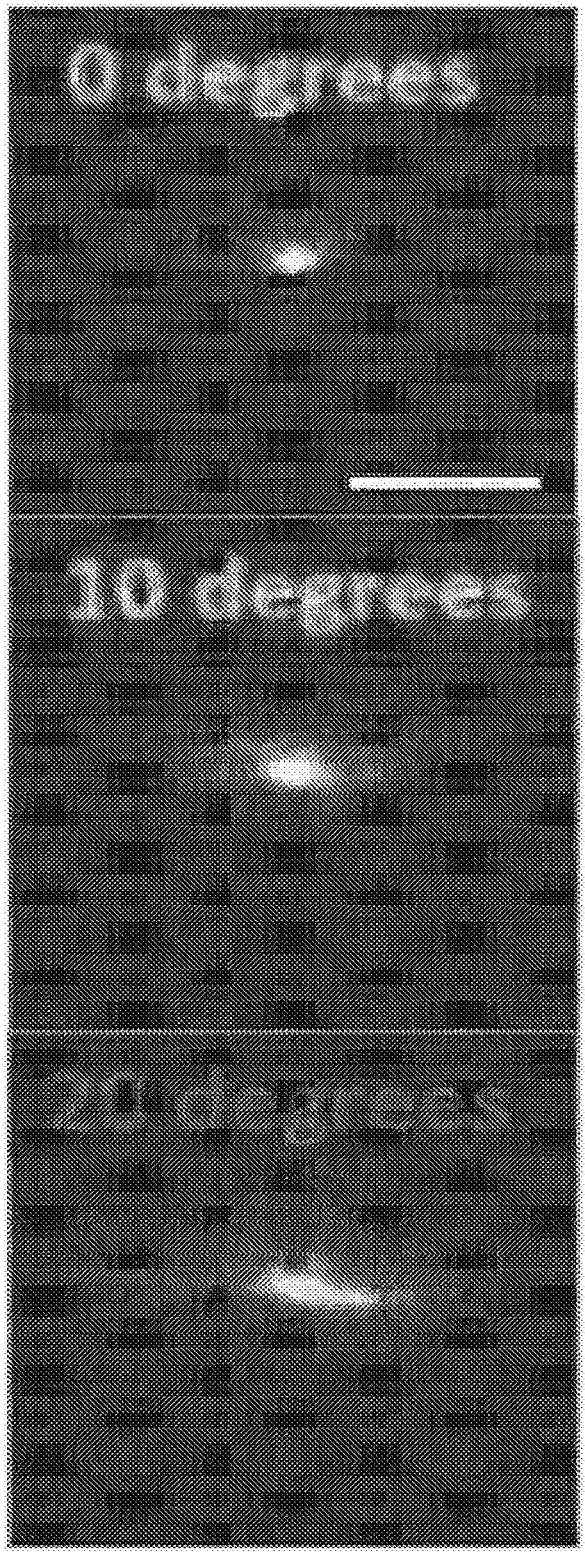
FIG. 35 illustrates point spread functions for one subject in the retina at zero degrees, ten degrees, and 20 degrees eccentricities.
Figure 36:
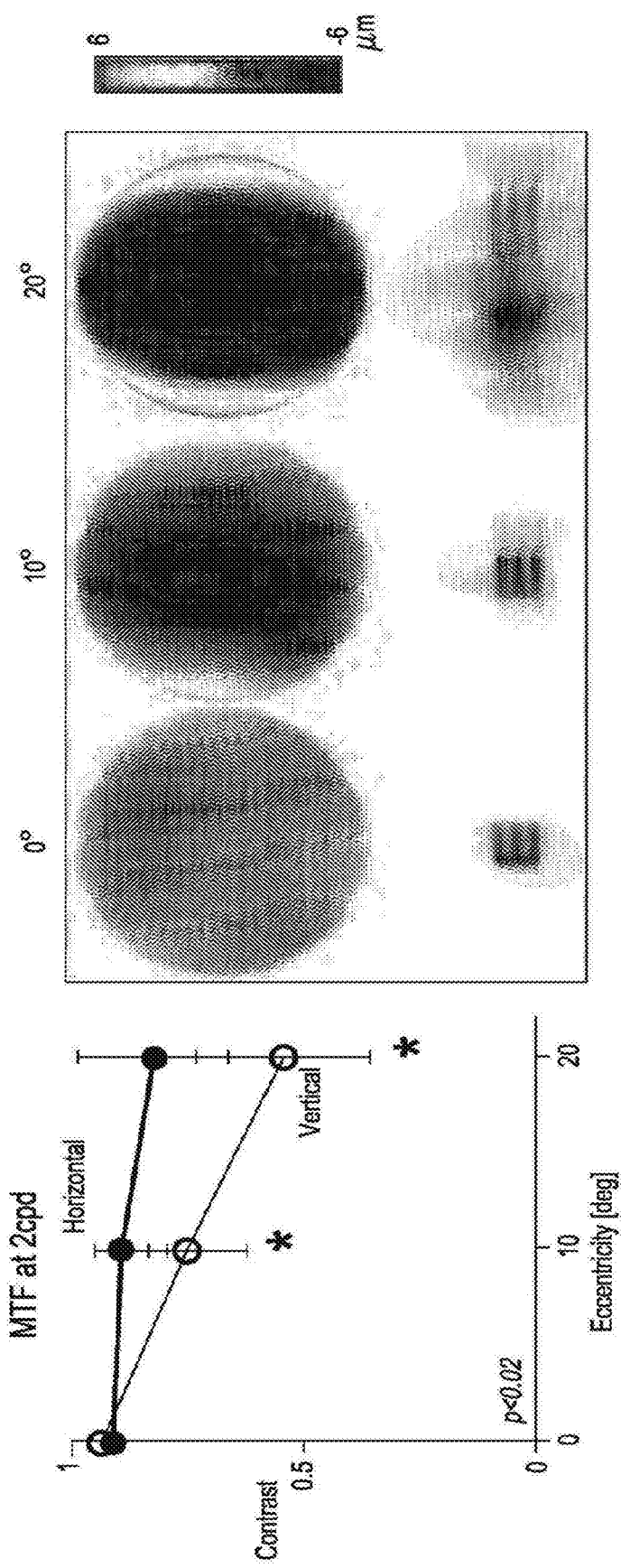
FIG. 36 illustrates wavefront aberrations in the retina of the subject of FIG. 35 at zero degrees, ten degrees, and 20 degrees eccentricities.

It is believed by the inventor that anisotropy in peripheral vision may be a potential stimulus for continued growth of the eye, which exacerbates central myopia. Studies have shown that light incident on the peripheral retina often has some level of anisotropy and/or rotational asymmetry due to peripheral optical aberrations of the eye. For example, FIG. 35 illustrates point spread functions for one subject at zero degrees, ten degrees, and 20 degrees in the temporal retina. As can be seen, the point spread function at 20 degrees exhibits a substantial amount of anisotropy. FIG. 36 illustrates wavefront aberrations for the subject of FIG. 35 at zero degrees, ten degrees, and 20 degrees in the temporal retina. As can be seen, the wavefront aberrations for 20 degrees in the temporal retina exhibits a substantial amount of anisotropy.

Figure 37:
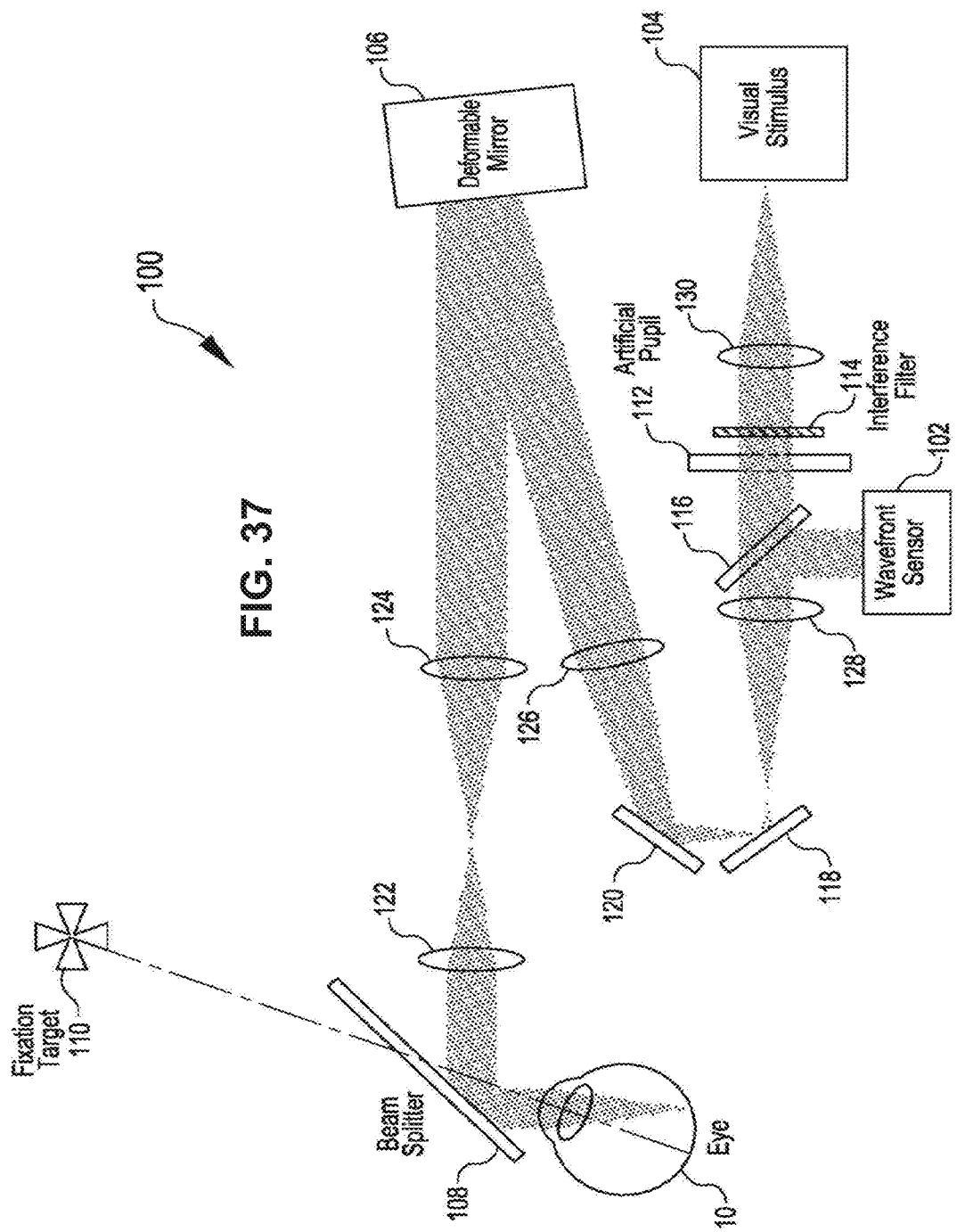
FIG. 37 is a simplified schematic diagram of a system for measuring off-axis and on-axis optical aberrations for selected locations in the retina, in accordance with embodiments.

FIG. 37 is a simplified schematic diagram illustrating a system 100 for measuring optical aberrations for selected locations of the retina, both off-axis and on-axis. The system 100 includes a wavefront sensor 102, a visual stimulus 104, a deformable mirror 106, a first beam splitter 108, a fixation target 110, an artificial pupil 112, an interference filter 114, a second beam splitter 116, mirrors 118, 120, and lenses 122, 124, 126, 128, and 130. Light emitted by the visual stimulus 104 is projected onto a targeted location on the retina 16 of the eye 10. The resulting light reflected from the targeted location on the retina is then projected by the eye 10 onto the beam splitter 108, which reflects to the projected light thereby directing the projected light onto the wavefront sensor 102. Any suitable existing wavefront sensor can be used as the wavefront sensor 102. For example, common wavefront sensors used today are based on the Schemer disk, the Shack Hartmann wavefront sensor, the Hartmann screen, and the Fizeau and Twymann-Green interferometers. The Shack-Hartmann wavefront measurement system is known in the art and is described in-part by U.S. Pat. Nos. 5,849, 006; 6,261,220; 6,271,914 and 6,270,221. Such systems operate by illuminating a retina of the eye and measuring the reflected wavefront. In many embodiments, the fixation target 110 is selectively repositionable to provide for selective reorientation of the eye 10 to direct the light from the visual stimulus to selected locations in the fovea 18, the perafovea 20, and/or the perifovea 22, for measurement of optical aberrations associated with each selected locations of the retina via the wavefront sensor 102. The fixation target 110 can also be varied to reflect different viewing distances between the eye 10 and the fixation target 110 so as to induce different accommodations of the eye 10 to enable measurement of associated optical aberrations of the eye 10 for any suitable range of accommodation of the eye 10. The deformable mirror 106 can be controlled to apply an optical correction (e.g., corresponding to a candidate optical correction) to enable assessment of the optical correction on an image formed in the peripheral retina.

Figure 38A:
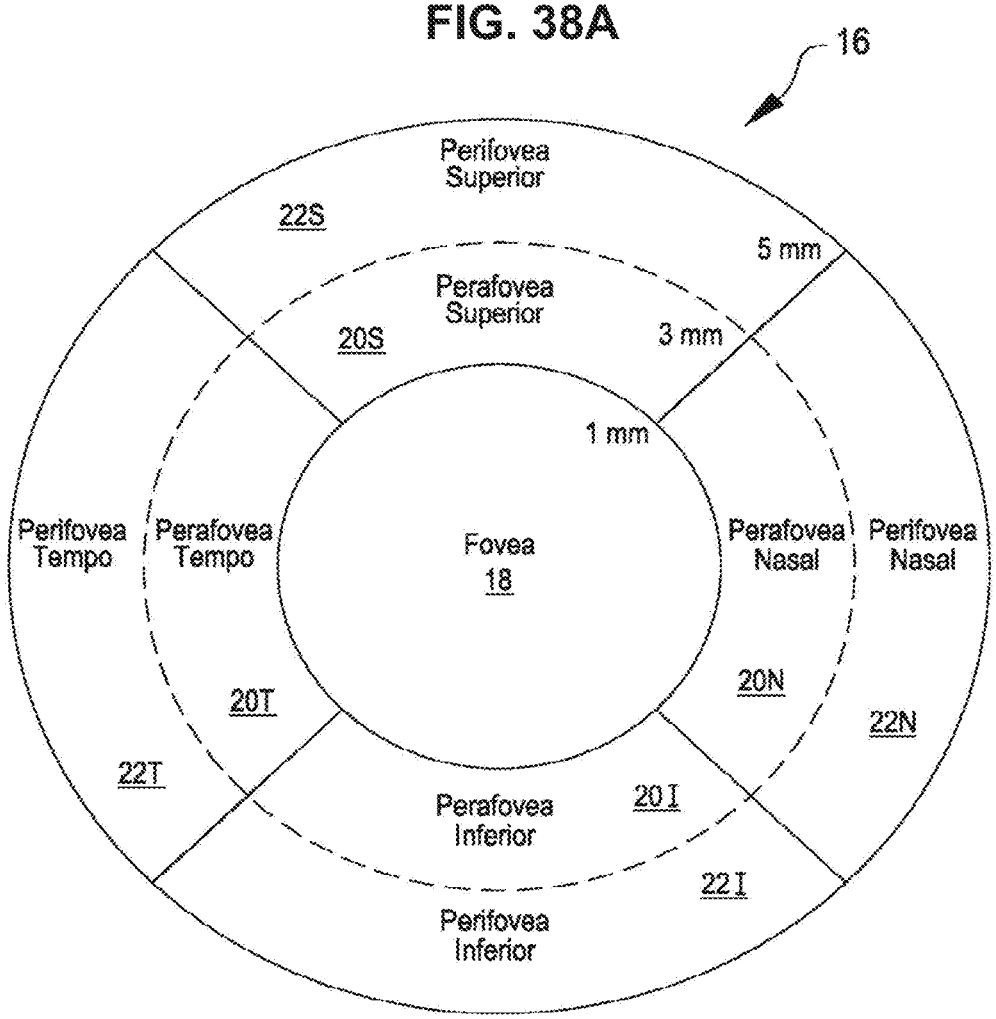
FIG. 38A is a simplified schematic drawing showing regions of a retina.

FIG. 38A is a simplified schematic drawing showing one approach for defining regions of the retina 16. In FIG. 38A, the perafovea 20 is subdivided into the illustrated regions, which include the perafovea nasal 20N, the perafovea tempo 20T, the perafovea superior 20S, and the perafovea inferior 20I. The perifovea 22 is subdivided into the illustrated regions, which include the perifovea nasal 22N, the perifovea tempo 22T, the perifovea superior 22S, and the perifovea inferior 22I.

In many embodiments, different annular regions of an ophthalmic lens are configured to provide a respective refractive optical correction for an image formed on an associated region of the retina. An optical correction provided by a respective annular region of the contact lens can be formulated based on an optical correction provide by a central zone of the contact lens. As described herein, light incident on some regions of the peripheral retina may be a combination of light that passes through a central portion of an ophthalmic lens (e.g., glasses, contact lens, cornea, native lens, or intraocular lens) and light that passes through a peripheral portion of the ophthalmic lens.

Figure 38B:
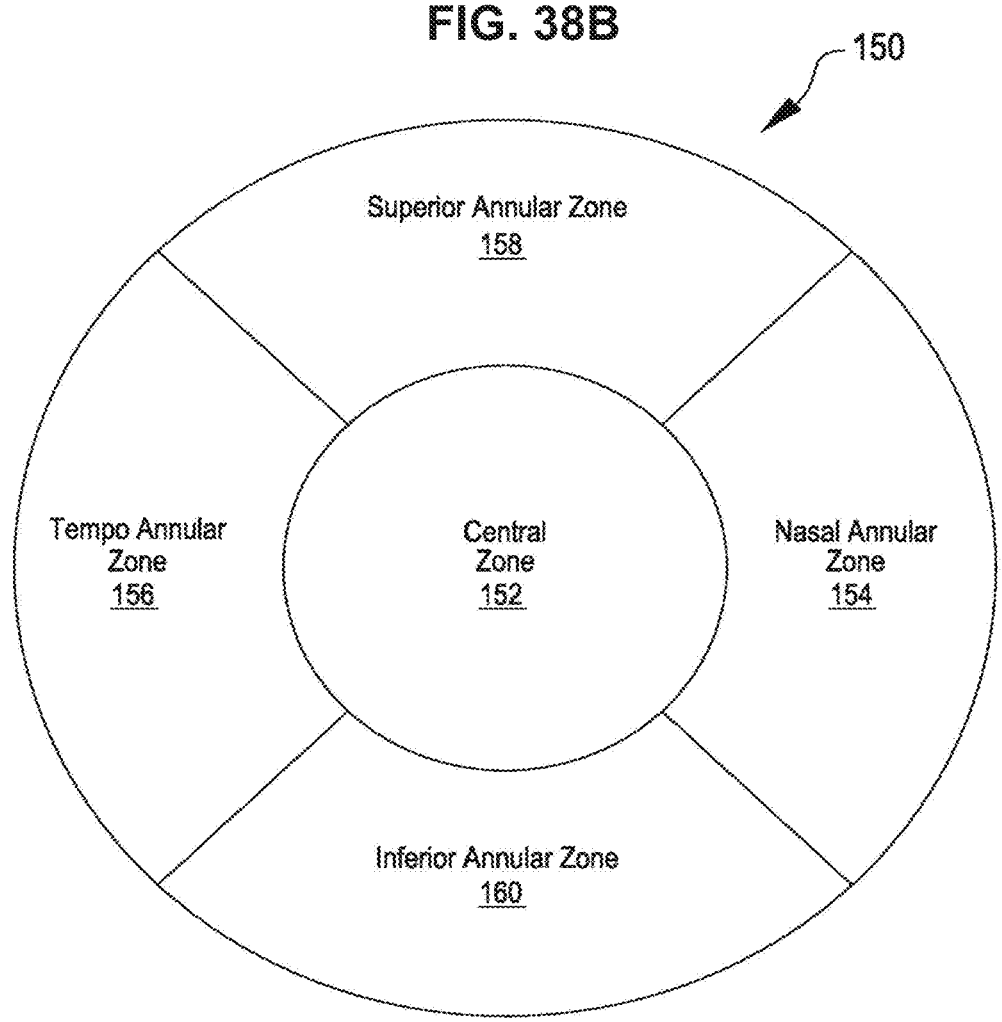
FIG. 38B illustrates an embodiment of an ophthalmic lens configured to inhibit progression of myopia and including four annular sectors.

FIG. 38B illustrates an embodiment of an ophthalmic lens 150 (e.g., glasses, contact lens, cornea, native lens, or intraocular lens) configured to inhibit progression of myopia. The ophthalmic lens 150 includes four annular zones. The ophthalmic lens 150 has a central zone 152, a nasal annular zone 154, a tempo annular zone 156, a superior annular zone 158, and an inferior annular zone 160.

In many embodiments, the central zone 152 is configured to provide a suitable optical correction for the central vision of a subject. For example, the central zone 152 can have subsurface optical elements formed therein that provide a suitable optical correction for the central visions of the subject. As another example, the central zone 152 can have an external shape configured to provide a suitable optical correction for the central vision of the subject. As another example, the central zone 152 can have any suitable combination of subsurface optical elements formed therein and an external shape that combine to provide a suitable optical correction for the central vision of the subject.

The zones 152, 154, 156, 158, 160 can be configured to provide a respective optical correction to light incident on associated regions of the peripheral retina so as to inhibit progression of myopia. For example, the nasal annular zone 154 can be configured to provide an optical correction for light incident on the perifovea tempo region 22T so as to inhibit progression of myopia. The nasal annular zone 154 can be configured to provide an optical correction, in combination with an optical correction provided by the central zone 152, to provide a combined optical correction to light incident on the perafovea tempo region 20T and/or the perifovea tempo region 22T so as to inhibit progression of myopia. The tempo annular zone 156 can be configured to provide an optical correction for light incident on the perifovea nasal region 22N so as to inhibit progression of myopia. The tempo annular zone 156 can be configured to provide an optical correction, in combination with an optical correction provided by the central zone 152, to provide a combined optical correction to light incident on the perafovea nasal region 20N and/or the perifovea nasal region 22N so as to inhibit progression of myopia. The superior annular zone 158 can be configured to provide an optical correction for light incident on the perifovea inferior region 22I so as to inhibit progression of the myopia. The superior annular zone 158 can be configured to provide an optical correction, in combination with an optical correction provided by the central zone 152, to provide a combined optical correction to light incident on the perafovea inferior region 20I and/or the perifovea inferior region 22I so as to inhibit progression of myopia. The inferior annular zone 160 can be configured to provide an optical correction for light incident on the perifovea superior region 22S so as to inhibit progression of myopia. The inferior annular zone 160 can be configured to provide an optical correction, in combination with an optical correction provided by the central zone 152, to provide a combined optical correction to light incident on the perafovea superior region 20S and/or the perifovea superior region 22S so as to inhibit progression of myopia.

Figure 39A:
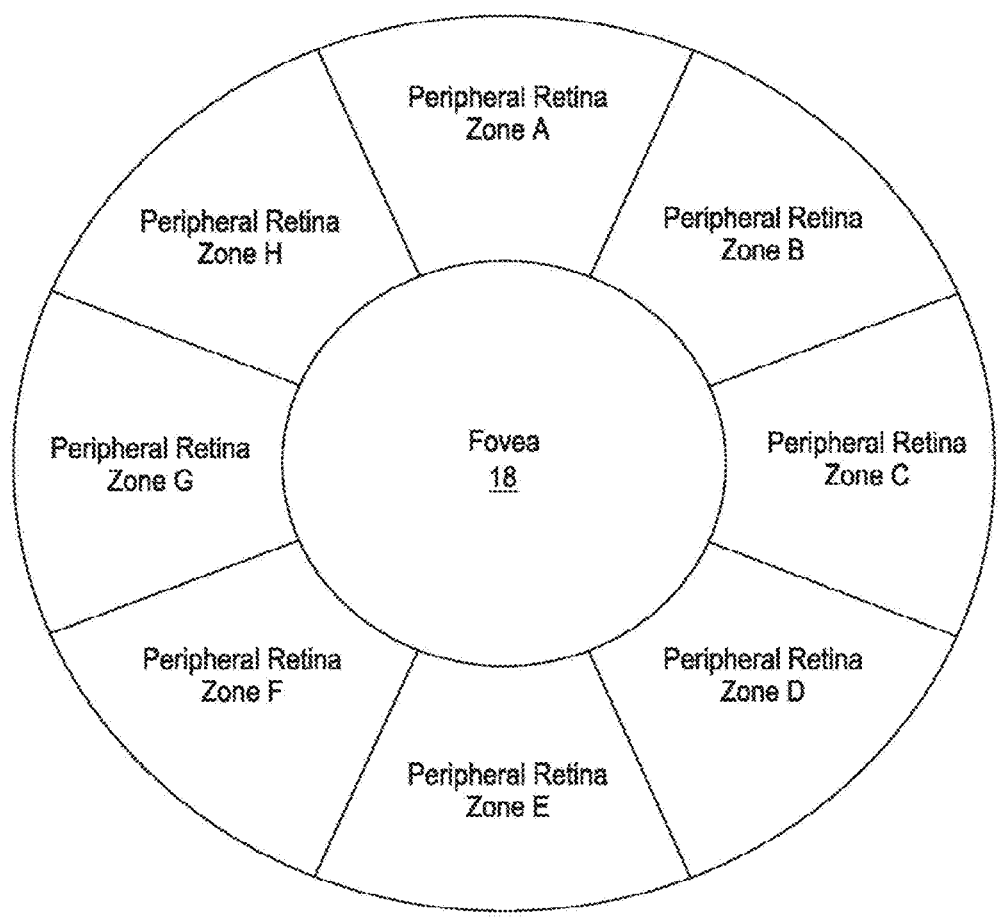
FIG. 39A is a simplified schematic drawing showing regions of a retina.
Figure 39B:
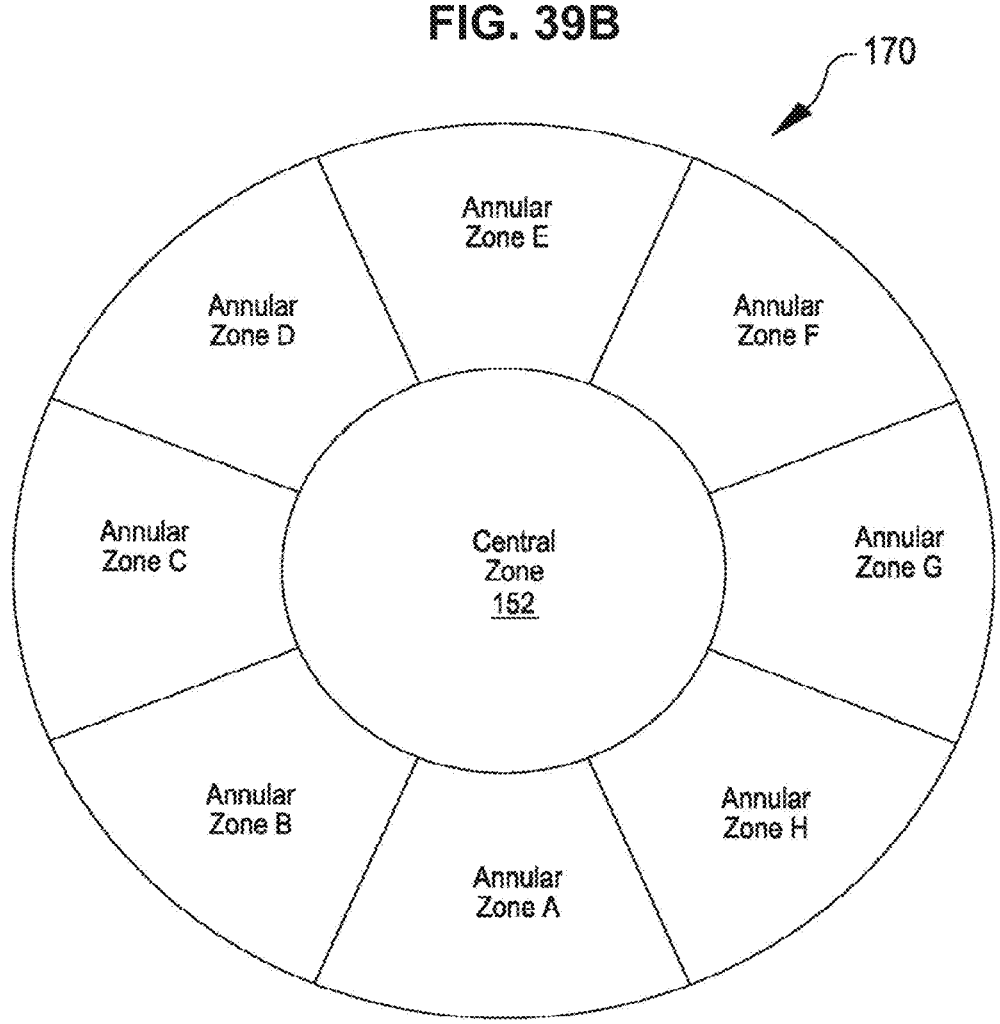
FIG. 39B illustrates an embodiment of an ophthalmic lens configured to inhibit progression of myopia and including eight annular sectors.

Other suitable approaches can be used for defining regions of the retina 16 and associated zones of an ophthalmic lens for providing optical corrections to inhibit progression of myopia. For example, FIG. 39A is a simplified schematic drawing showing another suitable approach for defining regions of the retina 16. In FIG. 39A, the retina 16 is subdivided into the fovea 18 and eight peripheral retinal zones (A through H). FIG. 39B illustrates an ophthalmic lens 170 with a central zone 152 and eight annular zones (A through H). Each of the eight annular zones illustrated in FIG. 39B can be configured to provide a respective optical correction to light incident on associated region of the peripheral retina illustrated in FIG. 39A so as to inhibit progression of myopia. For example, the annular zone (A) of the contact lens 170 can be configured to provide an optical correction for light incident on the peripheral retina zone (A) of FIG. 39A. The annular zone (A) can be configured to provide an optical correction, in combination with an optical correction provided by the central zone 152, to provide a combined optical correction to light incident on the peripheral retina zone (A) of FIG. 39A.

Figure 40B:
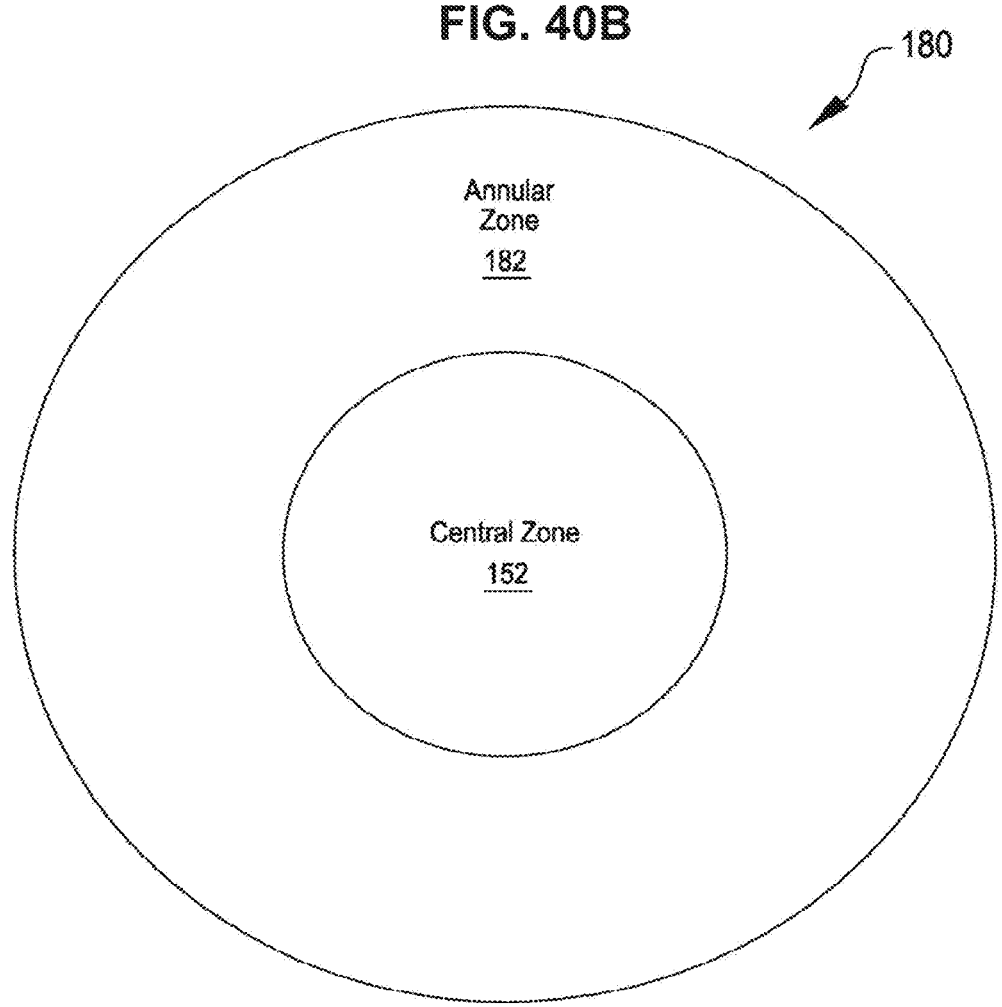
FIG. 40B illustrates an embodiment of an ophthalmic lens configured to inhibit progression of myopia and including an annular zone.

FIG. 40A and FIG. 40B illustrate another approach that can be used for defining regions of the retina 16 and associated zones of an ophthalmic lens for providing optical corrections to inhibit progression of myopia. In FIG. 40A, the retina 16 is subdivided into the fovea 18 and the peripheral retina 20, 22. FIG. 40B illustrates an ophthalmic lens 180 with a central zone 152 and a single continuous annular zone 182. The annular zone 182 can be configured to provide a respective optical correction that to light incident on the peripheral retina 20, 22 so as to inhibit progression of myopia. The annular zone 182 can be configured to provide an optical correction, in combination with an optical correction provided by the central zone 152, to provide a combined optical correction to light incident on the peripheral retina 20, 22.

Figure 41:
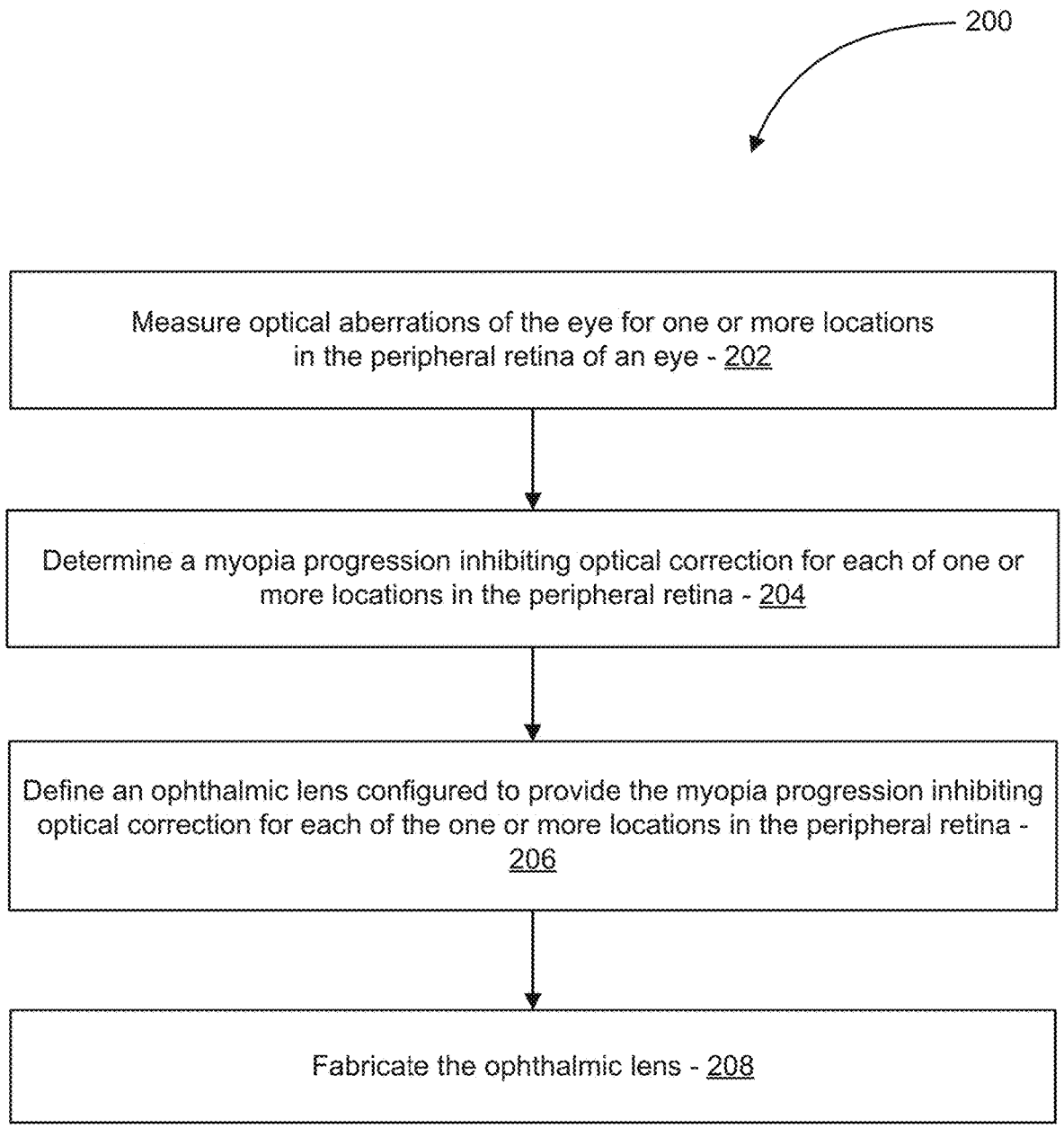
FIG. 41 is a simplified schematic illustration of a method of fabricating an ophthalmic lens configured to inhibit progression of myopia, in accordance with embodiments.

FIG. 41 is a simplified schematic illustration of a method 200 of fabricating an ophthalmic lens configured to inhibit progression of myopia, in accordance with embodiments. Any suitable optical corrections, approaches, and/or systems, including those described herein, can be used to practice the method 200.

In act 202, optical aberrations of an eye of the subject are measured for each of one or more locations in the peripheral retina of the eye. For example, the system 100 can be used to measure optical aberrations for selected locations in the peripheral retina of the eye. In some embodiments, optical aberrations are measured for each of the selected locations for a suitable range of accommodation levels of the eye. In some embodiments, optical aberrations of the eye are measured for one or more locations in the fovea 18 of the eye.

In act 204, a myopia progression inhibiting optical correction is determined for each of one or more locations in the peripheral retina of the eye. In many embodiments, each of the myopia progression inhibiting optical correction determined is based on the respective optical aberrations measured in act 202 and can partially correct or fully correct the respective optical aberrations measured in act 202. In many embodiments, the myopia progression inhibiting optical correction determined for each location in the peripheral retina is configured to reduce a circumferential to radial aspect ratio of an image formed on the oppositely disposed first annular sector of the peripheral retina. In many embodiments, the myopia progression inhibiting optical correction determined for each location in the peripheral retina reduces optical anisotropy, which can be defined as the ratio of the horizontal divided by vertical area under a mean transfer function (MTF) curve between zero and 60 cycles/degree.

In act 206, an ophthalmic lens is designed that provides the myopia progression inhibiting optical correction for each of the one or more locations in the peripheral retina. In some embodiments, the exterior shape of the ophthalmic lens is defined to include a central zone and an annular zone that surrounds the central zone. The exterior surface shape of the central zone can be defined to provide some or all of a central vision correction to an eye. The exterior surface shape of the central zone can also be configured to not provide any of the central vision correction. In embodiments where the external shape of the central zone does not provide all of the central vision correction, subsurface refractive index changes can be determined for forming subsurface optical elements in the central zone that are configured to provide the remaining portion of the central vision correction not provided by the external shape of the central zone. The exterior surface shape of the annular zone can be defined to provide some or all of the one or more myopia progression inhibiting optical corrections for the one or more locations in the peripheral retina. The exterior surface shape of the annular zone can also be configured to not provide any of the one or more myopia progression inhibiting optical corrections. In embodiments where the external shape of the annular zone does not provide all of the one or more myopia progression inhibiting optical corrections, subsurface refractive index changes can be determined for forming subsurface optical elements in the annular zone that are configured to provide the remaining portion of the one or more myopia progression inhibiting optical corrections not provided by the external shape of the annular zone.

In act 208, the ophthalmic lens is fabricated. In embodiments wherein the external shape of the ophthalmic lens provides at least some of the central vision correction and/or at least some of the one or more myopia progression inhibiting optical corrections, the ophthalmic lens can be fabricated to have the defined external surface shape using any suitable known approach, including, but not limited to, lathing, cryo-lathing, molding of all kinds, three-dimensional printing, and any suitable additive manufacturing approach. In embodiments of the ophthalmic lens that include subsurface optical elements, the subsurface refractive index changes can be formed using any suitable approach, such as those described herein and in U.S. Pat. Nos. 8,932,352; 9,939,558, and U.S. Patent Application Publication 2018/0206979; the full disclosure of which are incorporated herein by reference.

Laser and Optical Systems for Forming Subsurface Optical Elements

Figure 42:
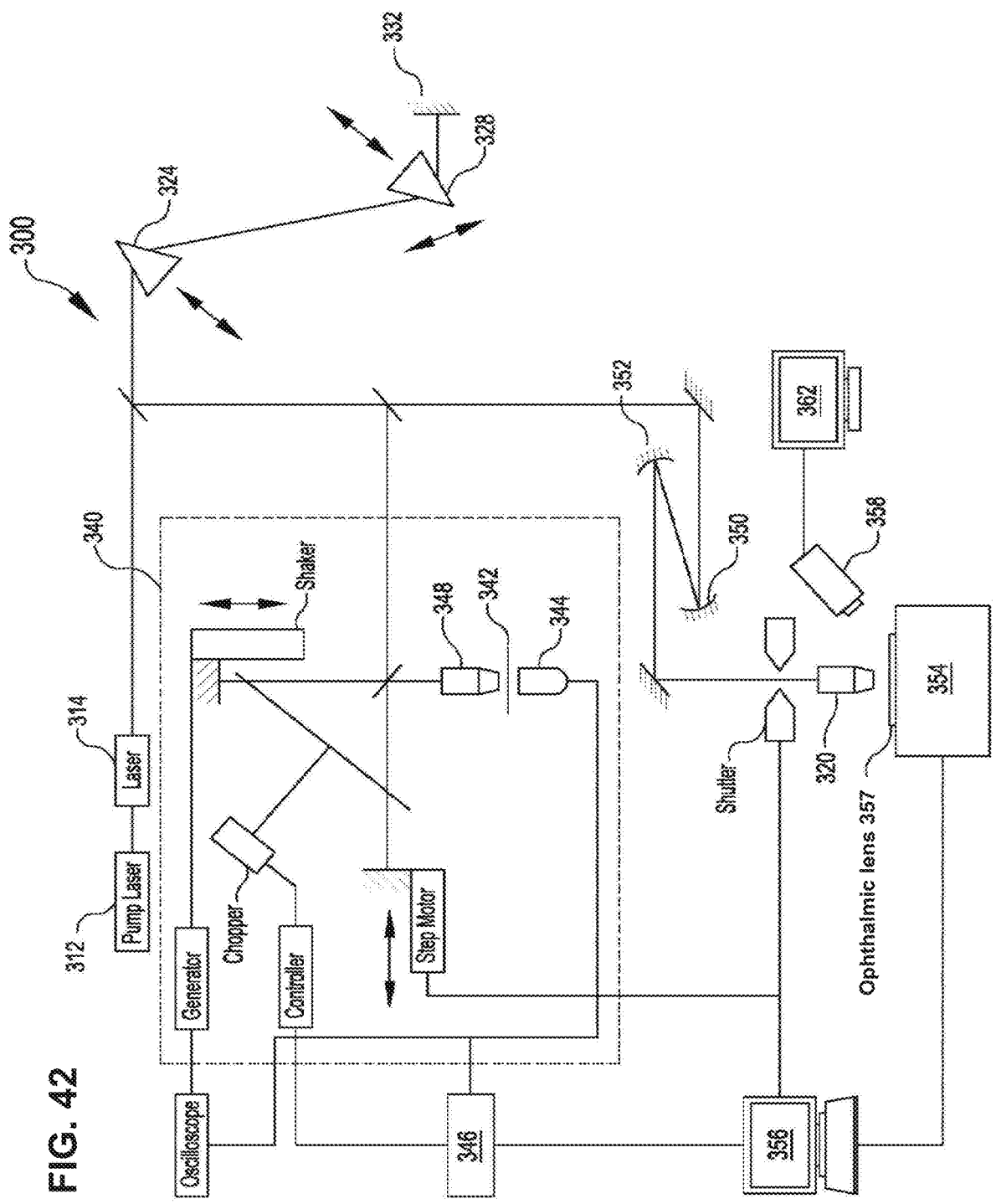
FIG. 42 is a schematic representation of a system that can be used to form subsurface refractive index variations, within an ophthalmic lens, that are configured to inhibit progression of myopia, in accordance with embodiments.

FIG. 42 is a schematic representation of the laser and optical system 300 that can be used to modify an ophthalmic lens to be configured to inhibit progression of myopia, in accordance with embodiments. The system 300 includes a laser source that includes a Kerr-lens mode-locked Ti:Sapphire laser 312 (Kapteyn-Mumane Labs, Boulder, Colo.) pumped by 4 W of a frequency-doubled Nd:YVO$_4$ laser 314. The laser generates pulses of 300 mW average power, fs pulse width, and 93 MHz repetition rate at wavelength of 800 nm. Because there is a reflective power loss from the mirrors and prisms in the optical path, and in particular, from the power loss of the objective 320, the measured average laser power at the objective focus on the material is about 120 mW, which indicates the pulse energy for the femtosecond laser is about 1.3 nJ.

Due to the limited laser pulse energy at the objective focus, the pulse width can be preserved so that the pulse peak power is strong enough to exceed the nonlinear absorption threshold of the ophthalmic lens. Because a large amount of glass inside the focusing objective significantly increases the pulse width due to the positive dispersion inside of the glass, an extra-cavity, compensation scheme can be used to provide the negative dispersion that compensates for the positive dispersion introduced by the focusing objective. Two SF10 prisms 324 and 328 and one ending mirror 332 form a two-pass one-prism-pair configuration. A 37.5 cm separation distance between the prisms can be used to compensate the dispersion of the microscope objective and other optics within the optical path.

A collinear autocorrelator 340 using third-order harmonic generation is used to measure the pulse width at the objective focus. Both 2nd and 3rd harmonic generation have been used in autocorrelation measurements for low NA or high NA objectives. Third order surface harmonic generation (THG) autocorrelation was selected to characterize the pulse width at the focus of the high-numerical-aperture objectives because of its simplicity, high signal to noise ratio and lack of material dispersion that second harmonic generation (SHG) crystals usually introduce. The THG signal is generated at the interface of air and an ordinary cover slip 342 (Corning No. 0211 Zinc Titania glass) and measured with a photomultiplier 344 and a lock-in amplifier 346. After using a set of different high-numerical-aperture objectives and carefully adjusting the separation distance between the two prisms and the amount of glass inserted, a transform-limited 27-fs duration pulse was selected. The pulse is focused by a 60×0.70 NA Olympus LUCPlanFLN long-working-distance objective 348.

Because the laser beam will spatially diverge after it comes out of the laser cavity, a concave mirror pair 350 and 352 is added into the optical path in order to adjust the dimension of the laser beam so that the laser beam can optimally fills the objective aperture. A 3D 100 nm resolution DC servo motor stage 354 (Newport VP-25XA linear stage) and a 2D 0.7 nm resolution piezo nanopositioning stage (P1 P-622.2CD piezo stage) are controlled and programmed by a computer 356 as a scanning platform to support and locate an ophthalmic lens 357. The servo stages have a DC servomotor so they can move smoothly between adjacent steps. An optical shutter controlled by the computer with 1 ms time resolution is installed in the system to precisely control the laser exposure time. With customized computer programs, the optical shutter could be operated with the scanning stages to form the subsurface optical elements in the ophthalmic lens 357 with different scanning speed at different position and depth and different laser exposure time. In addition, a CCD camera 358 along with a monitor 362 is used beside the objective 320 to monitor the process in real time. The system 300 can be used to modify the refractive index of an ophthalmic lens to form subsurface optical elements that provide a myopia progression inhibiting optical correction for each of one or more locations in the peripheral retina.

Figure 43:
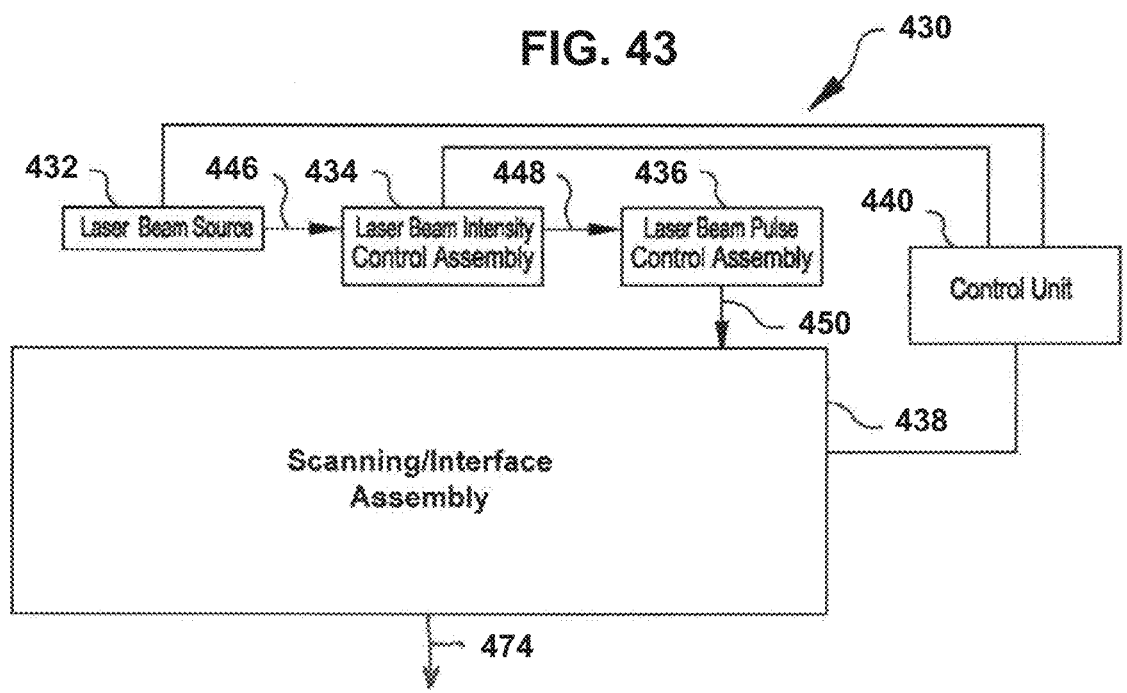
FIG. 43 and FIG. 44 schematically illustrate another system that can be used to form subsurface refractive index variations, within an ophthalmic lens, that are configured to inhibit progression of myopia, in accordance with embodiments.

FIG. 43 is a simplified schematic illustration of another system 430 for forming one or more subsurface optical structures within an ophthalmic lens 410, in accordance with embodiments. The system 430 includes a laser beam source 432, a laser beam intensity control assembly 434, a laser beam pulse control assembly 436, a scanning/interface assembly 438, and a control unit 440.

The laser beam source 432 generates and emits a laser beam 446 having a suitable wavelength for inducing refractive index changes in target sub-volumes of the ophthalmic lens 410. In examples described herein, the laser beam 446 has a 1035 nm wavelength. The laser beam 446, however, can have any suitable wavelength (e.g., in a range from 400 to 1100 nm) effective in inducing refractive index changes in the target sub-volumes of the ophthalmic lens 410.

The laser beam intensity control assembly 434 is controllable to selectively vary intensity of the laser beam 446 to produce a selected intensity laser beam 48 output to the laser beam pulse control assembly 436. The laser beam intensity control assembly 434 can have any suitable configuration, including any suitable existing configuration, to control the intensity of the resulting laser beam 448.

The laser beam pulse control assembly 436 is controllable to generate collimated laser beam pulses 450 having suitable duration, intensity, size, and spatial profile for inducing refractive index changes in the target sub-volumes of the ophthalmic lens 410. The laser beam pulse control assembly 436 can have any suitable configuration, including any suitable existing configuration, to control the duration of the resulting laser beam pulses 450.

The scanning/interface assembly 438 is controllable to selectively scan the laser beam pulses 450 to produce XYZ scanned laser pulses 474. The scanning/interface assembly 438 can have any suitable configuration, including any suitable existing configuration (for example, the configuration illustrated in FIG. 44) to produce the XYZ scanned laser pulses 474. The scanning/interface assembly 438 receives the laser beam pulses 450 and outputs the XYZ scanned laser pulses 474 in a manner that minimizes vignetting. The scanning/interface assembly 438 can be controlled to selectively scan each of the laser beam pulses 450 to generate XYZ scanned laser pulses 474 focused onto targeted sub-volumes of the ophthalmic lens 410 to induce the respective refractive index changes in targeted sub-volumes so as to form the one or more subsurface optical structures within an ophthalmic lens 410. In many embodiments, the scanning/interface assembly 438 is configured to restrain the position of the ophthalmic lens 410 to a suitable degree to suitably control the location of the targeted sub-volumes of the ophthalmic lens 410 relative to the scanning/interface assembly 438. In many embodiments, such as the embodiment illustrated in FIG. 44, the scanning/interface assembly 438 includes a motorized Z-stage that is controlled to selectively control the depth within the ophthalmic lens 410 to which each of the XYZ scanned laser pulses 474 is focused.

The control unit 440 is operatively coupled with each of the laser beam source 432, the laser beam intensity control assembly 434, the laser beam pulse control assembly 436, and the scanning/interface assembly 438. The control unit 440 provides coordinated control of each of the laser beam source 432, the laser beam intensity control assembly 434, the laser beam pulse control assembly 436, and the scanning/interface assembly 438 so that each of the XYZ scanned laser pulses 474 have a selected intensity and duration, and are focused onto a respective selected sub-volume of the ophthalmic lens 410 to form the one or more subsurface optical structures within an ophthalmic lens 410. The control unit 440 can have any suitable configuration. For example, in some embodiments, the control unit 440 includes one or more processors and a tangible memory device storing instructions executable by the one or more processors to cause the control unit 440 to control and coordinate operation of the of the laser beam source 432, the laser beam intensity control assembly 434, the laser beam pulse control assembly 436, and the scanning/interface assembly 438 to produce the XYZ scanned laser pulses 474, each of which is synchronized with the spatial position of the sub-volume optical structure.

Figure 44:
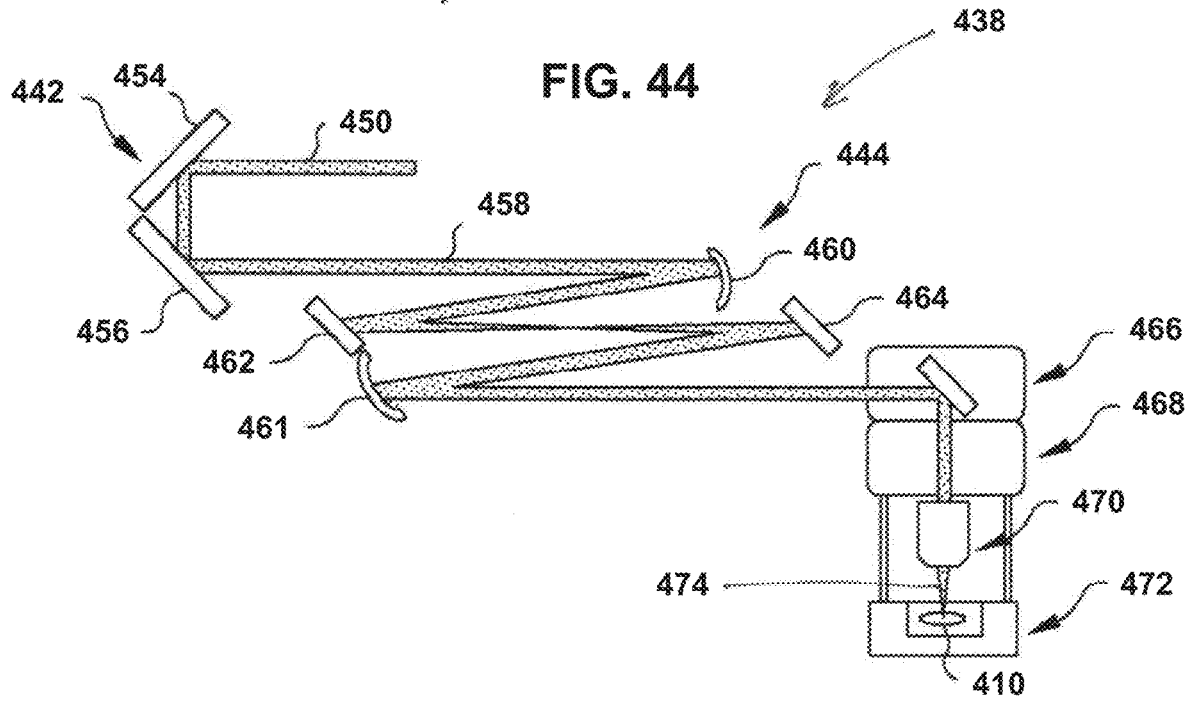

FIG. 44 is a simplified schematic illustration of an embodiment of the scanning/interface assembly 438. In the illustrated embodiment, the scanning/interface assembly 438 includes an XY galvo scanning unit 442, a relay optical assembly 444, a Z stage 466, an XY stage 468, a focusing objective lens 470, and a patient interface/ophthalmic lens holder 472. The XY galvo scanning unit 438 includes XY galvo scan mirrors 454, 456. The relay optical assembly 440 includes concave mirrors 460, 461 and plane mirrors 462, 464.

The XY galvo scanning unit 442 receives the laser pulses 450 (e.g., 1035 nm wavelength collimated laser pulses) from the laser beam pulse control assembly 436. In the illustrated embodiment, the XY galvo scanning unit 442 includes a motorized X-direction scan mirror 454 and a motorized Y-direction scan mirror 456. The X-direction scan mirror 454 is controlled to selectively vary orientation of the X-direction scan mirror 454 to vary direction/position of XY scanned laser pulses 458 in an X-direction transverse to direction of propagation of the XY scanned laser pulses 458. The Y-direction scan mirror 456 is controlled to selectively vary orientation of the Y-direction scan mirror 456 to vary direction/position of the XY scanned laser pulses 458 in a Y-direction transverse to direction of propagation of the XY scanned laser pulses 458. In many embodiments, the Y-direction is substantially perpendicular to the X-direction.

The relay optical assembly 440 receives the XY scanned laser pulses 458 from the XY galvo scanning unit 442 and transfers the XY scanned laser pulses 458 to Z stage 466 in a manner that minimizes vignetting. Concave mirror 460 reflects each of the XY scanned laser pulse 458 to produce a converging laser pulses incident on plane mirror 462. Plane mirror 462 reflects the converging XY scanned laser pulse 458 towards plane mirror 464. Between the plane mirror 462 and the plane mirror 464, the XY scanned laser pulse 458 transitions from being convergent to being divergent. The divergent laser pulse 458 is reflected by plane mirror 464 onto concave mirror 461. Concave mirror 461 reflects the laser pulse 458 to produce a collimated laser pulse that is directed to the Z stage 466.

The Z stage 466 receives the XY scanned laser pulses 458 from the relay optical assembly 442. In the illustrated embodiment, the Z stage 466 and the XY stage 468 are coupled to the focusing objective lens 470 and controlled to selectively position the focusing objective lens 470 relative to the ophthalmic lens 410 for each of the XY scanned laser pulses 474 so as to focus the XYZ scanned laser pulse 474 onto a respective targeted sub-volume of the ophthalmic lens 410. The Z stage 466 is controlled to selectively control the depth within the ophthalmic lens 410 to which the laser pulse is focused (i.e., the depth of the sub-surface volume of the ophthalmic lens 410 on which the laser pulse is focused to induce a change in refractive index of the targeted sub-surface volume). The XY stage 468 is controlled in conjunction with control of the XY galvo scanning unit 442 so that the focusing objective lens 470 is suitably positioned for the respective transverse position of each of the XY scanned laser pulses 458 received by the Z stage 466. The focusing objective lens 470 converges the laser pulse onto the targeted sub-surface volume of the lens 410. The patient interface/ophthalmic lens holder 472 restrains the ophthalmic lens 410 in a fixed position to support scanning of the laser pulses 474 by the scanning/interface assembly 438 to form the subsurface optical structures within the ophthalmic lens 410.

Defining Subsurface Optical Elements for a Specified Optical Correction

FIG. 45 through FIG. 52 illustrate a process that can be used to define subsurface optical elements for a specified optical correction. While an optical correction for inhibiting progression of myopia in a subject using the approaches described herein may be a combination of any suitable number of low-order optical corrections and/or any suitable number of high-order optical corrections, a single, simple 2 diopter optical correction is illustrated. The same process, however, can be used to define subsurface optical elements for an ophthalmic lens to configure the ophthalmic lens to provide an optical correction (such any of the myopia inhibiting optical corrections described herein) that inhibits myopia progression.

Figure 45:
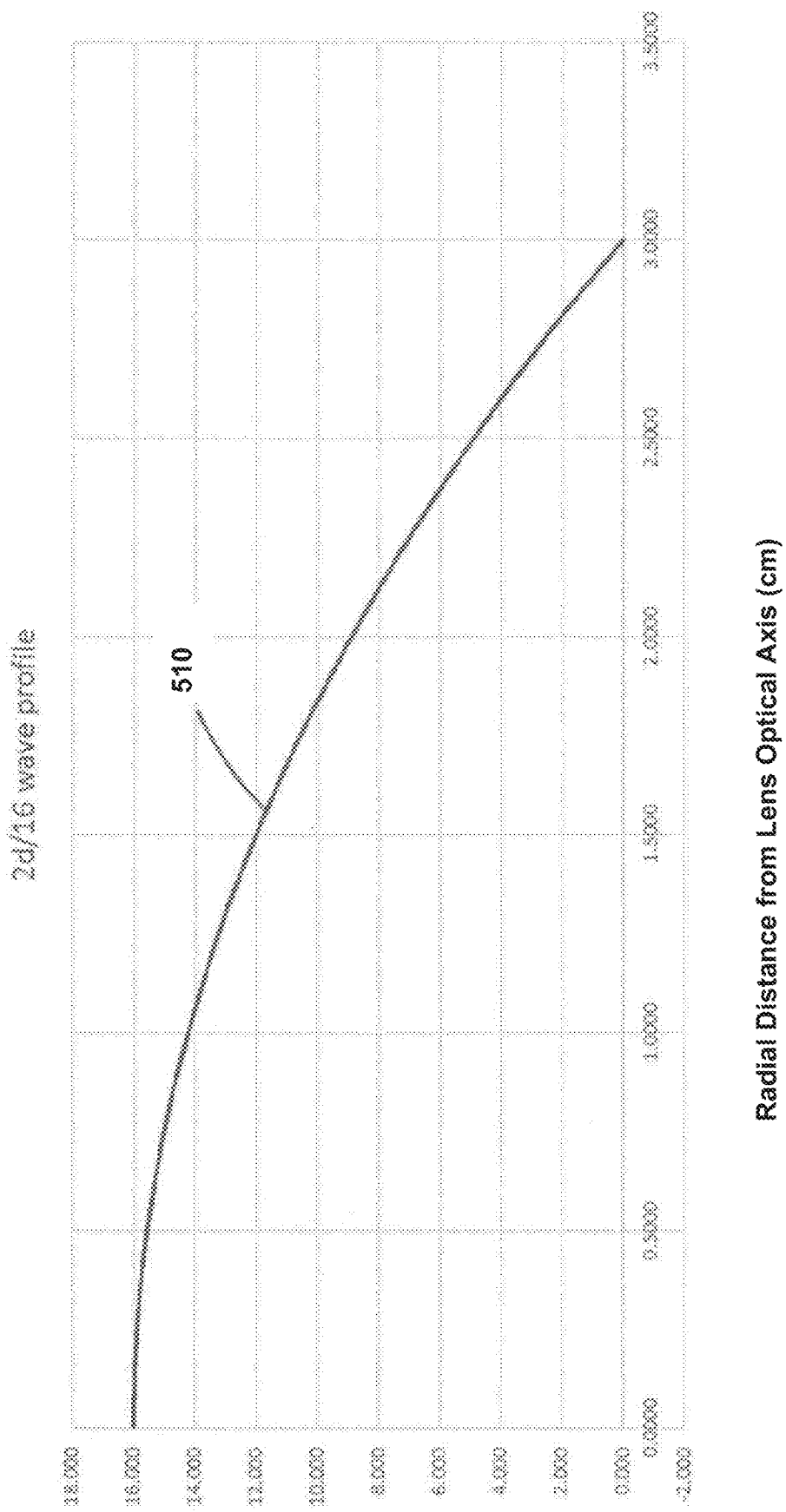
FIG. 45 illustrates an example radial distribution of an optical correction for implementation via subsurface refractive index variations formed within an ophthalmic lens, in accordance with embodiments.

FIG. 45 shows a radial variation in units of optical waves of a 2.0 diopter refractive index distribution 510, in accordance with embodiments. The optical waves in this curve correspond to a design wavelength of 562.5 nm. In the illustrated embodiment, the 2.0 diopter refractive index distribution 510 decreases from a maximum of 16.0 waves at the optical axis of an ophthalmic lens down to 0.0 waves at 3.0 cm from the optical axis.

Figure 46:
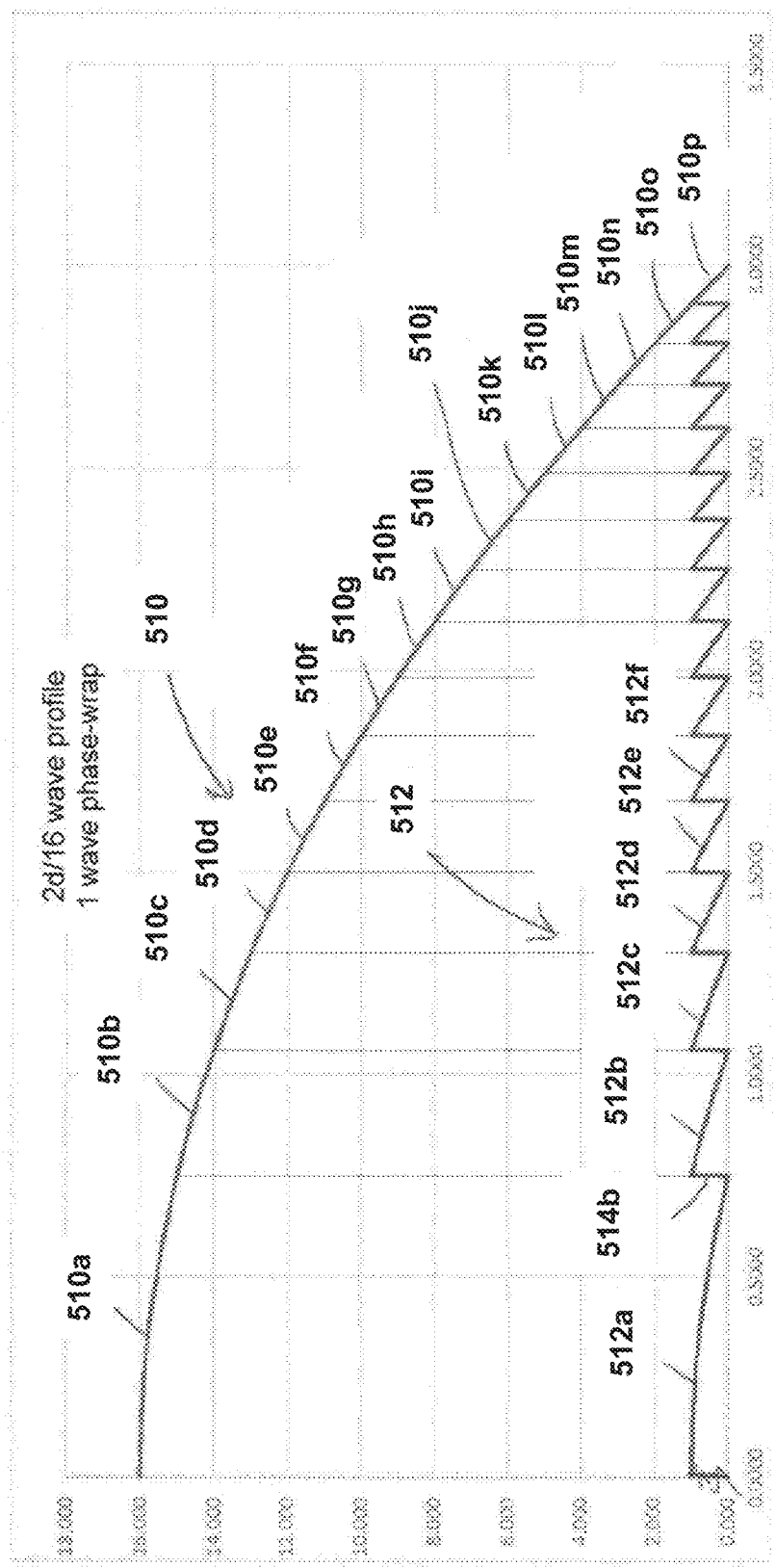
FIG. 46 illustrates a 1-wave phase wrapped distribution for the example optical correction of FIG. 45.

FIG. 46 shows a 1.0 wave phase-wrapped refractive index distribution 512 corresponding to the 2.0 diopter refractive index distribution 510. Each segment of the 1.0 wave phase-wrapped refractive index distribution 512 includes a sloped segment (512a through 512p). Each of all the segments, except the center segment, of the 1.0 wave phase-wrapped refractive index distribution 512 includes a phase discontinuity (514b through 514p) with a height equal to 1.0 wave. Each of the sloped segments (512a through 512p) is shaped to match the corresponding overlying segment (510a through 510p) of the 2.0 diopter refractive index distribution 510. For example, sloped segment 512p matches overlying segment 510p; sloped segment 512o is equal to overlying segment 510o minus 1.0 wave; sloped segment 512n is equal to overlying segment 510n minus 2.0 waves; sloped segment 512a is equal to overlying segment 510a minus 15.0 waves. Each sloped segment corresponds to a Fresnel zone.

The 1.0 wave height of each of the phase discontinuities (514b through 514p) in the distribution 512 results in diffraction at the design wavelength that provides the same 2.0 diopter refractive correction as the 2.0 diopter refractive distribution 510 while limiting maximum phase equal to 1.0 wave.

The 1.0 wave phase-wrapped refractive index distribution 512 requires substantially lower total laser pulse energy to induce in comparison to the 2.0 diopter refractive index distribution 510. The area under the 1.0 wave phase-wrapped refractive index distribution 512 is only about 5.2 percent of the area under the 2.0 diopter refractive index distribution 510.

Figure 47:
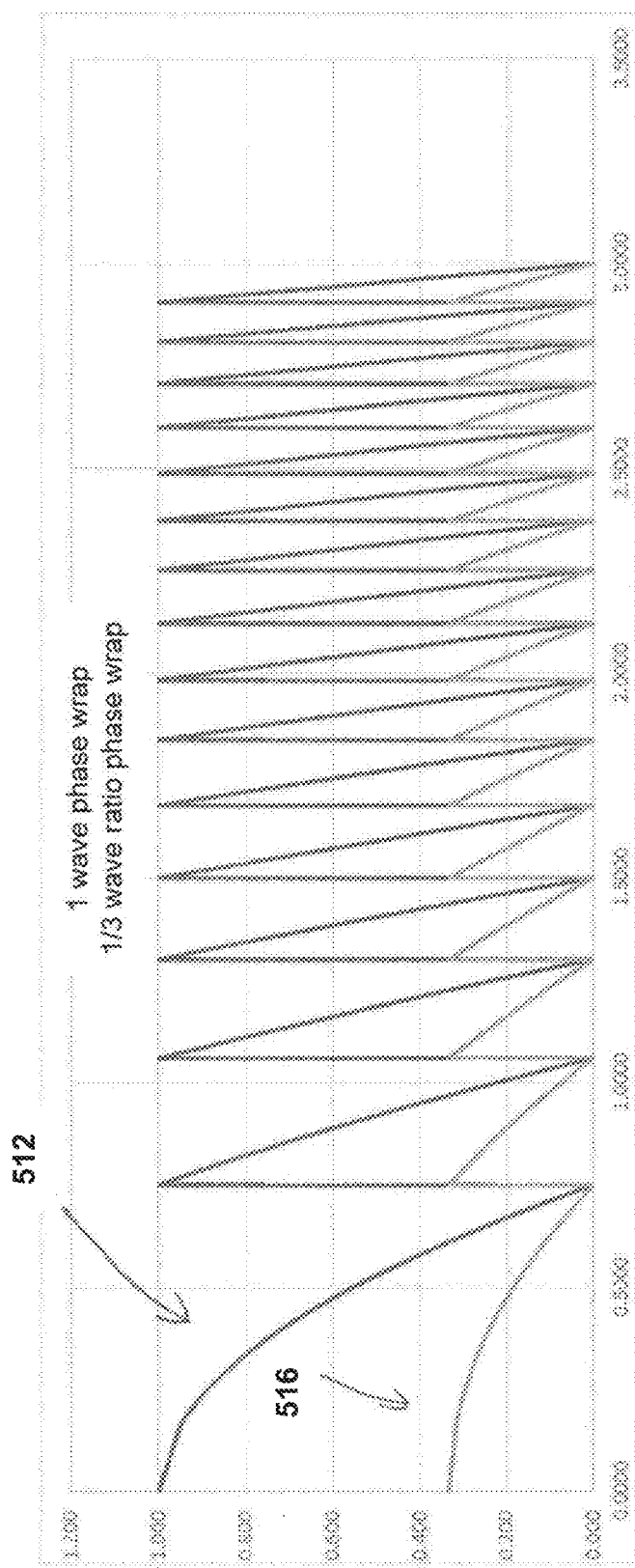
FIG. 47 illustrates a ⅓ wave ratio of the 1-wave phase wrapped distribution of FIG. 46.

FIG. 47 shows the 1.0 wave phase-wrapped refractive index distribution 512 and an example scaled phase-wrapped refractive index distribution (for a selected maximum wave value) corresponding to the 1.0 wave phase-wrapped refractive index distribution 512. In the illustrated embodiment, the example scaled phase-wrapped refractive index distribution has a maximum wave value of ⅓ wave. Similar scaled phase-wrapped refractive index distributions can be generated for other suitable maximum wave values less than 1.0 wave (e.g., ¾ wave, ⅝ wave, ½ wave, ¼ wave, ⅙ wave). The ⅓ optical wave maximum scaled phase-wrapped refractive index distribution 516 is equal to ⅓ of the 1.0 wave phase-wrapped refractive index distribution 512. The ⅓ optical wave maximum scaled phase-wrapped refractive index distribution 516 is one substitute for the 1.0 wave phase-wrapped refractive index distribution 512 and utilizes a maximum refractive index value that provides a corresponding maximum ⅓ wave optical correction.

The ⅓ optical wave maximum scaled phase-wrapped refractive index distribution 516 requires less total laser pulse energy to induce in comparison with the 1.0 wave phase-wrapped refractive index distribution 512. The area under the ⅓ optical wave maximum scaled phase-wrapped refractive index distribution 516 is ⅓ of the area under the 1.0 wave phase-wrapped refractive index distribution 512. Three stacked layers of the ⅓ wave distribution 516 can be used to produce the same optical correction as the 1.0 wave distribution 512.

FIG. 48 graphically illustrates diffraction efficiency for near focus 574 and far focus 576 versus phase change height. For phase change heights less than 0.25 waves, the diffraction efficiency for near focus is only about 10 percent. Near focus diffraction efficiency of substantially greater than 10 percent, however, is desirable to limit the number of layers of the subsurface optical structures that are stacked to generate a desired overall optical correction. Greater phase change heights can be achieved by inducing greater refractive index changes in the targeted sub-volumes of the ophthalmic lens 410. Greater refractive index changes in the targeted sub-volumes of the ophthalmic lens 410 can be induced by increasing energy of the laser pulses focused onto the targeted sub-volumes of the ophthalmic lens 410.

FIG. 49 graphically illustrates an example calibration curve 578 for resulting phase change height as a function of laser pulse optical power. The calibration curve 578 shows correspondence between resulting phase change height as a function of laser average power for a corresponding laser pulse duration, laser pulse wavelength, laser pulse repetition rate, numerical aperture, material of the ophthalmic lens 410, depth of the targeted sub-volume, spacing between the targeted sub-volumes, scanning speed, and line spacing. The calibration curve 578 shows that increasing laser pulse energy results in increased phase change height.

Laser pulse energy, however, may be limited to avoid propagation of damage induced caused by laser pulse energy and/or heat accumulation with the ophthalmic lens 410, or even between the layers of the subsurface optical elements. In many instances, there is no observed damage during formation of the first two layers of subsurface optical elements and damage starts to occur during formation of the third layer of subsurface optical elements. To avoid such damage, the subsurface optical elements can be formed using laser pulse energy below a pulse energy threshold of the material of the ophthalmic lens 410. Using lower pulse energy, however, increases the number of layers of the subsurface optical elements required to provide the desired amount of resulting phase change height, thereby adding to the time required to form the total number of subsurface optical elements 412 employed.

Figure 50:
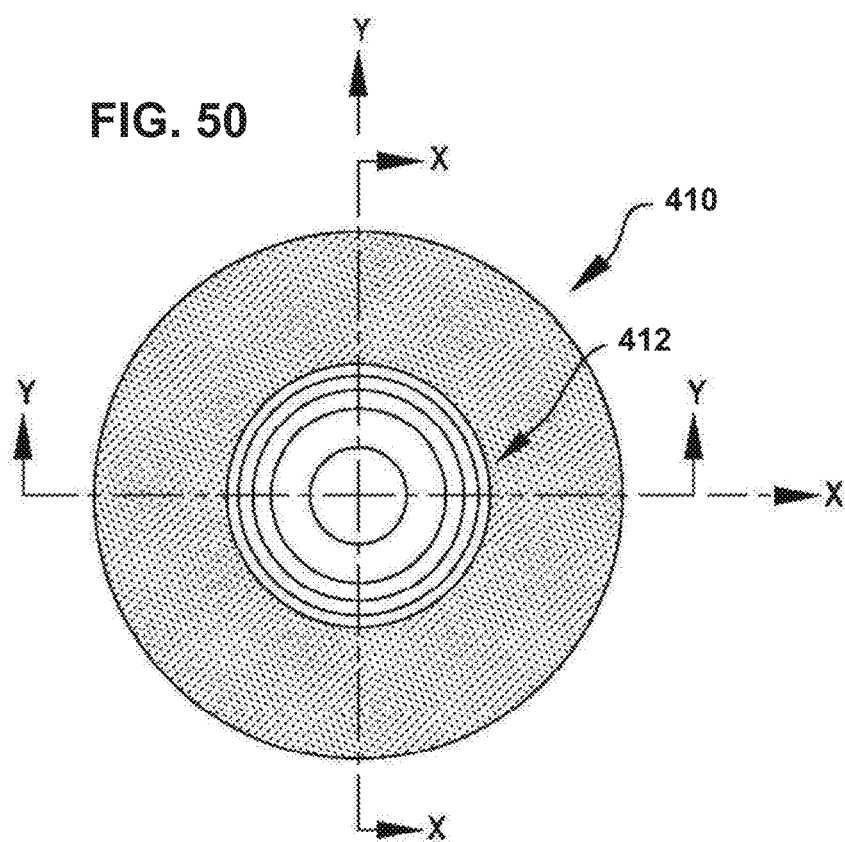
FIG. 50 is a plan view illustration of an ophthalmic lens that includes subsurface refractive index variations, in accordance with embodiments.

FIG. 50 is a plan view illustration of an ophthalmic lens 410 that includes one or more subsurface optical elements 412 with refractive index spatial variations, in accordance with embodiments. The one or more subsurface elements 12 described herein can be formed in any suitable type of ophthalmic lens including, but not limited to, intra-ocular lenses, contact lenses, corneas, spectacle lenses, and native lenses (e.g., a human native lens). The one or more subsurface optical elements 412 with refractive index spatial variations can be configured to provide a suitable refractive correction configured to inhibit progression of myopia as described herein. Additionally, the one or more subsurface optical elements 412 with refractive index spatial variations can be configured to provide a suitable refractive correction for each of many optical aberrations such as astigmatism, myopia, hyperopia, spherical aberrations, coma and trefoil, as well as any suitable combination thereof.

Figure 51:
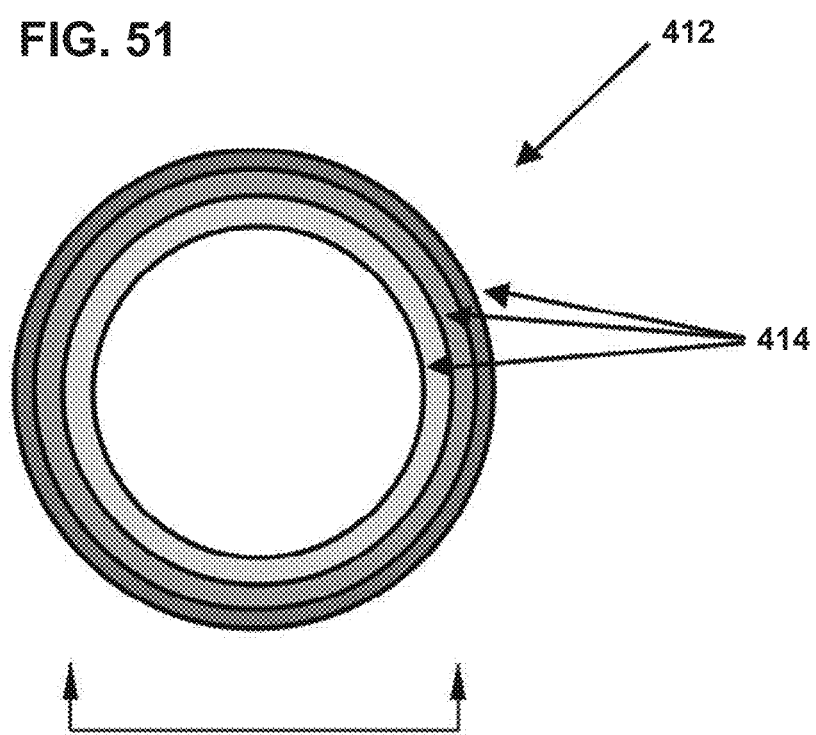
FIG. 51 is a plan view illustration of subsurface refractive index variations of the ophthalmic lens of FIG. 50.

FIG. 51 is a plan view illustration of one of the subsurface optical elements 412 of the ophthalmic lens 410. The illustrated subsurface optical elements 412 occupies a respective volume of the lens 410, which includes associated sub-volumes of the lens 410. In many embodiments, the volume occupied by one of the optical elements 412 includes first, second, and third portions 414. Each of the first, second, and third portions 414 can be formed by focusing suitable laser pulses inside the respective portion 414 so as to induce changes in refractive index in sub-volumes of the lens 410 that make up the respective portion 414 so that each portion 414 has a respective refractive index distribution.

In many embodiments, a refractive index distribution is defined for each portion 414 that forms the subsurface optical structures 412 so that the resulting subsurface optical structures 412 provide a desired optical correction. The refractive index distribution for each portion 414 can be used to determine parameters (e.g., laser pulse power (mW), laser pulse width (fs)) of laser pulses that are focused onto the respective portions 414 to induce the desired refractive index distributions in the portions 414.

While the portions 414 of the subsurface optical structures 412 have a circular shape in the illustrated embodiment, the portions 414 can have any suitable shape and distribution of refractive index variations. For example, a single portion 414 having an overlapping spiral shape can be employed. In general, one or more portions 414 having any suitable shapes can be distributed with intervening spaces so as to provide a desired optical correction for light incident on the subsurface optical structure 412.

Figure 52:
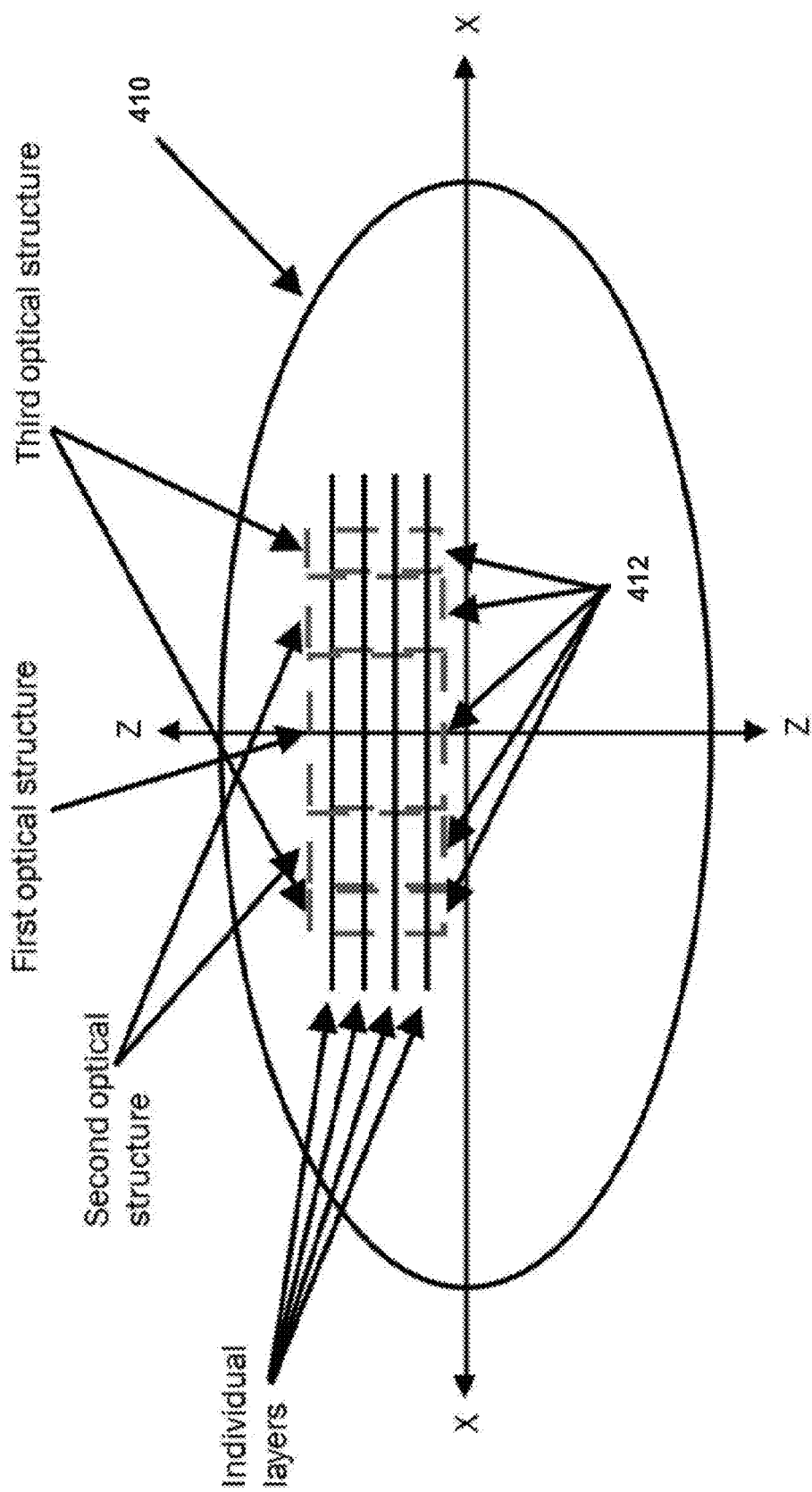
FIG. 52 is a side view illustration of the subsurface refractive index variations of the ophthalmic lens of FIG. 50.

FIG. 52 illustrates an embodiment in which the subsurface optical elements 412 are comprised of several stacked layers that are separated by intervening layer spaces. In the illustrated embodiment, the subsurface optical elements 412 have a spatial distribution of refractive index variations. FIG. 52 is a side view illustration of an example distribution of refractive index variations in the subsurface optical elements 412. In the illustrated embodiment, the subsurface optical elements 412 can be formed using a raster scanning approach in which each layer is sequentially formed starting with the bottom layer and working upward. For each layer, a raster scanning approach can sequentially scan the focal position of the laser pulses along planes of constant Z-dimension while varying the Y-dimension and the X-dimension so that the resulting layers have the flat cross-sectional shapes shown in FIG. 52, which shows a cross-sectional view of the ophthalmic lens 410. In the raster scanning approach, timing of the laser pulses can be controlled to direct each laser pulse onto a targeted sub-volume of the ophthalmic lens 410 and not direct laser pulses onto non-targeted sub-volumes of the ophthalmic lens 410, which include sub-volumes of the ophthalmic lens 10 that do not form any of the subsurface optical elements 412, such as the intervening spaces between the adjacent stacked layers that can form the subsurface optical elements 412.

In the illustrated embodiment, there are three annular subsurface optical elements 412 with distributions of refractive index spatial variations. Each of the illustrated subsurface optical elements 412 has a flat layer configuration and can be comprised of one or more layers. If the subsurface optical structures are comprised of more than one layer, the layers can be separated from each other by an intervening layer spacing. Each of the layers, however, can alternatively have any other suitable general shape including, but not limited to, any suitable non-planar or planar surface. In the illustrated embodiment, each of the subsurface optical elements 412 has a circular outer boundary. Each of the subsurface optical elements 412, however, can alternatively have any other suitable outer boundary shape. Each of the subsurface optical elements 412 can include two or more separate portions 14 with each covering a portion of the subsurface optical elements 412.

FIG. 53A, FIG. 53B, and FIG. 53C illustrate transmission of light onto a portion of the peripheral retina via central and peripheral zones of an ophthalmic lens. FIG. 53A is a simplified front view of an eye 10 showing the pupil 38 and the surrounding iris 40. FIG. 53B is a simplified front view of an ophthalmic lens 190 that has a central optical zone 192, a peripheral optical zone 194, and an outer zone 196. FIG. 53C is a simplified off-optical-axis view illustrating relative contribution of the peripheral optical zone 194 to a peripheral retinal image and the central optical zone 194 to a peripheral retinal image. In view of the contribution of the central optical zone 194 to a peripheral retinal image, in some embodiments, the optical correction provided by the central optical zone 194 is accounted for when determining a myopia mitigating optical correction for the peripheral optical zone 194. The optical correction provided by the central optical zone 194 can also be based in part on a desired correction to a peripheral retinal image provided by the central optical zone 194.

Figure 54B:
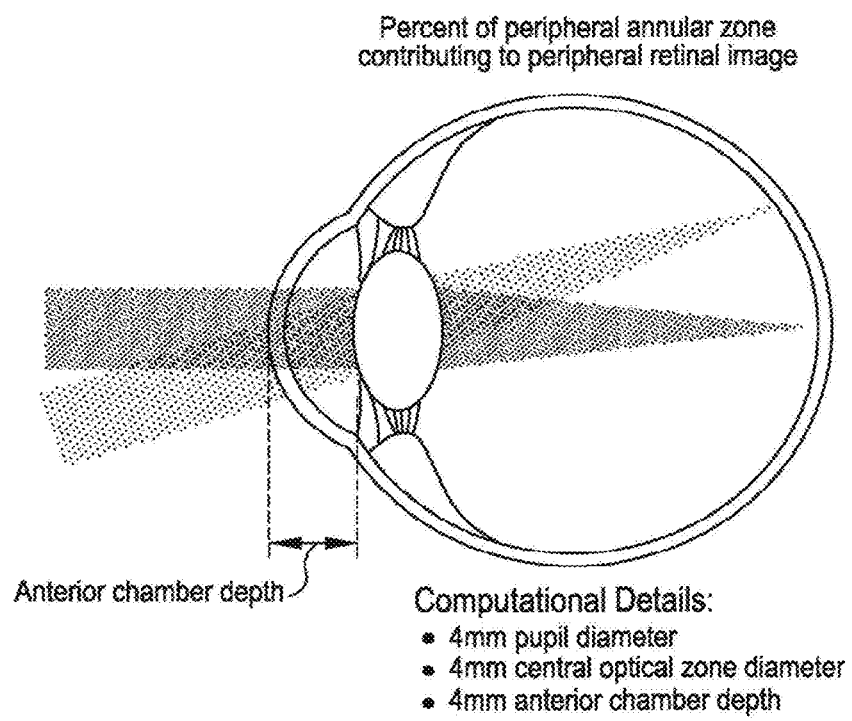

FIG. 54A and FIG. 54B illustrate relative contribution of example peripheral outer zones of an ophthalmic lens to a resulting peripheral retina image. FIG. 54A shows a plot of the percentages of the peripheral annular zone 194 that is within a 4 mm diameter pupil for a 4 mm diameter central optical zone 192. For peripheral viewing eccentricities up to 15 degrees, a 6 mm diameter peripheral annular zone 194 is sufficient in size to maximize the percentage of the peripheral annular zone 194 within the pupil 38. For peripheral viewing eccentricities up to 20 degrees, a 7 mm diameter peripheral annular zone 194 is sufficient in size to maximize the percentage of the peripheral annular zone 194 within the pupil 38. For peripheral viewing eccentricities up to 30 degrees, an 8 mm diameter peripheral annular zone 194 is sufficient in size to maximize the percentage of the peripheral annular zone 194 within the pupil 38. The percentage of the peripheral annular zone 194 within the pupil 38 can be used to guide selection of the inner and outer diameter of the peripheral annular zone 194 for a particular user of the contact lens 24.

FIG. 55 shows example average change in aberrations from 0 degree to 20 degree retinal eccentricity for a group of 10 normal individuals. Retinal image quality was computed, through-focus, in white light for the case of 20 degrees nasal retinal eccentricity (i.e., peripheral visual field). Overall image quality was defined as the average of the horizontal and vertical area under the modulation transfer function (MTF) from 0 to 60 cycles/degree. Optical anisotropy is a measure of the degree rotational asymmetry in an image formed on a peripheral retina. Optical anisotropy is defined herein as the ratio of horizontal divided by vertical area under the MTF and was calculated for a 4 mm diameter circular pupil, which is an approximation. At 20 degree nasal retinal eccentricity, a 4 mm diameter pupil is elliptical with a 4 mm vertical axis and a 3.8 mm short (horizontal) axis. The through-focus range evaluated was −3 to +3 diopters in 0.125 diopter increments.

Example Annular Zone Optical Corrections for Inhibiting Myopia Progression

Through focus optical anisotropy and image quality for 20 degree viewing eccentricity plotted in FIG. 56, FIG. 57, FIG. 58, FIG. 59, FIG. 60, and FIG. 61 were calculated for four cases using an annular optical zone that provided 100 percent coverage of a 4 mm diameter pupil. FIG. 54A, however, shows that an annular optical zone with a 4 mm inner diameter covers only about 35-45% of the pupil at 20 degree viewing eccentricity. Accordingly, the through focus optical anisotropy and the image quality for 20 degree viewing eccentricity plotted in FIG. 56, FIG. 57, FIG. 58, FIG. 59, FIG. 60, and FIG. 61 somewhat overestimate the changes in the optical anisotropy and the image quality provided. The 100 percent coverage of the 4 mm diameter pupil by the annular optical zone used was employed for ease of computation. The four conditions calculated include: (1) a control case 402 of average 20 deg nasal wavefront aberration for 5 mm pupil taken from 10 normal individuals, whose peripheral aberrations were published in Zheleznyak et al., Journal of Vision, 20161; (2) cylinder correction 404 only applied to the control case; (3) a multifocal correction 406 applied to the control case with 1.5 diopters of add power with 0.4 waves of optical phase change; (4) a cylinder correction and the multifocal correction 408 from #3 applied to the control case.

Figure 56:
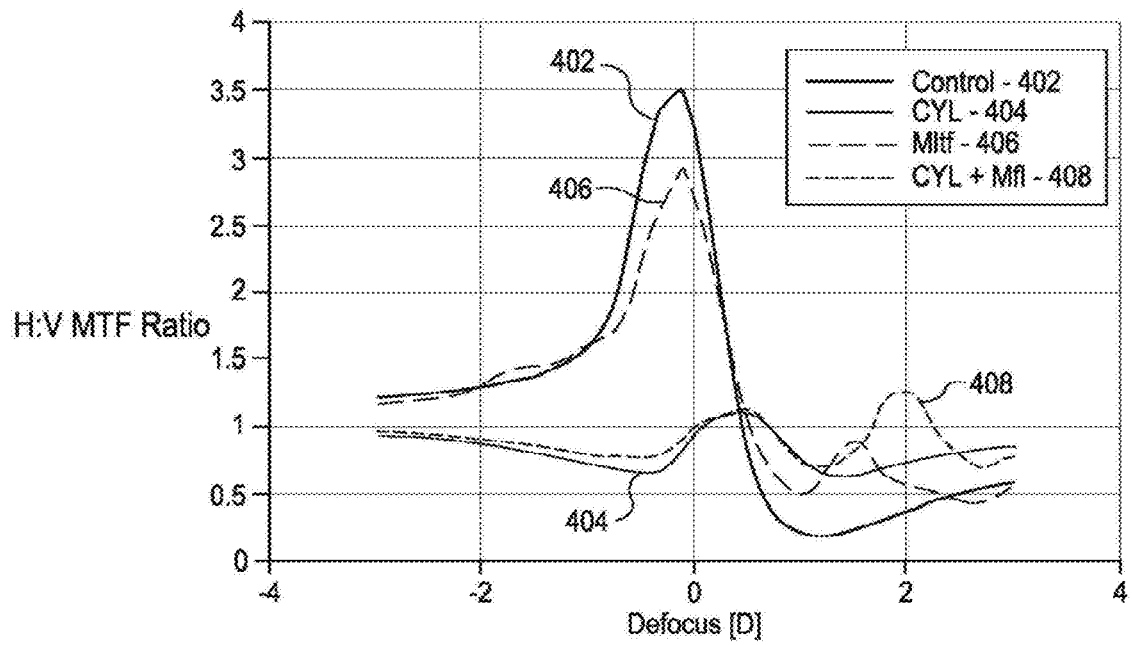
FIG. 56 is a plot of peripheral retinal image symmetry over a range of accommodation levels for example contact lens induced optical corrections.

FIG. 56 is a plot of peripheral retinal image asymmetry (20 degree viewing eccentricity) over a range of accommodation levels for example contact lens induced optical corrections. The x-axis is the defocus or object distance in units of diopters. A diopter is an inverse meter. The y-axis is optical anisotropy, defined as the ratio of the horizontal divided by vertical area-under-the-MTF (between 0 and 60 cyc/deg). A y-axis value of 1 indicates rotational symmetry. A y-axis value of greater than 1 indicates horizontally elongated image. A y-axis value of less than 1 indicates vertically elongated image. The control case shows the largest optical anisotropy. The cylinder correction produces a large reduction in the optical anisotropy.

Figure 57:
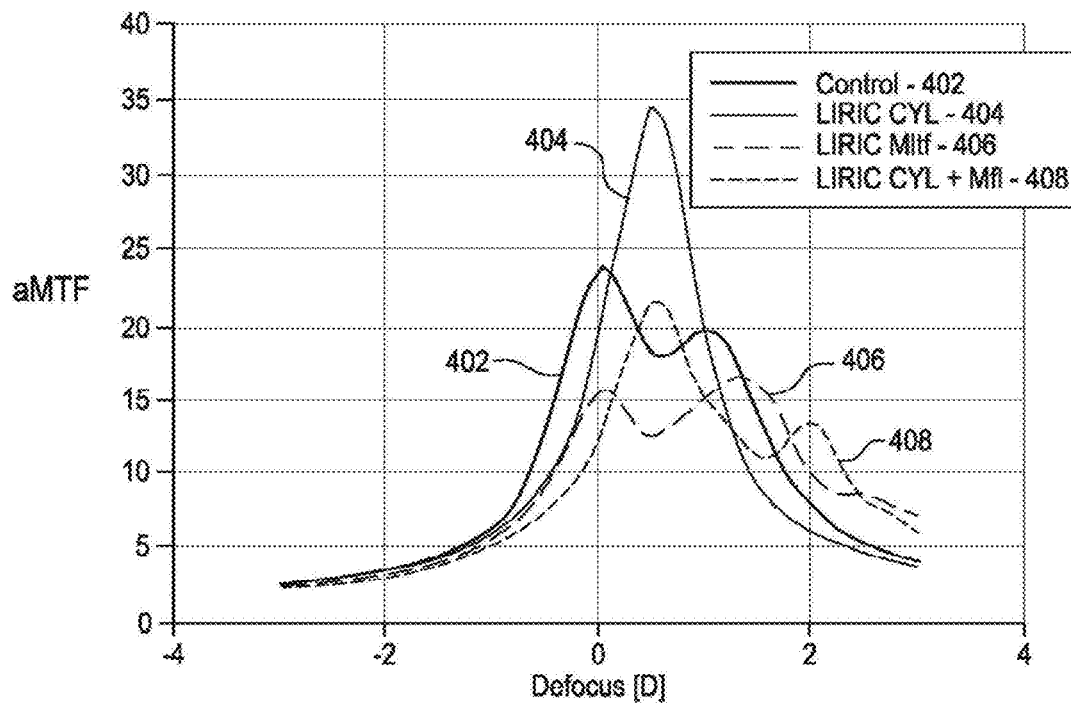
FIG. 57 is a plot of peripheral retinal image quality over a range of accommodation levels for example contact lens induced optical corrections.

FIG. 57 is a plot of peripheral retinal image quality (20 degree viewing eccentricity) over a range of accommodation levels for example contact lens induced optical corrections. The x-axis is the defocus or object distance in units of diopters. The y-axis is retinal image quality, defined as the average of the horizontal and vertical area-under-the-MTF (between 0 and 60 cyc/deg). The larger the y-axis value, the better the image quality. The cylinder correction provides the best peak image quality. The combination of the cylinder correction and the multifocal correction provides the largest depth of focus and the lowest anisotropy (as shown in FIG. 56).

Figure 58:
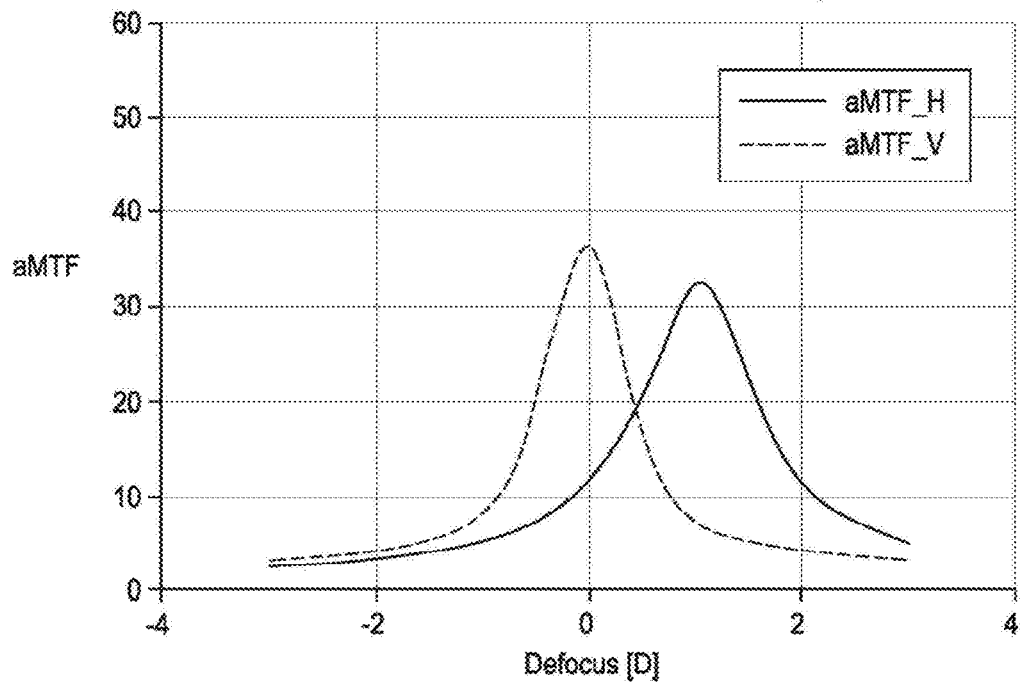
FIG. 58 is a plot of horizontal and vertical peripheral retinal image quality over a range of accommodation levels for an example control case.
Figure 59:
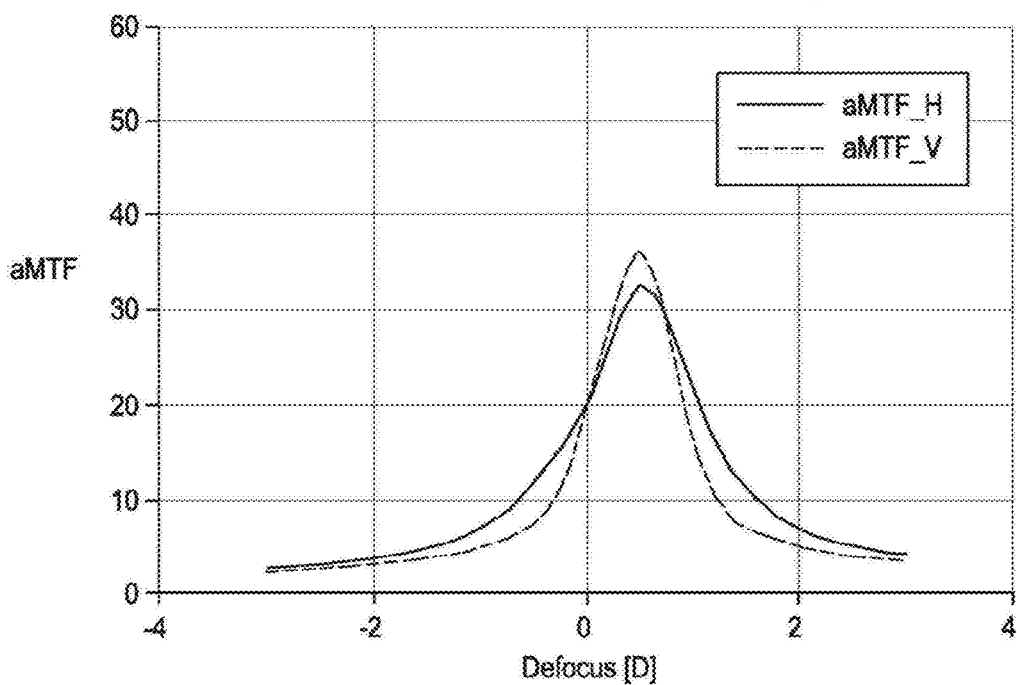
FIG. 59 is a plot of horizontal and vertical peripheral retinal image quality over a range of accommodation levels for the example control case and an ophthalmic lens configured to provide a cylindrical correction.
Figure 60:
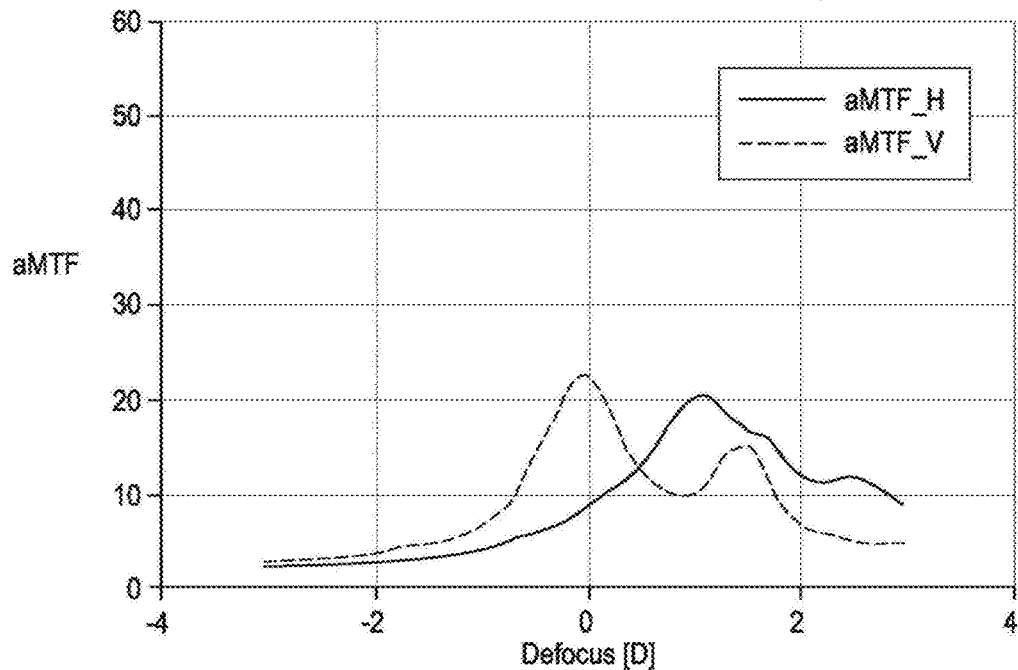
FIG. 60 is a plot of horizontal and vertical peripheral retinal image quality over a range of accommodation levels for the example control case and an ophthalmic lens configured to provide a bifocal correction.
Figure 61:
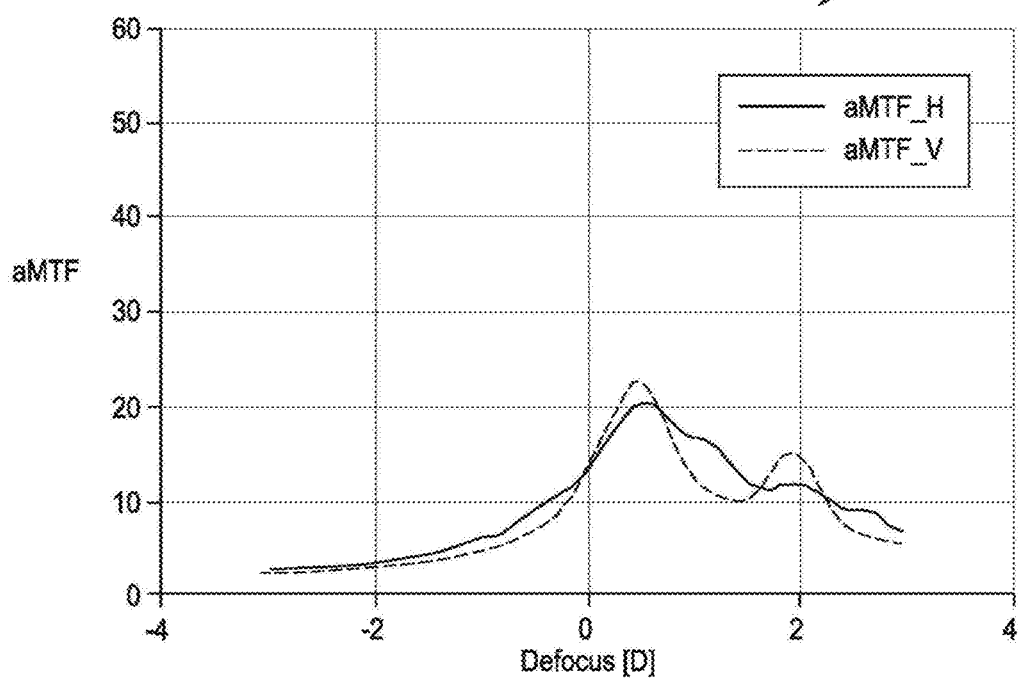
FIG. 61 is a plot of horizontal and vertical peripheral retinal image quality over a range of accommodation levels for the example control case and an ophthalmic lens configured to provide a cylindrical and bifocal correction.

FIG. 58, FIG. 59, FIG. 60, and FIG. 61 are plots of horizontal and vertical peripheral retinal image quality over a range of accommodation levels for the four conditions. FIG. 58 is a plot of horizontal and vertical peripheral retinal image quality over a range of accommodation levels for the control case 402. FIG. 59 is a plot of horizontal and vertical peripheral retinal image quality over a range of accommodation levels for the control case with an ophthalmic lens having subsurface refractive optical elements providing the cylindrical correction 404. FIG. 60 is a plot of horizontal and vertical peripheral retinal image quality over a range of accommodation levels for the control case with an ophthalmic lens having subsurface refractive optical elements providing the bifocal correction 406. FIG. 61 is a plot of horizontal and vertical peripheral retinal image quality over a range of accommodation levels for the control case with an ophthalmic lens having subsurface refractive optical elements providing the cylindrical and bifocal correction 408. The cylinder correction provides the best peak image quality. The combination of the cylinder correction and the multifocal correction provides the largest depth of focus and lowest anisotropy (as shown in FIG. 56).

Any of the ophthalmic lenses 24, 150, 170, 180, 190 described herein can be configured to ensure proper orientation so that each of the annular zones is aligned with the associated region in the peripheral retina. For example, a contact lens can include any one or more suitable design features that cause the contact lens to rotate to the proper orientation on the cornea. In some embodiments, a contact lens is weighted at the bottom to cause the contact lens to rotate to, and maintain, the proper orientation on the cornea so that each of the annular zones in the contact lens is aligned with the associated region in the peripheral retina.

Example Embodiments

Example 1 is an ophthalmic lens configured to inhibit progression of myopia in a user having a retina comprising a central retina and a peripheral retina. The example 1 ophthalmic lens includes a central zone and an annular zone. The annular zone surrounds the central zone and includes a first annular sector configured to provide a first myopia inhibiting wavefront correction to light from a first peripheral vision region of a peripheral visual field of the user. The first annular sector is configured so that light from the first peripheral vision region passes through the first annular sector to form an image of the first peripheral vision region on a first annular region of the peripheral retina. The first myopia inhibiting wavefront correction is configured to reduce a first circumferential-to-radial aspect ratio of the image of the first peripheral vision region, and wherein the first circumferential-to-radial aspect ratio is defined as a circumferential length of the image of the first peripheral vision region in a first circumferential direction of the retina divided by a radial length of the image of the first peripheral vision region in a first radial direction of the peripheral retina.

Example 2 is the ophthalmic lens of example 1, wherein the first annular sector is disposed on an opposite side of an eye of the user relative to the first annular region of the peripheral retina.

Example 3 is the ophthalmic lens of example 1, wherein the first myopia inhibiting wavefront correction includes a first positive sphere correction of at least 0.5 diopter to the light from the first peripheral vision region that passes through the first annular sector and forms the image of the first peripheral vision region on the first annular region of the peripheral retina.

Example 4 is the ophthalmic lens of example 1, wherein the first myopia inhibiting wavefront correction comprises a first positive sphere correction of at least 1.0 diopter to the light from the first peripheral vision region that passes through the first annular sector and forms the image of the first peripheral vision region on the first annular region of the peripheral retina.

Example 5 is the ophthalmic lens of example 1, wherein the first myopia inhibiting wavefront correction comprises a first positive sphere correction of at least 1.25 diopter to the light from the first peripheral vision region that passes through the first annular sector and forms the image of the first peripheral vision region on the first annular region of the peripheral retina.

Example 6 is the ophthalmic lens of example 1, wherein the first myopia inhibiting wavefront correction comprises a first positive sphere correction of at least 1.5 diopter to the light from the first peripheral vision region that passes through the first annular sector and forms the image of the first peripheral vision region on the first annular region of the peripheral retina.

Example 7 is the ophthalmic lens of example 1, further including an annular transition zone disposed between the central zone and the annular zone. The central zone is configured to provide an on-axis wavefront correction to the central retina. The annular transition zone is configured to provide an annular transition zone wavefront correction that transitions from the on-axis wavefront correction provided by the central zone to the first myopia inhibiting wavefront correction provided by the first annular sector.

Example 8 is the ophthalmic lens of example 1, wherein the annular zone includes a first radial treatment zone and a second radial treatment zone. The first radial treatment zone surrounds the central zone and is configured to provide a first radial treatment zone myopia inhibiting wavefront correction for a first annular portion of the peripheral retina. The second radial treatment zone surrounds the first radial treatment zone and is configured to provide a second radial treatment zone myopia inhibiting wavefront correction for a second annular portion of the peripheral retina that surrounds the first annular portion of the peripheral retina.

Example 9 is the ophthalmic lens of example 1, wherein the annular zone includes a first treatment type zone and a second treatment type zone. The first treatment type zone is configured to increase contrast in the peripheral retina. The second treatment type zone is configured to decrease contrast in the peripheral retina.

Example 10 is the ophthalmic lens of example 9, wherein the second treatment type zone is configured to induce scatter.

Example 11 is the ophthalmic lens of example 10, wherein the second treatment type zone includes optical elements that form defocus elements.

Example 12 is the ophthalmic lens of example 11, wherein each of the defocus elements has a diameter in a range from 0.1 to 1.0 mm and a power in a range from 1.0 to 3.0 diopters of defocus.

Example 13 is the ophthalmic lens of example 12, wherein the defocus elements are arranged in a pattern with an inter-element spacing in a range from 0.1 to 1.0 mm.

Example 14 is the ophthalmic lens of example 10, wherein the second treatment type zone includes random subsurface optical elements configured to induce scatter.

Example 15 is the ophthalmic lens of example 14, wherein the random subsurface optical elements are configured to induce a range of wavefront corrections between 0.1 and 1.0 waves at 550 nm wavelength.

Example 16 is the ophthalmic lens of example 1, further including a myopia inhibiting compound incorporated to provide for release into an eye of the user over time.

Example 17 is the ophthalmic lens of example 16, wherein the myopia inhibiting compound includes atropine.

Example 18 is the ophthalmic lens of any one of example 1 through example 17, wherein external surfaces of the first annular sector are shaped to produce the first myopia inhibiting wavefront correction.

Example 19 is the ophthalmic lens of example 18, wherein an optical phase height of the first myopia inhibiting wavefront correction varies in magnitude in a first circumferential direction of the ophthalmic lens.

Example 20 is the ophthalmic lens of example 19, wherein a thickness of the first annular sector varies in the first circumferential direction of the ophthalmic lens.

Example 21 is the ophthalmic lens of example 19, wherein the optical phase height of the first myopia inhibiting wavefront correction has a maximum absolute height in a central portion of the first annular sector.

Example 22 is the ophthalmic lens of example 21, wherein the optical phase height of the first myopia inhibiting wavefront correction varies in a first radial direction of the ophthalmic lens.

Example 23 is the ophthalmic lens of any one of example 1 through example 17, wherein exterior surfaces of the first annular sector are shaped to produce a first portion of the first myopia inhibiting wavefront correction and the first annular sector includes subsurface refractive index variations configured to produce a second portion of the first myopia inhibiting wavefront correction.

Example 24 is the ophthalmic lens of any one of example 1 through example 17, wherein the first annular sector includes subsurface refractive index variations configured to produce the first myopia inhibiting wavefront correction.

Example 25 is the ophthalmic lens of example 24, wherein the first myopia inhibiting wavefront correction has phase-wrapped configuration equivalent to a non-phase-wrapped configuration of the first myopia inhibiting wavefront correction and an optical phase height of the non-phase-wrapped configuration of the first myopia inhibiting wavefront correction varies in a first circumferential direction of the ophthalmic lens.

Example 26 is the ophthalmic lens of example 25, wherein the optical phase height of the non-phase-wrapped configuration of the first myopia inhibiting wavefront correction has a maximum absolute height in a central portion of the first annular sector.

Example 27 is the ophthalmic lens of example 26, wherein the optical phase height of the non-phase-wrapped configuration of the first myopia inhibiting wavefront correction varies in a first radial direction of the ophthalmic lens.

Example 28 is the ophthalmic lens of example 1, wherein: (1) the annular zone further comprises a second annular sector and a third annular sector, (2) the second annular sector is configured to provide a second myopia inhibiting wavefront correction to light from a second peripheral vision region of the peripheral visual field, (3) the second annular sector is configured so that light from the second peripheral vision region passes through the second annular sector to form an image of the second peripheral vision region on a second annular region of the peripheral retina, (4) the second myopia inhibiting wavefront correction is configured to reduce a second circumferential-to-radial aspect ratio of the image of the second peripheral vision region, (5) the second circumferential-to-radial aspect ratio is defined as a circumferential length of the image of the second peripheral vision region in a second circumferential direction of the retina divided by a radial length of the image of the second peripheral vision region in a second radial direction of the peripheral retina, (6) the third annular sector is configured to provide a third myopia inhibiting wavefront correction to light from a third peripheral vision region of the peripheral visual field, (7) the third annular sector is configured so that light from the third peripheral vision region passes through the third annular sector to form an image of the third peripheral vision region on a third annular region of the peripheral retina, (8) the third myopia inhibiting wavefront correction is configured to reduce a third circumferential-to-radial aspect ratio of the image of the third peripheral vision region, and (9) the third circumferential-to-radial aspect ratio is defined as a circumferential length of the image of the third peripheral vision region in a third circumferential direction of the retina divided by a radial length of the image of the third peripheral vision region in a third radial direction of the peripheral retina.

Example 29 is the ophthalmic lens of example 28, wherein the first annular sector is disposed on an opposite side of an eye of the user relative to the first annular region of the peripheral retina, the second annular sector is disposed on an opposite side of the eye of the user relative to the second annular region of the peripheral retina, and the third annular sector is disposed on an opposite side of the eye of the user relative to the third annular region of the peripheral retina.

Example 30 is the ophthalmic lens of example 28, wherein: (1) the first myopia inhibiting wavefront correction includes a first positive sphere correction of at least 0.5 diopter to the light from the first peripheral vision region that passes through the first annular sector and forms the image of the first peripheral vision region on the first annular region of the peripheral retina, (2) the second myopia inhibiting wavefront correction includes a second positive sphere correction of at least 0.5 diopter to the light from the second peripheral vision region that passes through the second annular sector and forms the image of the second peripheral vision region on the second annular region of the peripheral retina, and (3) the third myopia inhibiting wavefront correction includes a third positive sphere correction of at least 0.5 diopter to the light from the third peripheral vision region that passes through the third annular sector and forms the image of the third peripheral vision region on the third annular region of the peripheral retina.

Example 31 is the ophthalmic lens of example 28, wherein: (1) the first myopia inhibiting wavefront correction includes a first positive sphere correction of at least 1.0 diopter to the light from the first peripheral vision region that passes through the first annular sector and forms the image of the first peripheral vision region on the first annular region of the peripheral retina, (2) the second myopia inhibiting wavefront correction includes a second positive sphere correction of at least 1.0 diopter to the light from the second peripheral vision region that passes through the second annular sector and forms the image of the second peripheral vision region on the second annular region of the peripheral retina, and (3) the third myopia inhibiting wavefront correction includes a third positive sphere correction of at least 1.0 diopter to the light from the third peripheral vision region that passes through the third annular sector and forms the image of the third peripheral vision region on the third annular region of the peripheral retina.

Example 32 is the ophthalmic lens of example 28, wherein: (1) the first myopia inhibiting wavefront correction includes a first positive sphere correction of at least 1.25 diopter to the light from the first peripheral vision region that passes through the first annular sector and forms the image of the first peripheral vision region on the first annular region of the peripheral retina, (2) the second myopia inhibiting wavefront correction includes a second positive sphere correction of at least 1.25 diopter to the light from the second peripheral vision region that passes through the second annular sector and forms the image of the second peripheral vision region on the second annular region of the peripheral retina, and (3) the third myopia inhibiting wavefront correction includes a third positive sphere correction of at least 1.25 diopter to the light from the third peripheral vision region that passes through the third annular sector and forms the image of the third peripheral vision region on the third annular region of the peripheral retina.

Example 33 is the ophthalmic lens of example 28, wherein: (1) the first myopia inhibiting wavefront correction includes a first positive sphere correction of at least 1.5 diopter to the light from the first peripheral vision region that passes through the first annular sector and forms the image of the first peripheral vision region on the first annular region of the peripheral retina, (2) the second myopia inhibiting wavefront correction includes a second positive sphere correction of at least 1.5 diopter to the light from the second peripheral vision region that passes through the second annular sector and forms the image of the second peripheral vision region on the second annular region of the peripheral retina, and (3) the third myopia inhibiting wavefront correction includes a third positive sphere correction of at least 1.5 diopter to the light from the third peripheral vision region that passes through the third annular sector and forms the image of the third peripheral vision region on the third annular region of the peripheral retina.

Example 34 is the ophthalmic lens of any one of example 28 through example 33, wherein exterior surfaces of the first annular sector are shaped to produce the first myopia inhibiting wavefront correction, exterior surfaces of the second annular sector are shaped to produce the second myopia inhibiting wavefront correction, and exterior surfaces of the third annular sector are shaped configured to produce the third myopia inhibiting wavefront correction.

Example 35 is the ophthalmic lens of example 34, wherein an optical phase height of the first myopia inhibiting wavefront correction varies in a first circumferential direction of the ophthalmic lens, an optical phase height of the second myopia inhibiting wavefront correction varies in a second circumferential direction of the ophthalmic lens, and an optical phase height of the third myopia inhibiting wavefront correction varies in a third circumferential direction of the ophthalmic lens.

Example 36 is the ophthalmic lens of example 35, wherein a thickness of the first annular sector varies in a first circumferential direction of the ophthalmic lens, a thickness of the second annular sector varies in a second circumferential direction of the ophthalmic lens, and a thickness of the third annular sector varies in a third circumferential direction of the ophthalmic lens.

Example 37 is the ophthalmic lens of example 36, wherein an optical phase height of the first myopia inhibiting wavefront correction has a maximum absolute height in a central portion of the first annular sector, an optical phase height of the second myopia inhibiting wavefront correction has a maximum absolute height in a central portion of the second annular sector, and an optical phase height of the third myopia inhibiting wavefront correction has a maximum absolute height in a central portion of the third annular sector.

Example 38 is the ophthalmic lens of example 37, wherein the optical phase height of the first myopia inhibiting wavefront correction varies in a first radial direction of the ophthalmic lens, the optical phase height of the second myopia inhibiting wavefront correction varies in a second radial direction of the ophthalmic lens, and the optical phase height of the third myopia inhibiting wavefront correction varies in a third radial direction of the ophthalmic lens.

Example 39 is the ophthalmic lens of any one of example 28 through example 33, wherein: (1) exterior surfaces of the first annular sector are shaped to produce a first portion of the first myopia inhibiting wavefront correction, (2) the first annular sector comprises subsurface refractive index variations configured to produce a second portion of the first myopia inhibiting wavefront correction, (3) exterior surfaces of the second annular sector are shaped to produce a first portion of the second myopia inhibiting wavefront correction, (4) the second annular sector comprises subsurface refractive index variations configured to produce a second portion of the second myopia inhibiting wavefront correction, (5) exterior surfaces of the third annular sector are shaped to produce a first portion of the third myopia inhibiting wavefront correction, and (6) the third annular sector comprises subsurface refractive index variations configured to produce a second portion of the third myopia inhibiting wavefront correction.

Example 40 is the ophthalmic lens of any one of example 28 through example 33, wherein the first annular sector comprises subsurface refractive index variations configured to produce at least a portion of the first myopia inhibiting wavefront correction, the second annular sector comprises subsurface refractive index variations configured to produce at least a portion of the second myopia inhibiting wavefront correction, and the third annular sector comprises subsurface refractive index variations configured to produce at least a portion of the third myopia inhibiting wavefront correction.

Example 41 is the ophthalmic lens of example 40, wherein: (1) the first myopia inhibiting wavefront correction has a phase-wrapped configuration equivalent to a non-phase-wrapped configuration of the first myopia inhibiting wavefront correction, (2) an optical phase height of the non-phase-wrapped configuration of the first myopia inhibiting wavefront correction varies in a circumferential direction of the ophthalmic lens, (3) the second myopia inhibiting wavefront correction has a phase-wrapped configuration equivalent to a non-phase-wrapped configuration of the second myopia inhibiting wavefront correction, (4) an optical phase height of the non-phase-wrapped configuration of the second myopia inhibiting wavefront correction varies in a circumferential direction of the ophthalmic lens, (5) the third myopia inhibiting wavefront correction has a phase-wrapped configuration equivalent to a non-phase-wrapped configuration of the third myopia inhibiting wavefront correction, and (6) an optical phase height of the non-phase-wrapped configuration of the third myopia inhibiting wavefront correction varies in a circumferential direction of the ophthalmic lens.

Example 42 is the ophthalmic lens of example 41, wherein the optical phase height of the non-phase-wrapped configuration of the first myopia inhibiting wavefront correction has a maximum absolute height in a central portion of the first annular sector, the optical phase height of the non-phase-wrapped configuration of the second myopia inhibiting wavefront correction has a maximum absolute height in a central portion of the second annular sector, and the optical phase height of the non-phase-wrapped configuration of the third myopia inhibiting wavefront correction has a maximum absolute height in a central portion of the third annular sector.

Example 43 is the ophthalmic lens of example 42, wherein the optical phase height of the non-phase-wrapped configuration of the first myopia inhibiting wavefront correction varies in a first radial direction of the ophthalmic lens, the optical phase height of the non-phase-wrapped configuration of the second myopia inhibiting wavefront correction varies in a second radial direction of the ophthalmic lens, and the optical phase height of the non-phase-wrapped configuration of the third myopia inhibiting wavefront correction varies in a third radial direction of the ophthalmic lens.

Example 44 is the ophthalmic lens of any one of example 1 through example 17, configured as a contact lens.

Example 45 is the ophthalmic lens of any one of example 1 through example 17, configured as an intraocular lens.

Example 46 is a method of inhibiting progression of myopia in an eye having a retina comprising a central retina and a peripheral retina. The example 46 method comprises applying a first myopia inhibiting wavefront correction, by a first annular sector of an ophthalmic lens, to light from a first peripheral vision region of a peripheral visual field of a user of the ophthalmic lens. The first annular sector is configured so that light from the first peripheral vision region passes through the first annular sector to form an image of the first peripheral vision region on a first annular region of the peripheral retina. The first myopia inhibiting wavefront correction is configured to reduce a first circumferential-to-radial aspect ratio of the image of the first peripheral vision region. The first circumferential-to-radial aspect ratio is defined as a circumferential length of the image of the first peripheral vision region in a first circumferential direction of the retina divided by a radial length of the image of the first peripheral vision region in a first radial direction of the peripheral retina.

Example 47 is the method of example 46, wherein the first myopia inhibiting wavefront correction comprises a first positive sphere correction of at least 0.5 diopter to the light from the first peripheral vision region that passes through the first annular sector and forms the image of the first peripheral vision region on the first annular region of the peripheral retina.

Example 48 is the method of example 46, wherein the first myopia inhibiting wavefront correction comprises a first positive sphere correction of at least 1.0 diopter to the light from the first peripheral vision region that passes through the first annular sector and forms the image of the first peripheral vision region on the first annular region of the peripheral retina.

Example 49 is the method of example 46, wherein the first myopia inhibiting wavefront correction comprises a first positive sphere correction of at least 1.25 diopter to the light from the first peripheral vision region that passes through the first annular sector and forms the image of the first peripheral vision region on the first annular region of the peripheral retina.

Example 50 is the method of example 46, wherein the first myopia inhibiting wavefront correction comprises a first positive sphere correction of at least 1.5 diopter to the light from the first peripheral vision region that passes through the first annular sector and forms the image of the first peripheral vision region on the first annular region of the peripheral retina.

Example 51 is the method of example 46, further comprising applying an on-axis wavefront correction to the central retina via a central zone of the ophthalmic lens and applying an annular transition zone wavefront correction that transitions from the on-axis wavefront correction provided by the central zone to the first myopia inhibiting wavefront correction provided by the first annular sector via an annular transition zone of the ophthalmic lens disposed between the central zone and the first annular sector.

Example 52 is the method of example 46, further comprising applying a first radial treatment zone myopia inhibiting wavefront correction for a first annular portion of the peripheral retina via a first radial treatment zone of the ophthalmic lens that surrounds a central zone of the ophthalmic lens and applying a second radial treatment zone myopia inhibiting wavefront correction for a second annular portion of the peripheral retina that surrounds the first annular portion of the peripheral retina via a second radial treatment zone of the ophthalmic lens that surrounds the first radial treatment zone of the ophthalmic lens.

Example 53 is the method of example 46, further comprising increasing contrast in a first region of the peripheral retina via a first treatment type zone of the ophthalmic lens and decreasing contrast in a second region of the peripheral retina via a second treatment type zone of the ophthalmic lens.

Example 54 is the method of example 53, wherein decreasing contrast in the second region of the peripheral retina comprises inducing scatter via the second treatment type zone.

Example 55 is the method of example 54, wherein the second treatment type zone comprises optical elements that form defocus elements.

Example 56 is the method of example 55, wherein each of the defocus elements has a diameter in a range from 0.1 to 1.0 mm and a power in a range from 1.0 to 3.0 diopters of defocus.

Example 57 is the method of example 56, wherein the defocus elements are arranged in a pattern with an inter-element spacing in a range from 0.1 to 1.0 mm.

Example 58 is the method of example 54, wherein the second treatment type zone comprises random subsurface optical elements configured to induce scatter.

Example 59 is the method of example 58, wherein the random subsurface optical elements are configured to induce a range of wavefront corrections between 0.1 and 1.0 waves at 550 nm wavelength.

Example 60 is the method of example 46, further comprising releasing a myopia inhibiting compound from the ophthalmic lens into the eye over time.

Example 61 is the method of example 60, wherein the myopia inhibiting compound comprises atropine.

Example 62 is the method of any one of example 46 through example 61, wherein exterior surfaces of the first annular sector are shaped to produce the first myopia inhibiting wavefront correction.

Example 63 is the method of example 62, wherein an optical phase height of the first myopia inhibiting wavefront correction varies in a first circumferential direction of the ophthalmic lens.

Example 64 is the method of example 63, wherein a thickness of the first annular sector varies in a first circumferential direction of the ophthalmic lens.

Example 65 is the method of example 63, wherein the optical phase height of the first myopia inhibiting wavefront correction has a maximum absolute height in a central portion of the first annular sector.

Example 66 is the method of example 65, wherein the optical phase height of the first myopia inhibiting wavefront correction varies in a first radial direction of the ophthalmic lens.

Example 67 is the method of any one of example 46 through example 61, wherein exterior surfaces of the first annular sector are shaped to produce a first portion of the first myopia inhibiting wavefront correction and the first annular sector comprises subsurface refractive index variations configured to produce a second portion of the first myopia inhibiting wavefront correction.

Example 68 is the method of any one of example 46 through example 61, wherein the first annular sector comprises subsurface refractive index variations configured to produce at least a portion of the first myopia inhibiting wavefront correction.

Example 69 is the method of example 68, wherein the first myopia inhibiting wavefront correction has a phase-wrapped configuration equivalent to a non-phase-wrapped configuration of the first myopia inhibiting wavefront correction and an optical phase height of the non-phase-wrapped configuration of the first myopia inhibiting wavefront correction varies in a first circumferential direction of the ophthalmic lens.

Example 70 is the method of example 69, wherein the optical phase height of the non-phase-wrapped configuration of the first myopia inhibiting wavefront correction has a maximum absolute height in a central portion of the first annular sector.

Example 71 is the method of example 70, wherein the optical phase height of the non-phase-wrapped configuration of the first myopia inhibiting wavefront correction varies in a first radial direction of the ophthalmic lens.

Example 72 is the method of example 68, further comprising inducing the subsurface refractive index variations with pulses of laser light, wherein each of the pulses of laser light have a duration in a range from 10 femtoseconds to 500 femtoseconds.

Example 73 is the method of example 72, wherein each of the pulses of laser light has a wavelength of about 405 nm.

Example 74 is the method of example 72, wherein each of the pulses of laser light has a wavelength of about 810 nm.

Example 75 is the method of example 72, wherein each of the pulses of laser light has a wavelength of about 1035 nm.

Example 76 is the method of example 75, wherein each of the pulses of laser light has a duration in a range from 15 femtoseconds to 50 femtoseconds.

Example 77 is the method of example 46, wherein: (1) the ophthalmic lens comprises a second annular sector and a third annular sector, (2) the second annular sector is configured to provide a second myopia inhibiting wavefront correction to light from a second peripheral vision region of the peripheral visual field, (3) the second annular sector is configured so that light from the second peripheral vision region passes through the second annular sector to form an image of the second peripheral vision region on a second annular region of the peripheral retina, (4) the second myopia inhibiting wavefront correction is configured to reduce a second circumferential-to-radial aspect ratio of the image of the second peripheral vision region, (5) the second circumferential-to-radial aspect ratio is defined as a circumferential length of the image of the second peripheral vision region in a second circumferential direction of the retina divided by a radial length of the image of the second peripheral vision region in a second radial direction of the peripheral retina, (6) the third annular sector is configured to provide a third myopia inhibiting wavefront correction to light from a third peripheral vision region of the peripheral visual field, (7) the third annular sector is configured so that light from the third peripheral vision region passes through the third annular sector to form an image of the third peripheral vision region on a third annular region of the peripheral retina, (8) the third myopia inhibiting wavefront correction is configured to reduce a third circumferential-to-radial aspect ratio of the image of the third peripheral vision region, and (9) the third circumferential-to-radial aspect ratio is defined as a circumferential length of the image of the third peripheral vision region in a third circumferential direction of the retina divided by a radial length of the image of the third peripheral vision region in a third radial direction of the peripheral retina.

Example 78 is the method of example 77, wherein: (1) the first myopia inhibiting wavefront correction comprises a first positive sphere correction of at least 0.5 diopter to the light from the first peripheral vision region that passes through the first annular sector and forms the image of the first peripheral vision region on the first annular region of the peripheral retina, (2) the second myopia inhibiting wavefront correction comprises a second positive sphere correction of at least 0.5 diopter to the light from the second peripheral vision region that passes through the second annular sector and forms the image of the second peripheral vision region on the second annular region of the peripheral retina, and (3)

the third myopia inhibiting wavefront correction comprises a third positive sphere correction of at least 0.5 diopter to the light from the third peripheral vision region that passes through the third annular sector and forms the image of the third peripheral vision region on the third annular region of the peripheral retina.

Example 79 is the method of example 77, wherein: (1) the first myopia inhibiting wavefront correction comprises a first positive sphere correction of at least 1.0 diopter to the light from the first peripheral vision region that passes through the first annular sector and forms the image of the first peripheral vision region on the first annular region of the peripheral retina, (2) the second myopia inhibiting wavefront correction comprises a second positive sphere correction of at least 1.0 diopter to the light from the second peripheral vision region that passes through the second annular sector and forms the image of the second peripheral vision region on the second annular region of the peripheral retina, and (3) the third myopia inhibiting wavefront correction comprises a third positive sphere correction of at least 1.0 diopter to the light from the third peripheral vision region that passes through the third annular sector and forms the image of the third peripheral vision region on the third annular region of the peripheral retina.

Example 80 is the method of example 77, wherein: (1) the first myopia inhibiting wavefront correction comprises a first positive sphere correction of at least 1.25 diopter to the light from the first peripheral vision region that passes through the first annular sector and forms the image of the first peripheral vision region on the first annular region of the peripheral retina, (2) the second myopia inhibiting wavefront correction comprises a second positive sphere correction of at least 1.25 diopter to the light from the second peripheral vision region that passes through the second annular sector and forms the image of the second peripheral vision region on the second annular region of the peripheral retina, and (3) the third myopia inhibiting wavefront correction comprises a third positive sphere correction of at least 1.25 diopter to the light from the third peripheral vision region that passes through the third annular sector and forms the image of the third peripheral vision region on the third annular region of the peripheral retina.

Example 81 is the method of example 77, wherein: (1) the first myopia inhibiting wavefront correction comprises a first positive sphere correction of at least 1.5 diopter to the light from the first peripheral vision region that passes through the first annular sector and forms the image of the first peripheral vision region on the first annular region of the peripheral retina, (2) the second myopia inhibiting wavefront correction comprises a second positive sphere correction of at least 1.5 diopter to the light from the second peripheral vision region that passes through the second annular sector and forms the image of the second peripheral vision region on the second annular region of the peripheral retina, and (3) the third myopia inhibiting wavefront correction comprises a third positive sphere correction of at least 1.5 diopter to the light from the third peripheral vision region that passes through the third annular sector and forms the image of the third peripheral vision region on the third annular region of the peripheral retina.

Example 82 is the method of any one of example 77 through example 81, wherein exterior surfaces of the first annular sector are shaped to produce the first myopia inhibiting wavefront correction, exterior surfaces of the second annular sector are shaped to produce the second myopia inhibiting wavefront correction, and exterior surfaces of the third annular sector are shaped to produce the third myopia inhibiting wavefront correction.

Example 83 is the method of example 82, wherein an optical phase height of the first myopia inhibiting wavefront correction varies in a first circumferential direction of the ophthalmic lens, an optical phase height of the second myopia inhibiting wavefront correction varies in a second circumferential direction of the ophthalmic lens, and an optical phase height of the third myopia inhibiting wavefront correction varies in a third circumferential direction of the ophthalmic lens.

Example 84 is the method of example 83, wherein a thickness of the first annular sector varies in a first circumferential direction of the ophthalmic lens, a thickness of the second annular sector varies in a second circumferential direction of the ophthalmic lens, and a thickness of the third annular sector varies in a third circumferential direction of the ophthalmic lens.

Example 85 is the method of example 84, wherein the optical phase height of the first myopia inhibiting wavefront correction has a maximum absolute height in a central portion of the first annular sector, the optical phase height of the second myopia inhibiting wavefront correction has a maximum absolute height in a central portion of the second annular sector, and the optical phase height of the third myopia inhibiting wavefront correction has a maximum absolute height in a central portion of the third annular sector.

Example 86 is the method of example 85, wherein the optical phase height of the first myopia inhibiting wavefront correction varies in a first radial direction of the ophthalmic lens, the optical phase height of the second myopia inhibiting wavefront correction varies in a second radial direction of the ophthalmic lens, and the optical phase height of the third myopia inhibiting wavefront correction varies in a third radial direction of the ophthalmic lens.

Example 87 is the method of any one of example 77 through example 81, wherein: (1) exterior surfaces of the first annular sector are shaped to produce a first portion of the first myopia inhibiting wavefront correction, (2) the first annular sector comprises subsurface refractive index variations configured to produce a second portion of the first myopia inhibiting wavefront correction, (3) exterior surfaces of the second annular sector are shaped to produce a first portion of the second myopia inhibiting wavefront correction, (4) the second annular sector comprises subsurface refractive index variations configured to produce a second portion of the second myopia inhibiting wavefront correction, (5) exterior surfaces of the third annular sector are shaped to produce a first portion of the third myopia inhibiting wavefront correction, and (6) the third annular sector comprises subsurface refractive index variations configured to produce a second portion of the third myopia inhibiting wavefront correction.

Example 88 is the method of any one of example 77 through example 81, wherein the first annular sector comprises subsurface refractive index variations configured to produce the first myopia inhibiting wavefront correction, the second annular sector comprises subsurface refractive index variations configured to produce the second myopia inhibiting wavefront correction, and the third annular sector comprises subsurface refractive index variations configured to produce the third myopia inhibiting wavefront correction.

Example 89 is the method of example 88, wherein: (1) the first myopia inhibiting wavefront correction has a phase-wrapped configuration equivalent to a non-phase-wrapped configuration of the first myopia inhibiting wavefront correction, (2) an optical phase height of the non-phase-wrapped configuration of the first myopia inhibiting wavefront correction varies in a first circumferential direction of the ophthalmic lens, (3) the second myopia inhibiting wavefront correction has a phase-wrapped configuration equivalent to a non-phase-wrapped configuration of the second myopia inhibiting wavefront correction, (4) an optical phase height of the non-phase-wrapped configuration of the second myopia inhibiting wavefront correction varies in a second circumferential direction of the ophthalmic lens, (5) the third myopia inhibiting wavefront correction has a phase-wrapped configuration equivalent to a non-phase-wrapped configuration of the third myopia inhibiting wavefront correction, and (6) an optical phase height of the non-phase-wrapped configuration of the third myopia inhibiting wavefront correction varies in a third circumferential direction of the ophthalmic lens.

Example 90 is the method of example 89, wherein the optical phase height of the non-phase-wrapped configuration of the first myopia inhibiting wavefront correction has a maximum absolute height in a central portion of the first annular sector, the optical phase height of the non-phase-wrapped configuration of the second myopia inhibiting wavefront correction has a maximum absolute height in a central portion of the second annular sector, and the optical phase height of the non-phase-wrapped configuration of the third myopia inhibiting wavefront correction has a maximum absolute height in a central portion of the third annular sector.

Example 91 is the method of example 90, wherein the optical phase height of the non-phase-wrapped configuration of the first myopia inhibiting wavefront correction varies in a first radial direction of the ophthalmic lens, the optical phase height of the non-phase-wrapped configuration of the second myopia inhibiting wavefront correction varies in a second radial direction of the ophthalmic lens, and the optical phase height of the non-phase-wrapped configuration of the third myopia inhibiting wavefront correction varies in a third radial direction of the ophthalmic lens.

Example 92 is the method of any one of example 46 through example 61, wherein the ophthalmic lens comprises a cornea, and further comprising modifying a first annular sector of the cornea to configure the first annular sector of the cornea to apply the first myopia inhibiting wavefront correction to the light from the first peripheral vision region that passes through the first annular sector and forms the image of the first peripheral vision region on the first annular region of the peripheral retina.

Example 93 is the method of any one of example 46 through example 61, wherein the ophthalmic lens comprises a native lens of the eye, and further comprising modifying a first annular sector of the native lens to configure the first annular sector of the native lens to apply the first myopia inhibiting wavefront correction to the light from the first peripheral vision region that passes through the first annular sector and forms the image of the first peripheral vision region on the first annular region of the peripheral retina.

Example 94 is the method of any one of example 46 through example 61, wherein the ophthalmic lens comprises a contact lens.

Example 95 is the method of any one of example 46 through example 61, wherein the ophthalmic lens comprises an intraocular lens.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An ophthalmic lens configured to inhibit progression of myopia in a user having a retina comprising a central retina and a peripheral retina, the ophthalmic lens comprising:
a central zone; and
an annular zone surrounding the central zone and comprising a first annular sector configured to provide a first myopia inhibiting wavefront correction to light from a first peripheral vision region of a peripheral visual field of the user, wherein the first annular sector is configured so that light from the first peripheral vision region passes through the first annular sector to form an image of the first peripheral vision region on a first annular region of the peripheral retina, wherein the first myopia inhibiting wavefront correction is configured to reduce a first circumferential-to-radial aspect ratio of the image of the first peripheral vision region, and wherein the first circumferential-to-radial aspect ratio is defined as a circumferential length of the image of the first peripheral vision region in a first circumferential direction of the retina divided by a radial length of the image of the first peripheral vision region in a first radial direction of the peripheral retina.

2. The ophthalmic lens of claim 1, wherein the first annular sector is disposed on an opposite side of an eye of the user relative to the first annular region of the peripheral retina.

3. The ophthalmic lens of claim 1, wherein the first annular sector comprises subsurface refractive index variations configured to produce at least a portion of the first myopia inhibiting wavefront correction.

4. The ophthalmic lens of claim 3, wherein the first myopia inhibiting wavefront correction comprises a first positive sphere correction of at least 0.5 diopter to the light from the first peripheral vision region that passes through the first annular sector and forms the image of the first peripheral vision region on the first annular region of the peripheral retina.

5. The ophthalmic lens of claim 3, further comprising an annular transition zone disposed between the central zone and the annular zone, wherein:
the central zone is configured to provide an on-axis wavefront correction to the central retina; and
the annular transition zone is configured to provide an annular transition zone wavefront correction that transitions from the on-axis wavefront correction provided by the central zone to the first myopia inhibiting wavefront correction provided by the first annular sector.

6. The ophthalmic lens of claim 3, wherein:
the annular zone comprises a first radial treatment zone and a second radial treatment zone;
the first radial treatment zone surrounds the central zone and is configured to provide a first radial treatment zone myopia inhibiting wavefront correction for a first annular portion of the peripheral retina;
the second radial treatment zone surrounds the first radial treatment zone and is configured to provide a second radial treatment zone myopia inhibiting wavefront correction for a second annular portion of the peripheral retina that surrounds the first annular portion of the peripheral retina.

7. The ophthalmic lens of claim 3, wherein:
the annular zone comprises a first treatment type zone and a second treatment type zone;
the first treatment type zone is configured to increase contrast in the peripheral retina; and
the second treatment type zone is configured to decrease contrast in the peripheral retina.

8. The ophthalmic lens of claim 7, wherein the second treatment type zone is configured to induce scatter.

9. The ophthalmic lens of claim 8, wherein the second treatment type zone comprises optical elements that form defocus elements.

10. The ophthalmic lens of claim 8, wherein the second treatment type zone comprises random subsurface optical elements configured to induce scatter.

11. The ophthalmic lens of claim 10, wherein the random subsurface optical elements are configured to induce a range of wavefront corrections between 0.1 and 1.0 waves at 550 nm wavelength.

12. The ophthalmic lens of claim 3, further comprising a myopia inhibiting compound incorporated to provide for release into an eye of the user over time.

13. The ophthalmic lens of claim 3, wherein external surfaces of the first annular sector are shaped to produce the first myopia inhibiting wavefront correction.

14. The ophthalmic lens of claim 3, wherein:
exterior surfaces of the first annular sector are shaped to produce a first portion of the first myopia inhibiting wavefront correction; and
the first annular sector comprises subsurface refractive index variations configured to produce a second portion of the first myopia inhibiting wavefront correction.

15. The ophthalmic lens of claim 3, wherein the first annular sector comprises subsurface refractive index variations configured to produce the first myopia inhibiting wavefront correction.

16. The ophthalmic lens of claim 15, wherein:
the first myopia inhibiting wavefront correction has phase-wrapped configuration equivalent to a non-phase-wrapped configuration of the first myopia inhibiting wavefront correction; and
an optical phase height of the non-phase-wrapped configuration of the first myopia inhibiting wavefront correction varies in a first circumferential direction of the ophthalmic lens.

17. The ophthalmic lens of claim 16, wherein the optical phase height of the non-phase-wrapped configuration of the first myopia inhibiting wavefront correction has a maximum absolute height in a central portion of the first annular sector.

18. The ophthalmic lens of claim 17, wherein the optical phase height of the non-phase-wrapped configuration of the first myopia inhibiting wavefront correction varies in a first radial direction of the ophthalmic lens.

19. The ophthalmic lens of claim 3, wherein:
the annular zone further comprises a second annular sector and a third annular sector;
the second annular sector is configured to provide a second myopia inhibiting wavefront correction to light from a second peripheral vision region of the peripheral visual field;
the second annular sector is configured so that light from the second peripheral vision region passes through the second annular sector to form an image of the second peripheral vision region on a second annular region of the peripheral retina;
the second myopia inhibiting wavefront correction is configured to reduce a second circumferential-to-radial aspect ratio of the image of the second peripheral vision region;
the second circumferential-to-radial aspect ratio is defined as a circumferential length of the image of the second peripheral vision region in a second circumferential direction of the retina divided by a radial length of the image of the second peripheral vision region in a second radial direction of the peripheral retina;
the third annular sector is configured to provide a third myopia inhibiting wavefront correction to light from a third peripheral vision region of the peripheral visual field;
the third annular sector is configured so that light from the third peripheral vision region passes through the third annular sector to form an image of the third peripheral vision region on a third annular region of the peripheral retina;

the third myopia inhibiting wavefront correction is configured to reduce a third circumferential-to-radial aspect ratio of the image of the third peripheral vision region; and the third circumferential-to-radial aspect ratio is defined as a circumferential length of the image of the third peripheral vision region in a third circumferential direction of the retina divided by a radial length of the image of the third peripheral vision region in a third radial direction of the peripheral retina.

20. The ophthalmic lens of claim 19, wherein:
the first annular sector is disposed on an opposite side of an eye of the user relative to the first annular region of the peripheral retina;
the second annular sector is disposed on an opposite side of the eye of the user relative to the second annular region of the peripheral retina; and
the third annular sector is disposed on an opposite side of the eye of the user relative to the third annular region of the peripheral retina.

21. The ophthalmic lens of claim 19, wherein:
the first myopia inhibiting wavefront correction comprises a first positive sphere correction of at least 0.5 diopter to the light from the first peripheral vision region that passes through the first annular sector and forms the image of the first peripheral vision region on the first annular region of the peripheral retina;
the second myopia inhibiting wavefront correction comprises a second positive sphere correction of at least 0.5 diopter to the light from the second peripheral vision region that passes through the second annular sector and forms the image of the second peripheral vision region on the second annular region of the peripheral retina; and
the third myopia inhibiting wavefront correction comprises a third positive sphere correction of at least 0.5 diopter to the light from the third peripheral vision region that passes through the third annular sector and forms the image of the third peripheral vision region on the third annular region of the peripheral retina.

22. The ophthalmic lens of claim 19, wherein:
exterior surfaces of the first annular sector are shaped to produce the first myopia inhibiting wavefront correction;
exterior surfaces of the second annular sector are shaped to produce the second myopia inhibiting wavefront correction; and
exterior surfaces of the third annular sector are shaped configured to produce the third myopia inhibiting wavefront correction.

23. The ophthalmic lens of claim 22, wherein:
an optical phase height of the first myopia inhibiting wavefront correction varies in a first circumferential direction of the ophthalmic lens;
an optical phase height of the second myopia inhibiting wavefront correction varies in a second circumferential direction of the ophthalmic lens; and
an optical phase height of the third myopia inhibiting wavefront correction varies in a third circumferential direction of the ophthalmic lens.

24. The ophthalmic lens of claim 23, wherein:
a thickness of the first annular sector varies in a first circumferential direction of the ophthalmic lens;
a thickness of the second annular sector varies in a second circumferential direction of the ophthalmic lens; and
a thickness of the third annular sector varies in a third circumferential direction of the ophthalmic lens.

25. The ophthalmic lens of claim 24, wherein:
an optical phase height of the first myopia inhibiting wavefront correction has a maximum absolute height in a central portion of the first annular sector;
an optical phase height of the second myopia inhibiting wavefront correction has a maximum absolute height in a central portion of the second annular sector; and
an optical phase height of the third myopia inhibiting wavefront correction has a maximum absolute height in a central portion of the third annular sector.

26. The ophthalmic lens of claim 25, wherein:
the optical phase height of the first myopia inhibiting wavefront correction varies in a first radial direction of the ophthalmic lens;
the optical phase height of the second myopia inhibiting wavefront correction varies in a second radial direction of the ophthalmic lens; and
the optical phase height of the third myopia inhibiting wavefront correction varies in a third radial direction of the ophthalmic lens.

27. The ophthalmic lens of claim 19, wherein:
exterior surfaces of the first annular sector are shaped to produce a first portion of the first myopia inhibiting wavefront correction;
the first annular sector comprises subsurface refractive index variations configured to produce a second portion of the first myopia inhibiting wavefront correction;
exterior surfaces of the second annular sector are shaped to produce a first portion of the second myopia inhibiting wavefront correction;
the second annular sector comprises subsurface refractive index variations configured to produce a second portion of the second myopia inhibiting wavefront correction;
exterior surfaces of the third annular sector are shaped to produce a first portion of the third myopia inhibiting wavefront correction; and
the third annular sector comprises subsurface refractive index variations configured to produce a second portion of the third myopia inhibiting wavefront correction.

28. The ophthalmic lens of claim 19, wherein:
the first annular sector comprises subsurface refractive index variations configured to produce at least a portion of the first myopia inhibiting wavefront correction;
the second annular sector comprises subsurface refractive index variations configured to produce at least a portion of the second myopia inhibiting wavefront correction; and
the third annular sector comprises subsurface refractive index variations configured to produce at least a portion of the third myopia inhibiting wavefront correction.

29. The ophthalmic lens of claim 3, configured as a contact lens.

30. The ophthalmic lens of claim 3, configured as an intraocular lens.

* * * * *